United States Patent
Knight et al.

(10) Patent No.: US 11,556,631 B2
(45) Date of Patent: Jan. 17, 2023

(54) USER INTERFACES FOR MANAGING USER ACCOUNT PASSWORDS

(71) Applicant: Apple Inc., Cupertino, CA (US)

(72) Inventors: Elaine Y. Knight, San Francisco, CA (US); Chelsea E. Pugh, San Francisco, CA (US); Reza Abbasian, Los Gatos, CA (US); Richard Houle, San Jose, CA (US); Richard J. Mondello, San Jose, CA (US); Zhuo Li, San Francisco, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 16/888,507

(22) Filed: May 29, 2020

(65) Prior Publication Data

US 2020/0380115 A1 Dec. 3, 2020

Related U.S. Application Data

(60) Provisional application No. 62/856,011, filed on Jun. 1, 2019.

(51) Int. Cl.
*G06F 21/46* (2013.01)
*G06F 21/41* (2013.01)

(52) U.S. Cl.
CPC .............. *G06F 21/46* (2013.01); *G06F 21/41* (2013.01)

(58) Field of Classification Search
CPC .......... G06F 21/46; G06F 21/45; G06F 21/41; G06F 16/27; G09G 2354/00; H04W 12/02; H04W 12/068
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |

(Continued)

FOREIGN PATENT DOCUMENTS

| | | | | |
|---|---|---|---|---|
| CN | 108809895 B | * | 7/2021 | ............. G06F 21/46 |
| KR | 20090004448 A | * | 1/2009 | |

(Continued)

OTHER PUBLICATIONS

Chin, Casey. "A New Google Chrome Extension Will Detect Your Unsafe Passwords", <https://www.wired.com/story/password-checkup-chrome-extension/>. Feb. 2019. (Year: 2019).*

(Continued)

*Primary Examiner* — Michael Simitoski
(74) *Attorney, Agent, or Firm* — Kubota & Basol LLP

(57) ABSTRACT

In some embodiments, an electronic device presents a weak password warning in a password management user interface that includes information about the user account with which the password is associated. In some embodiments, an electronic device presents a weak password warning in a login user interface.

45 Claims, 67 Drawing Sheets

(56) References Cited

U.S. PATENT DOCUMENTS

| | | | |
|---|---|---|---|
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 9,088,556 B2* | 7/2015 | Truskovsky | H04L 63/08 |
| 9,348,458 B2 | 5/2016 | Hotelling et al. | |
| 9,384,342 B2* | 7/2016 | Kominar | G06F 21/45 |
| 9,588,595 B2* | 3/2017 | Demopoulos | G06F 21/31 |
| 9,933,937 B2 | 4/2018 | Lemay et al. | |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2009/0328169 A1* | 12/2009 | Hutchison | H04L 63/04 707/999.01 |
| 2013/0166507 A1* | 6/2013 | Staczek | H04L 67/1095 707/625 |
| 2013/0269010 A1* | 10/2013 | Wheeler | G06F 21/46 726/6 |
| 2013/0283337 A1* | 10/2013 | Schechter | G06F 21/46 726/1 |
| 2014/0068733 A1* | 3/2014 | Belisario | G06F 21/46 726/6 |
| 2014/0215356 A1* | 7/2014 | Brander | H04W 12/02 715/753 |
| 2014/0282939 A1* | 9/2014 | Pieczul | H04L 9/0891 726/6 |
| 2014/0289870 A1* | 9/2014 | Selander | G06F 21/46 726/28 |
| 2016/0112401 A1* | 4/2016 | Jakobsson | G06F 21/46 726/6 |
| 2018/0048635 A1* | 2/2018 | Thibadeau, Sr. | H04L 63/10 |
| 2019/0370457 A1* | 12/2019 | Shultz | H04L 9/3226 |

FOREIGN PATENT DOCUMENTS

| | | | |
|---|---|---|---|
| KR | 20170066856 A | * | 6/2017 |
| WO | 2013/169849 A2 | | 11/2013 |
| WO | 2014/105276 A1 | | 7/2014 |
| WO | WO-2021015711 A1 | * | 1/2021 |

OTHER PUBLICATIONS

Dashlane. "How to use Dashlane to find out how secure youare". <https://support.dashlane.com/hc/en-us/articles/202699411-How-to-use-Dashlane-to-find-out-how-secure> (Wayback machine). May 2019. (Year: 2019).*

Duffy, Jill. "Mak e All Your Passwords Strong and Unique in 5 Steps", <https://zapier.com/blog/how-to-change-your-passwords/>. Oct. 2018. (Year: 2018).*

Gregmac. "A well-known URL for changing passwords". <https://news.ycombinator.com/item?id=18618193>. Dec. 2018. (Year: 2018).*

LastPass. "Use the Sharing Center". <https://web.archive.org/web/20190222022217/https://support.logmeininc.com/lastpass/help/use-the-sharing-center-lp020007>. Feb. 2019. (Year: 2019).*

New Media Unit. "Lastpass tutuorial p. 4—Auto changing saved passwords" (screenshots from video), <https://www.youtube.com/channel/UChfwpOddl71RT2Oh0vHYY4w>. Jan. 2019. (Year: 2019).*

Steel, Amber. "Take the Challenge: AreYour Passwords Strong Enough?". <https://blog.lastpass.com/2016/10/take-the-challenge-are-your-passwords-strong-enough/>. Oct. 2016. (Year: 2016).*

Steel, Amber. "Tips for Securely Sharing Passwords", <https://blog.lastpass.com/2016/01/tips-for-securely-sharing-passwords/>. Jan. 2016. (Year: 2016).*

Paul, Ian. "Nifty new LastPass, Dashlane features canchange your passwords for you", <https://www.pcworld.com/article/430756/nifty-new-lastpass-dashlane-features-can-change-your-passwords-for-you.html>. Dec. 2014. (Year: 2014).*

Theresa O'Connor "webappsec-change-password-url/explainer.md", Nov. 2018. (Year: 2018).*

Zorz, Zeljka. "1Password 7: A new design and added security features", <https://www.helpnetsecurity.com/2018/05/31/1password-7-security/>. May 2018. (Year: 2018).*

* cited by examiner

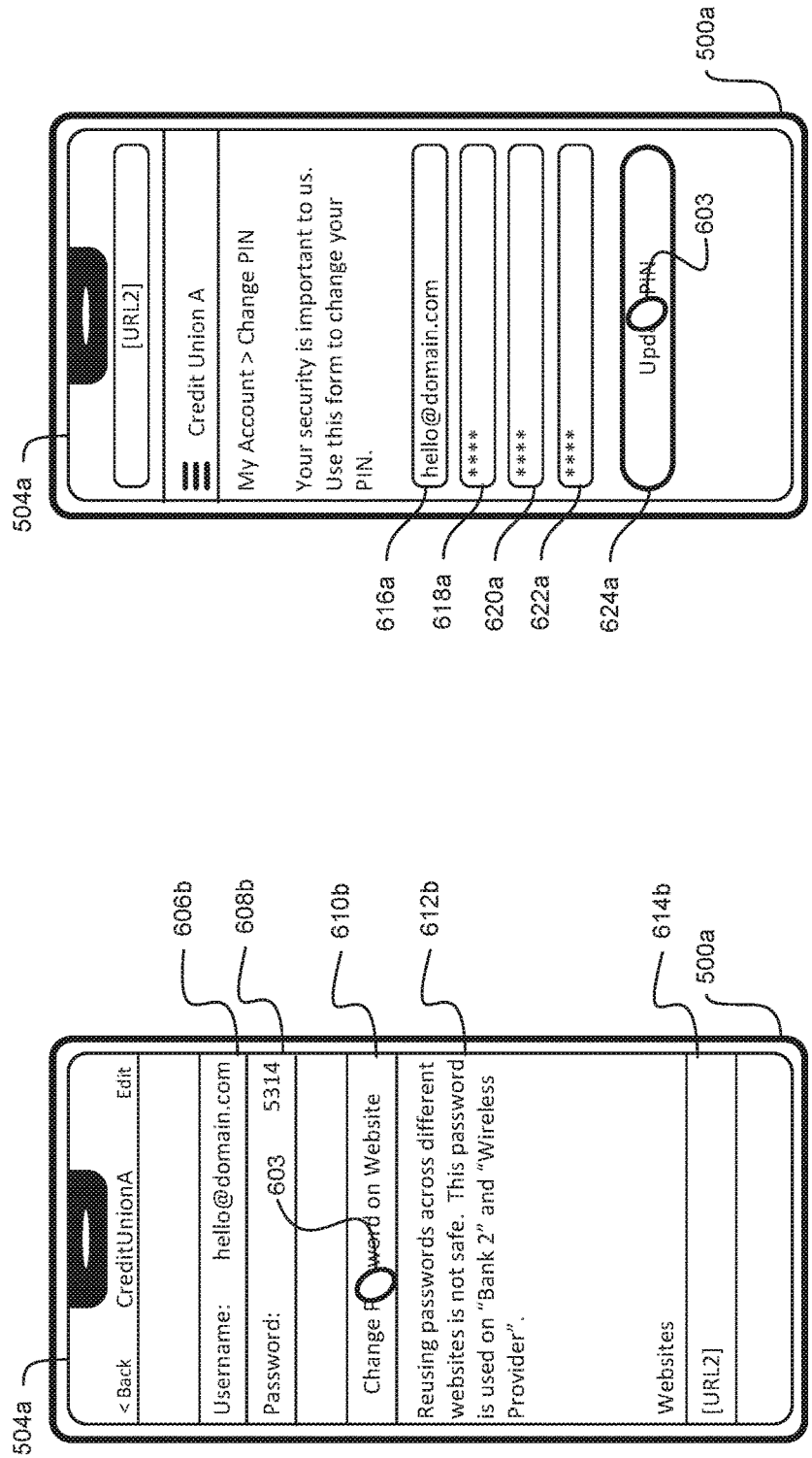

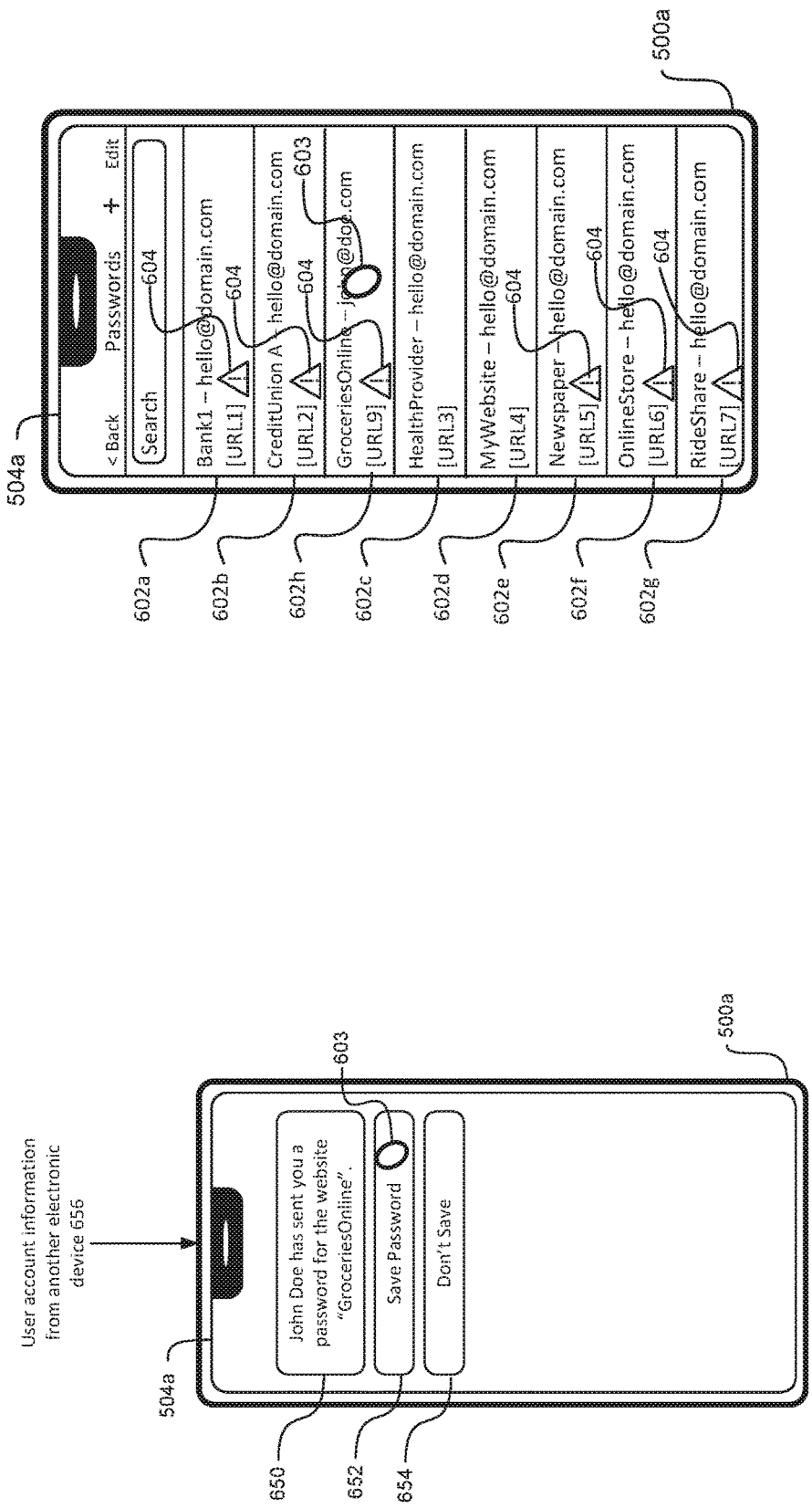

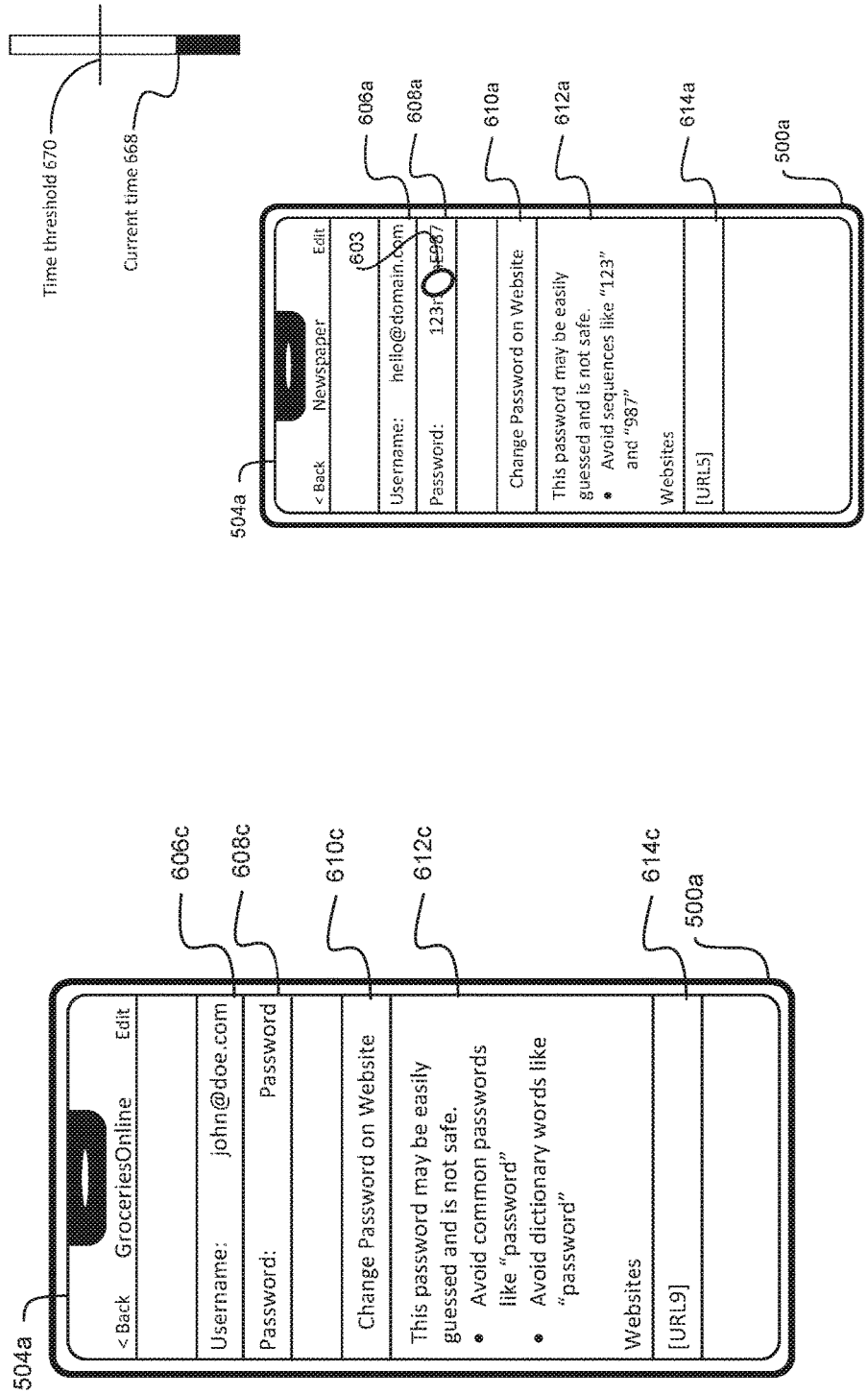

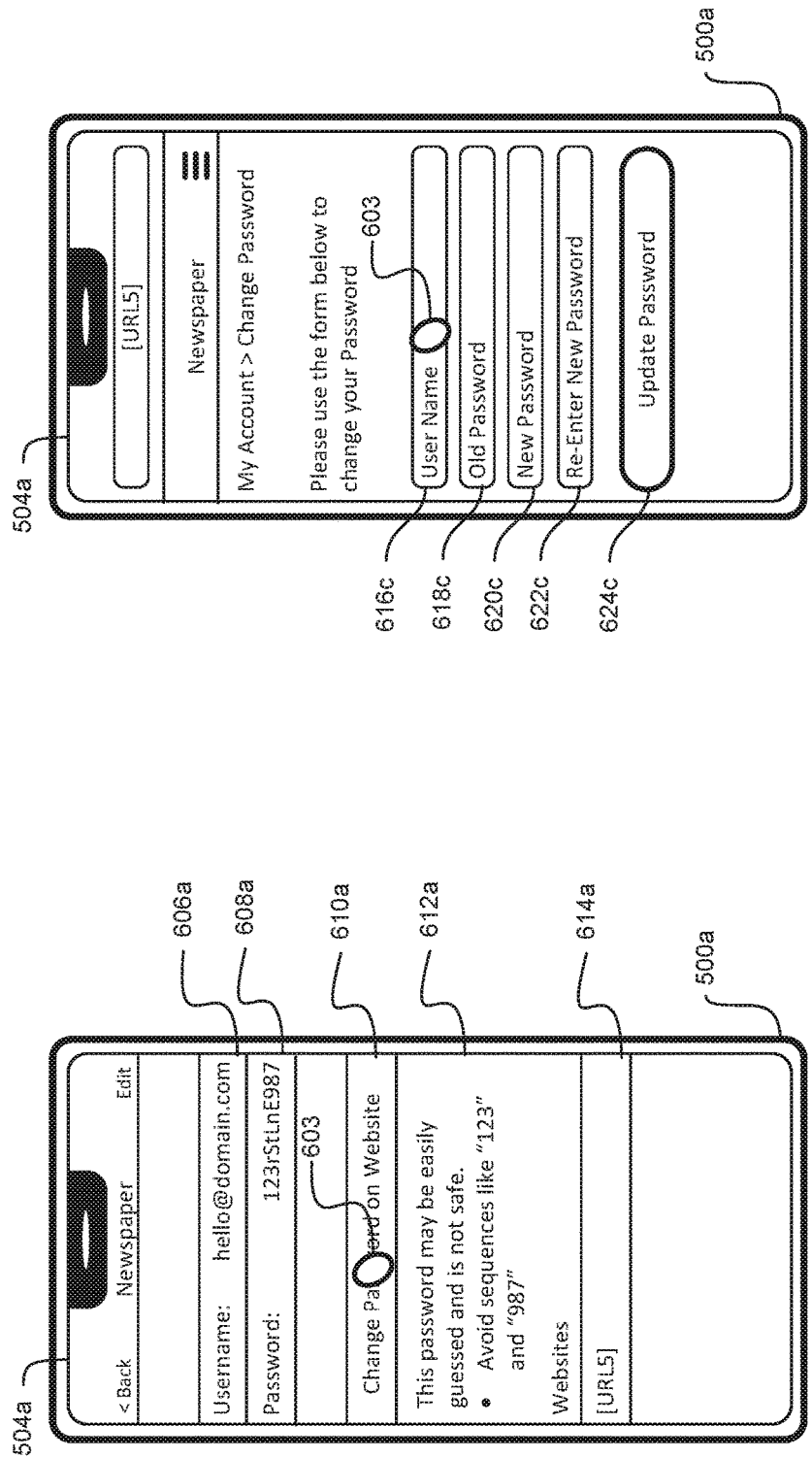

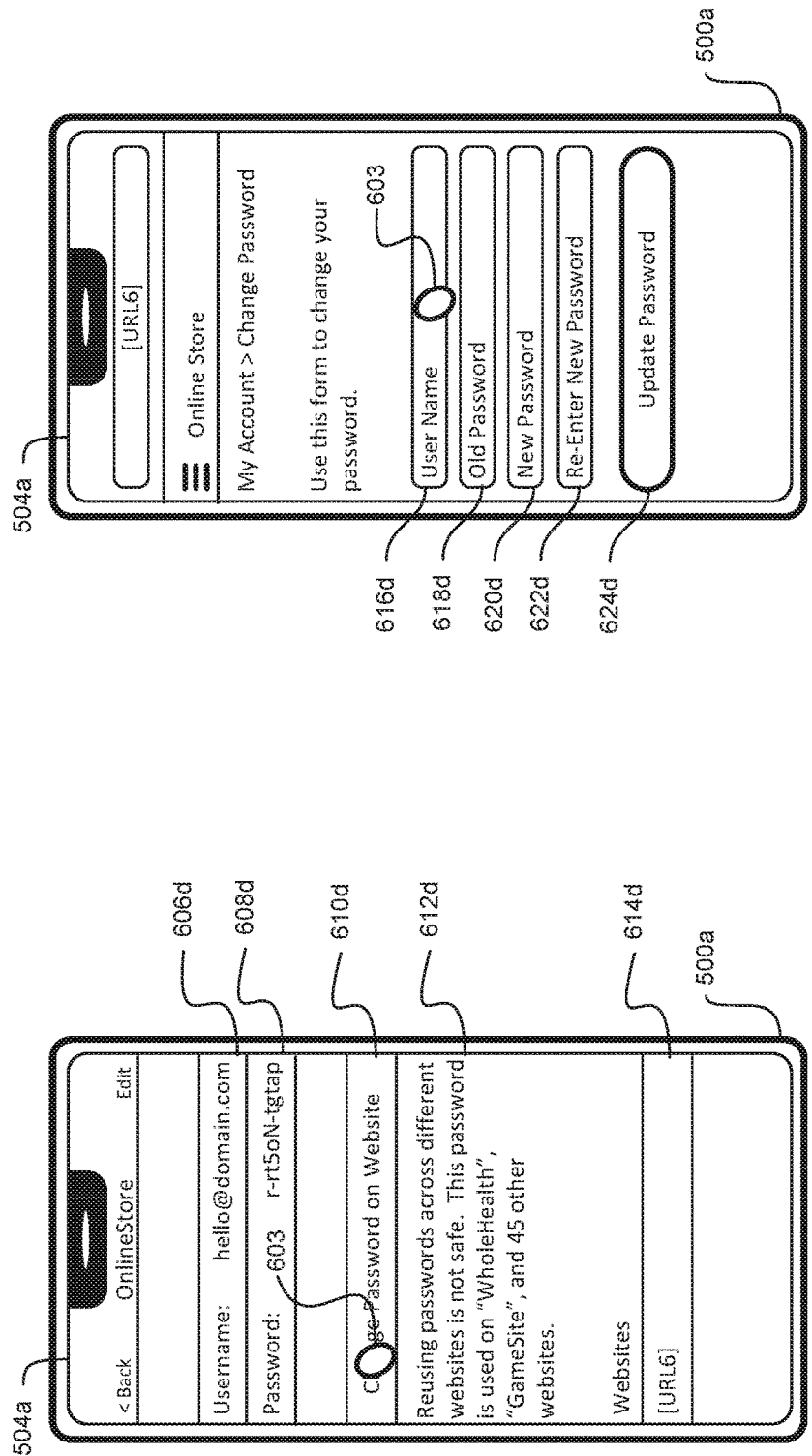

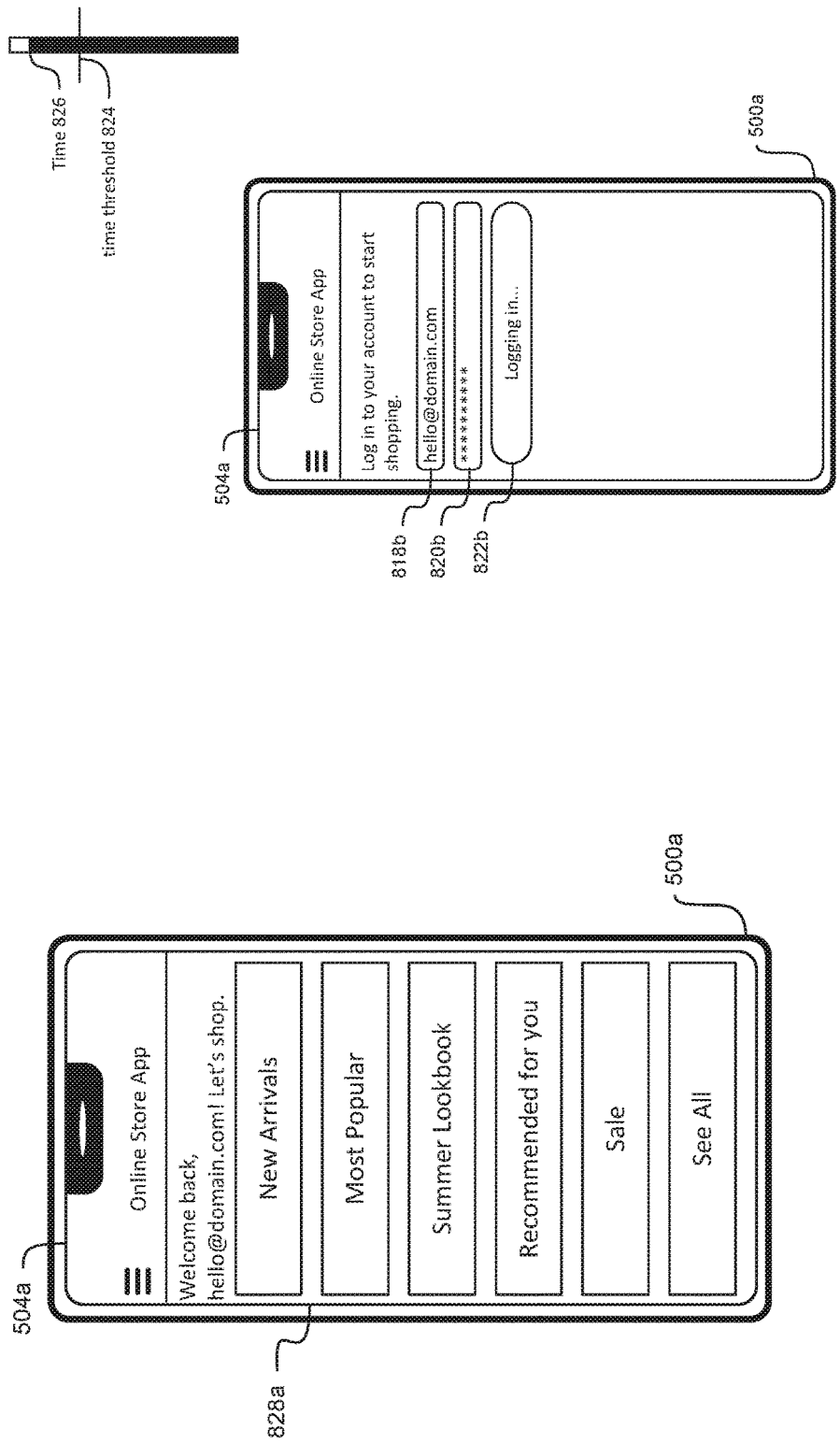

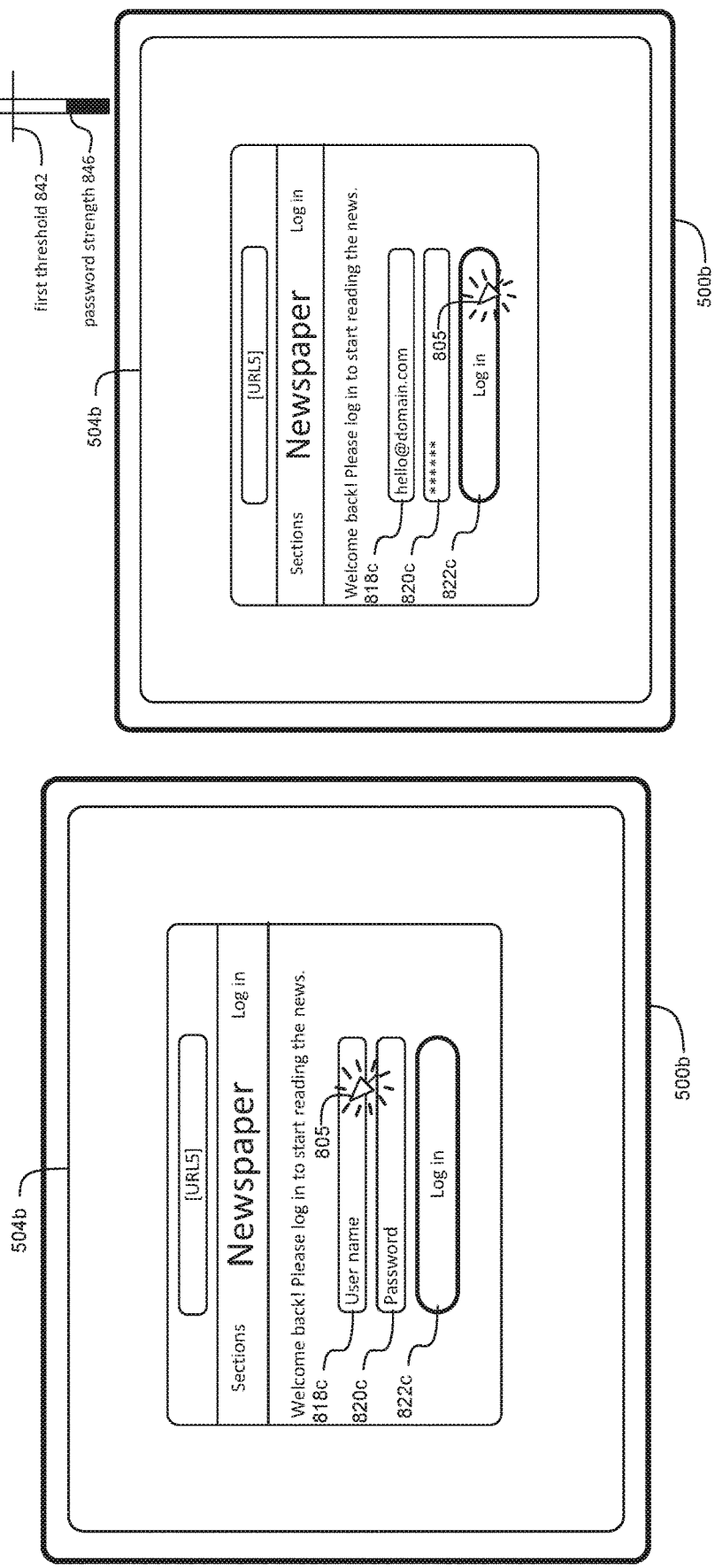

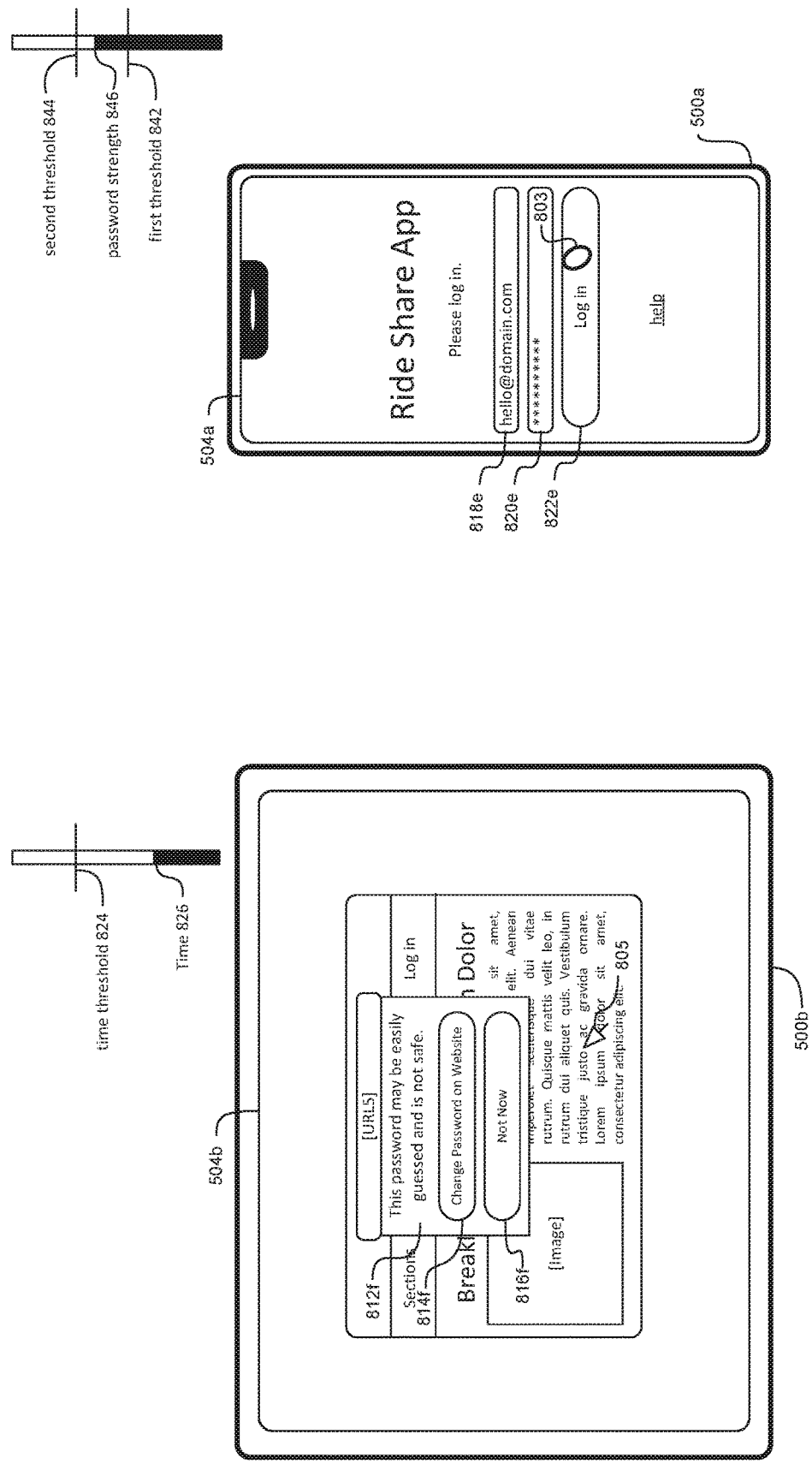

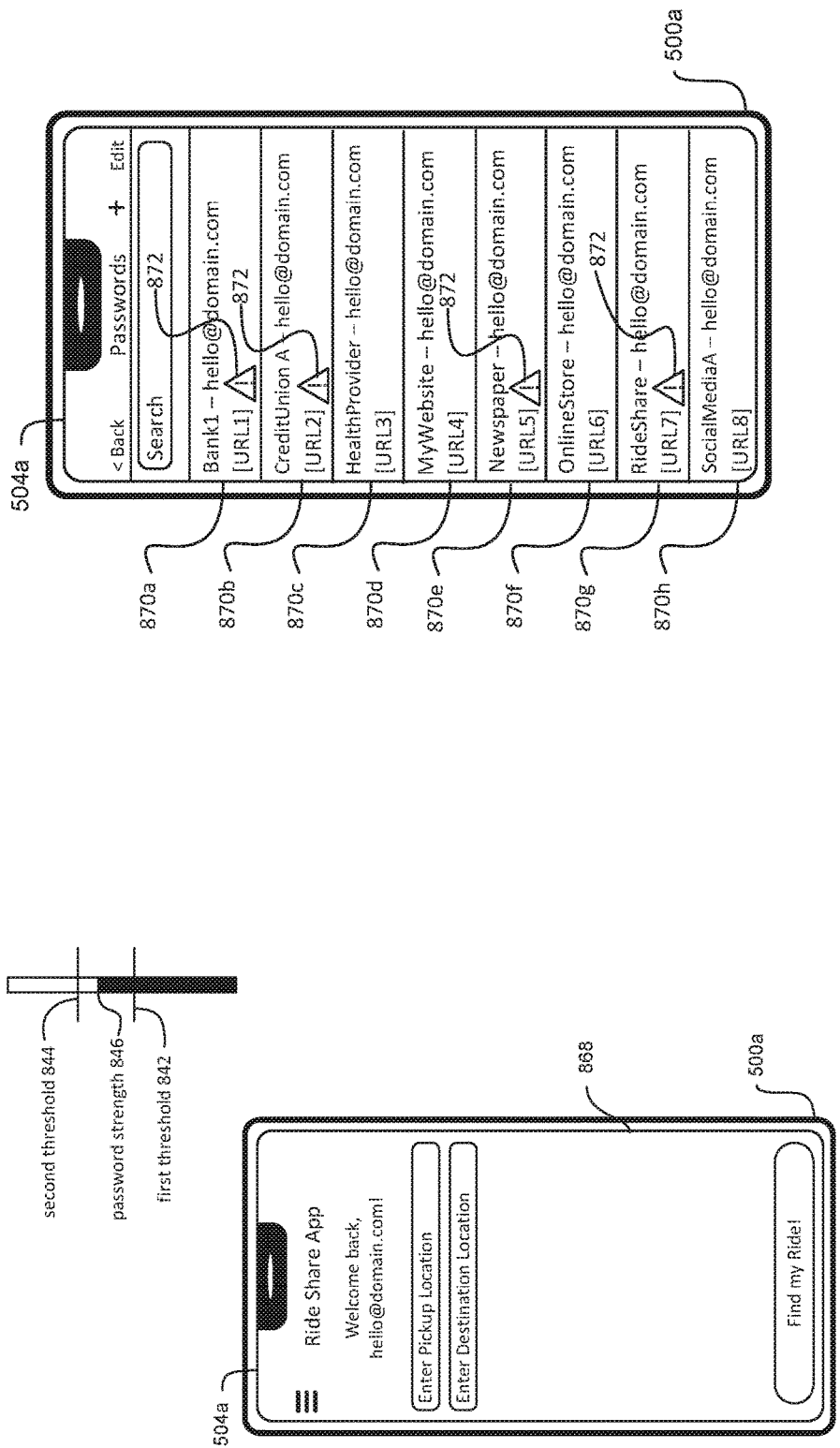

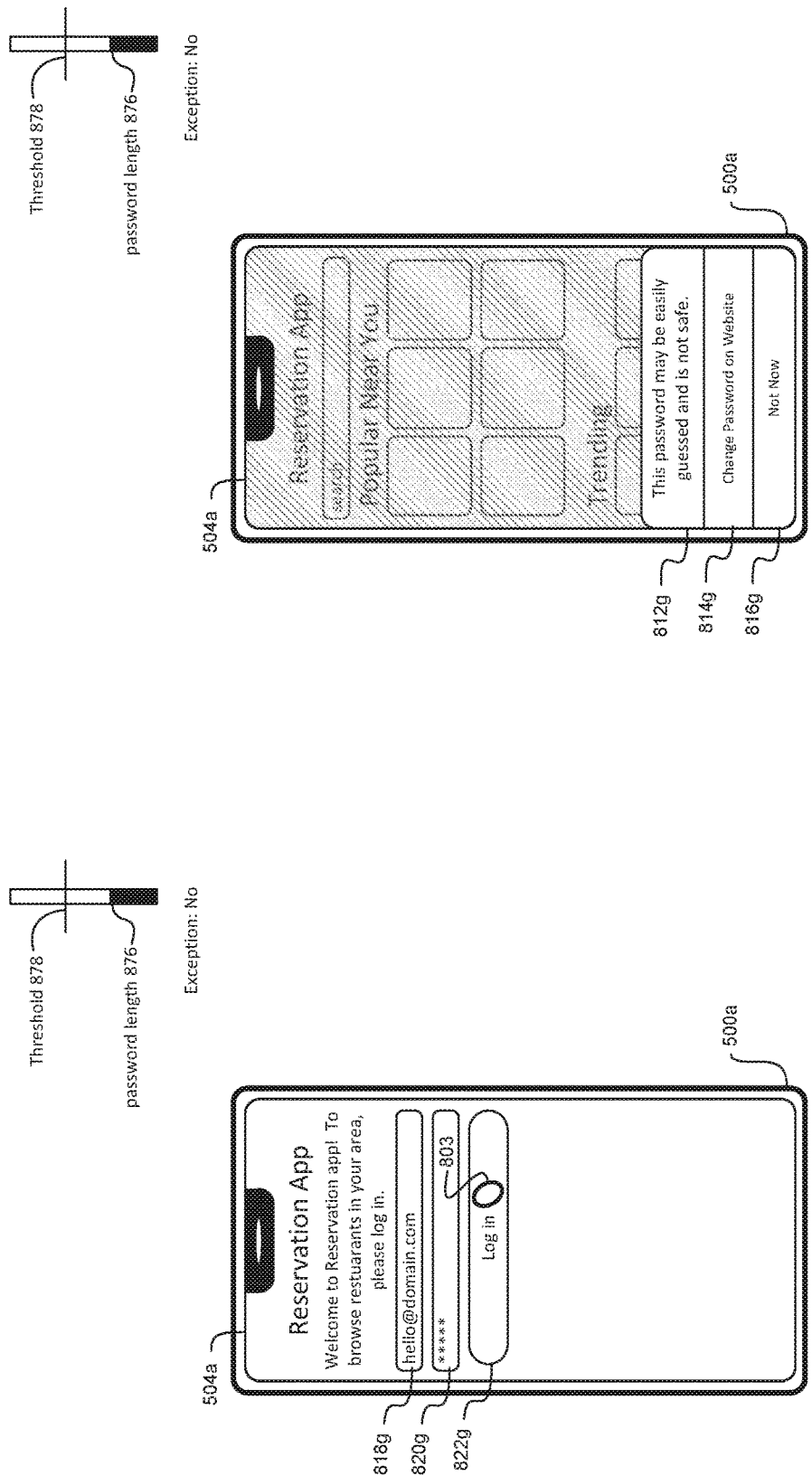

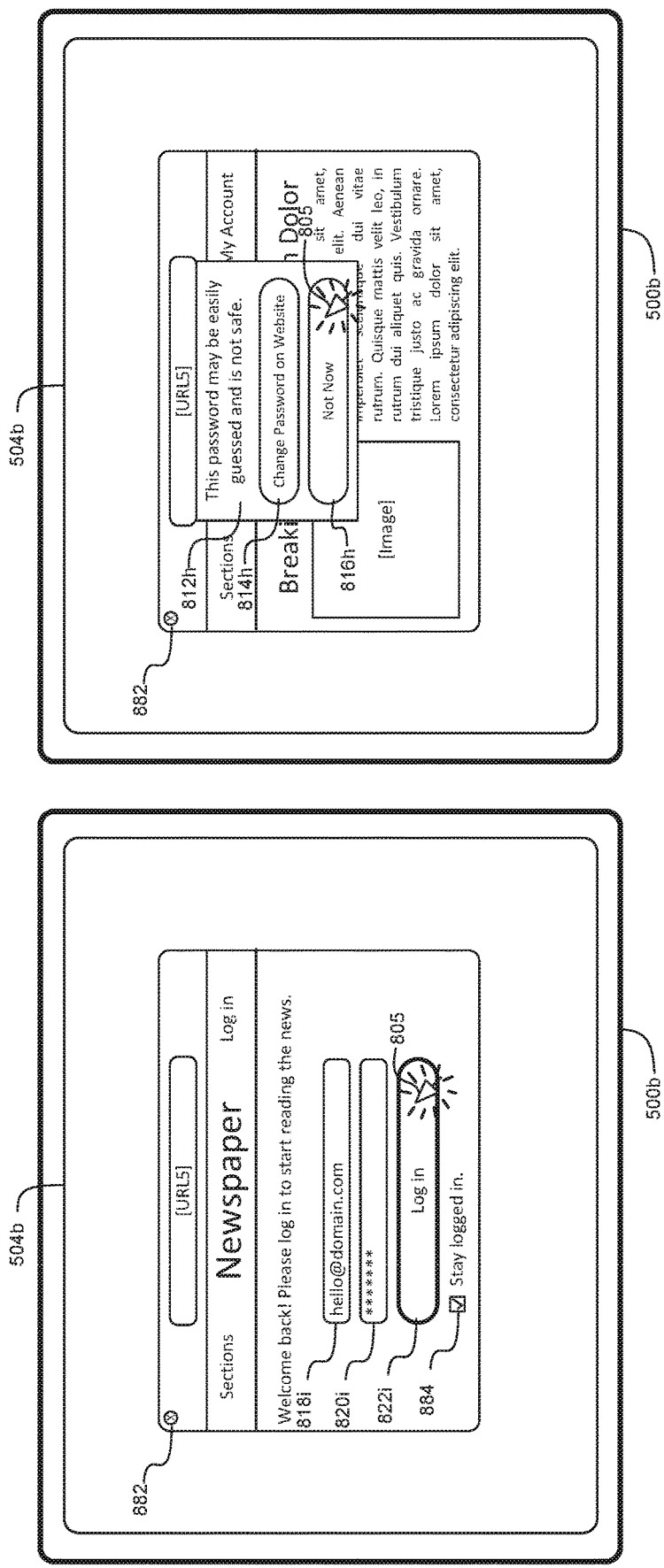

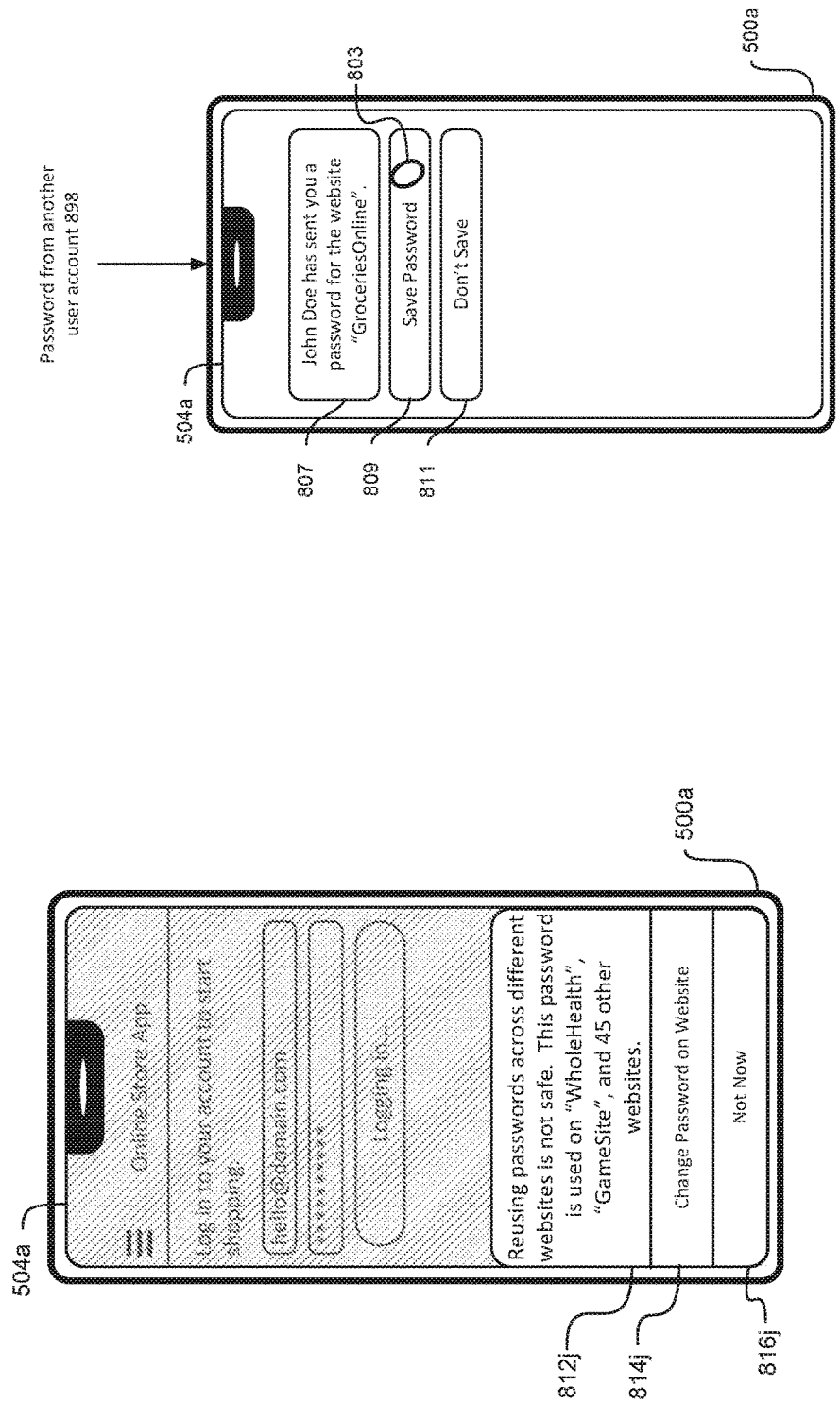

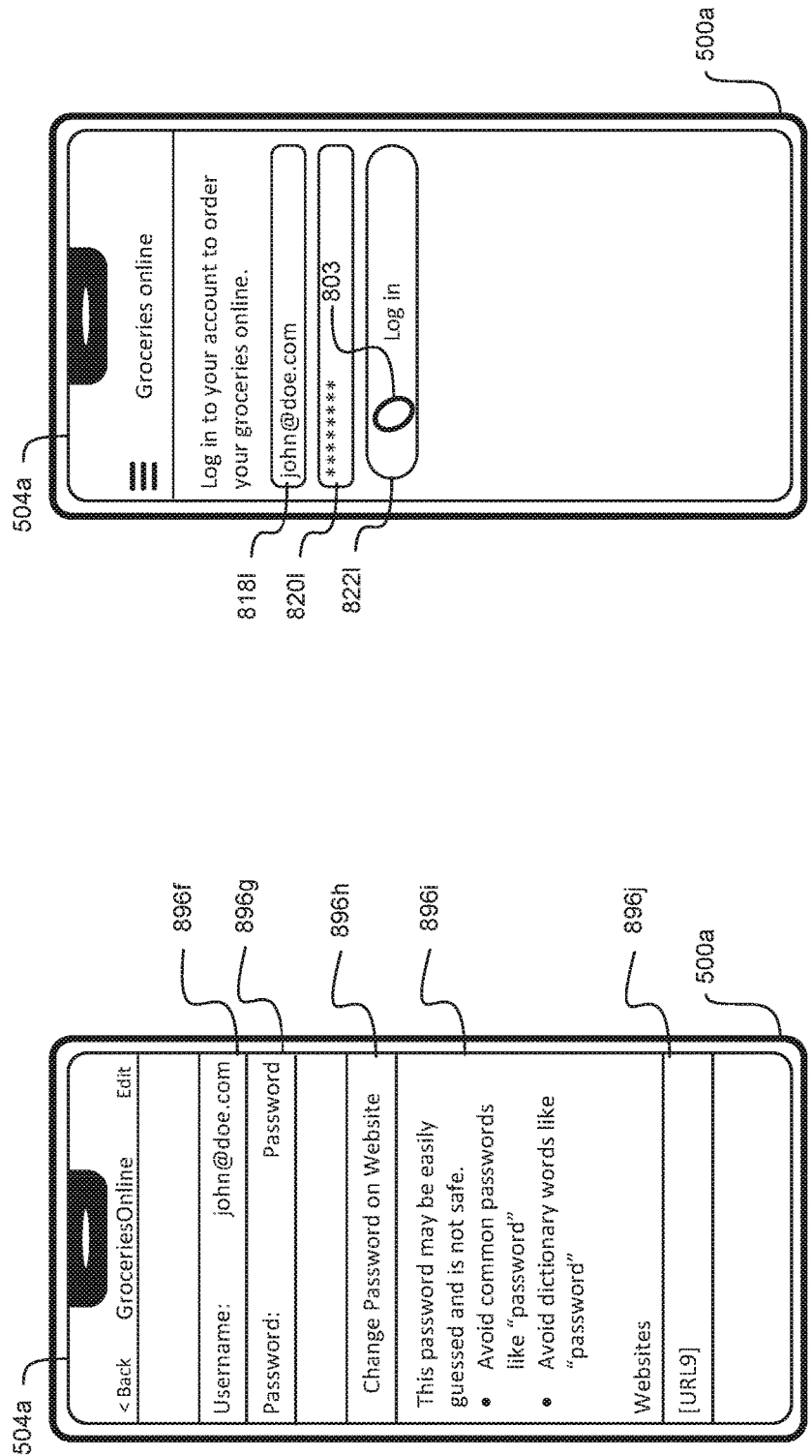

USER INTERFACES FOR MANAGING USER ACCOUNT PASSWORDS

CROSS-REFERENCE TO RELATED APPLICATIONS

This application claims the benefit of U.S. Provisional Application No. 62/856,011, filed Jun. 1, 2019, which is hereby incorporated by reference in its entirety for all purposes.

FIELD OF THE DISCLOSURE

This relates generally to electronic devices that display user interfaces for managing and updating passwords associated with user accounts, and user interactions with such devices.

BACKGROUND

User interaction with electronic devices has increased significantly in recent years. These devices can be devices such as computers, tablet computers, televisions, multimedia devices, mobile devices, and the like.

In some circumstances, users interact with devices to manage passwords for their user accounts. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to one or more electronic devices that display a warning identifying a portion of a user account password that exhibits a weakness and identifying the type of weakness exhibited by the portion of the password. Some embodiments described in this disclosure are directed to one or more electronic devices that present warnings of weakness of a respective password in response to detection of logging into a user account using the respective password.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Description of Embodiments

Figure 1A:
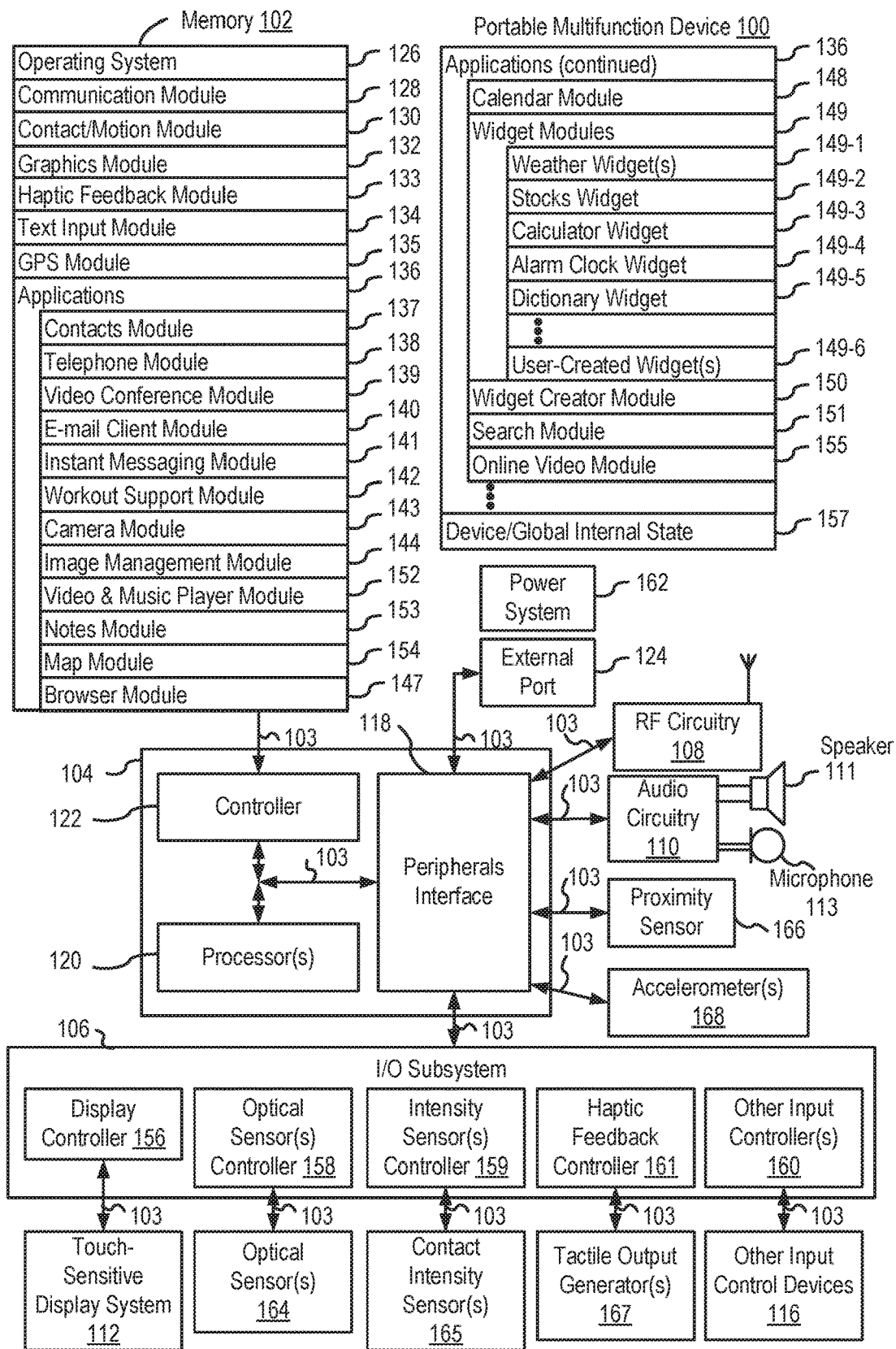
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that evaluate the weakness of user account passwords. Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
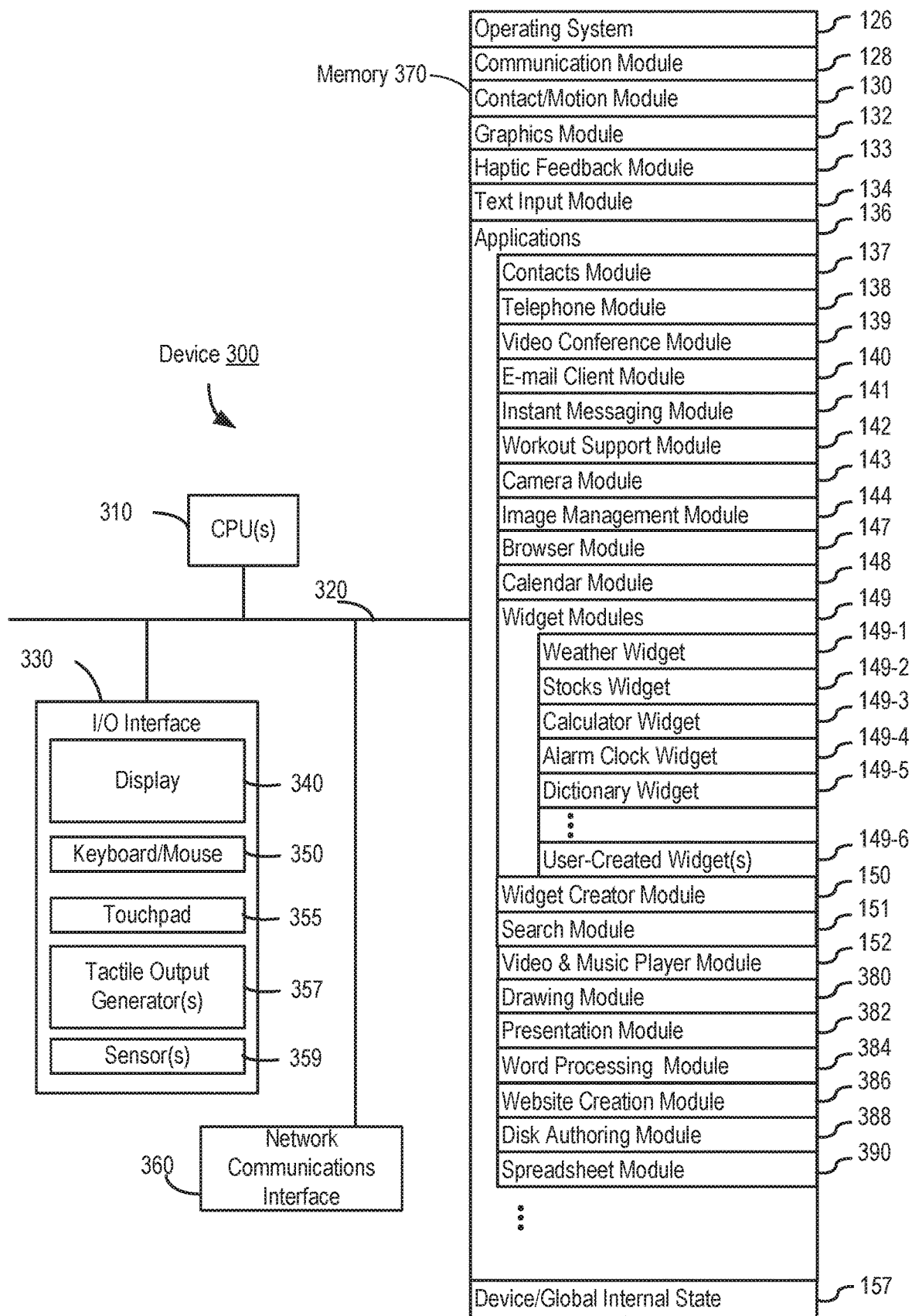
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
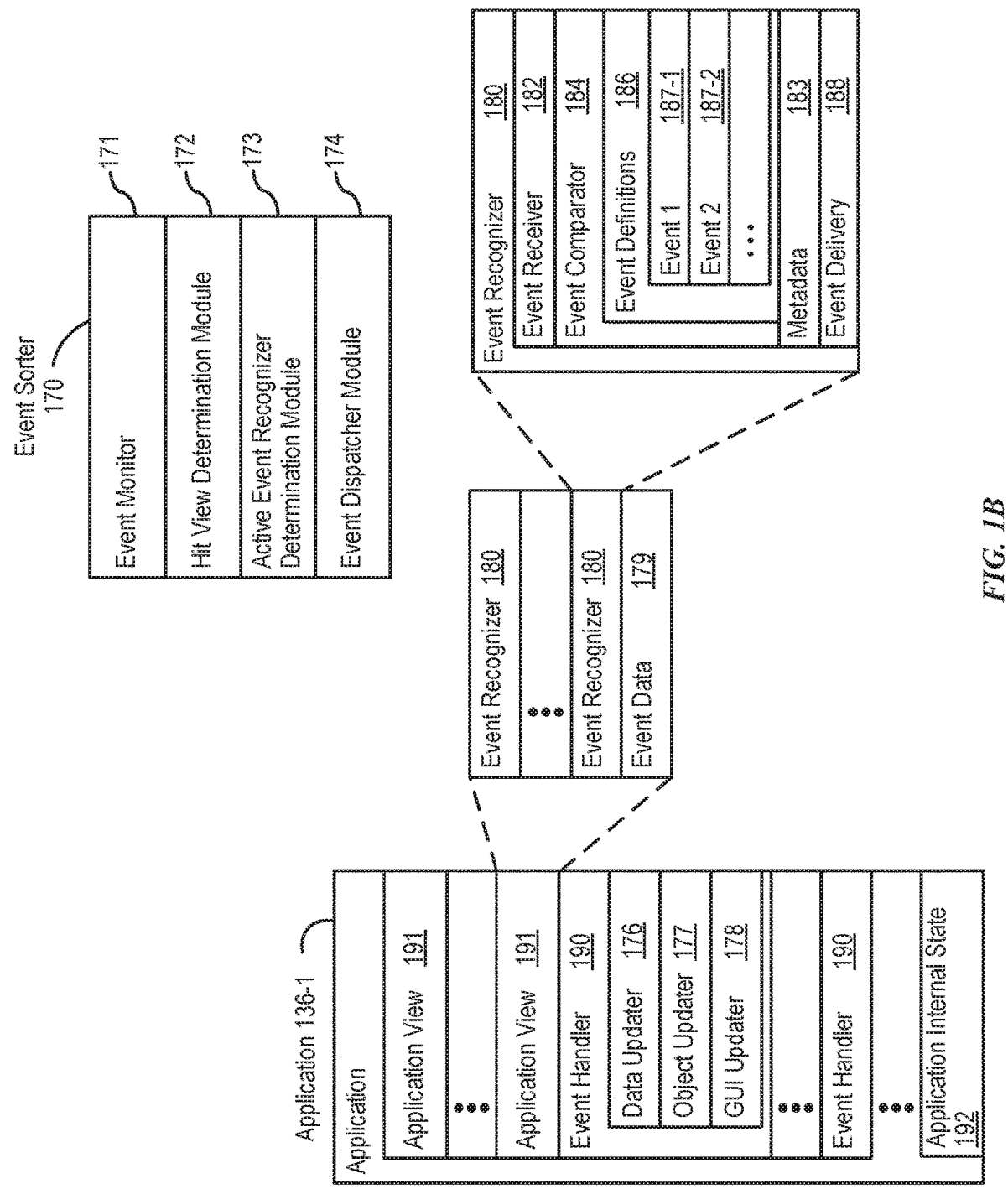
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
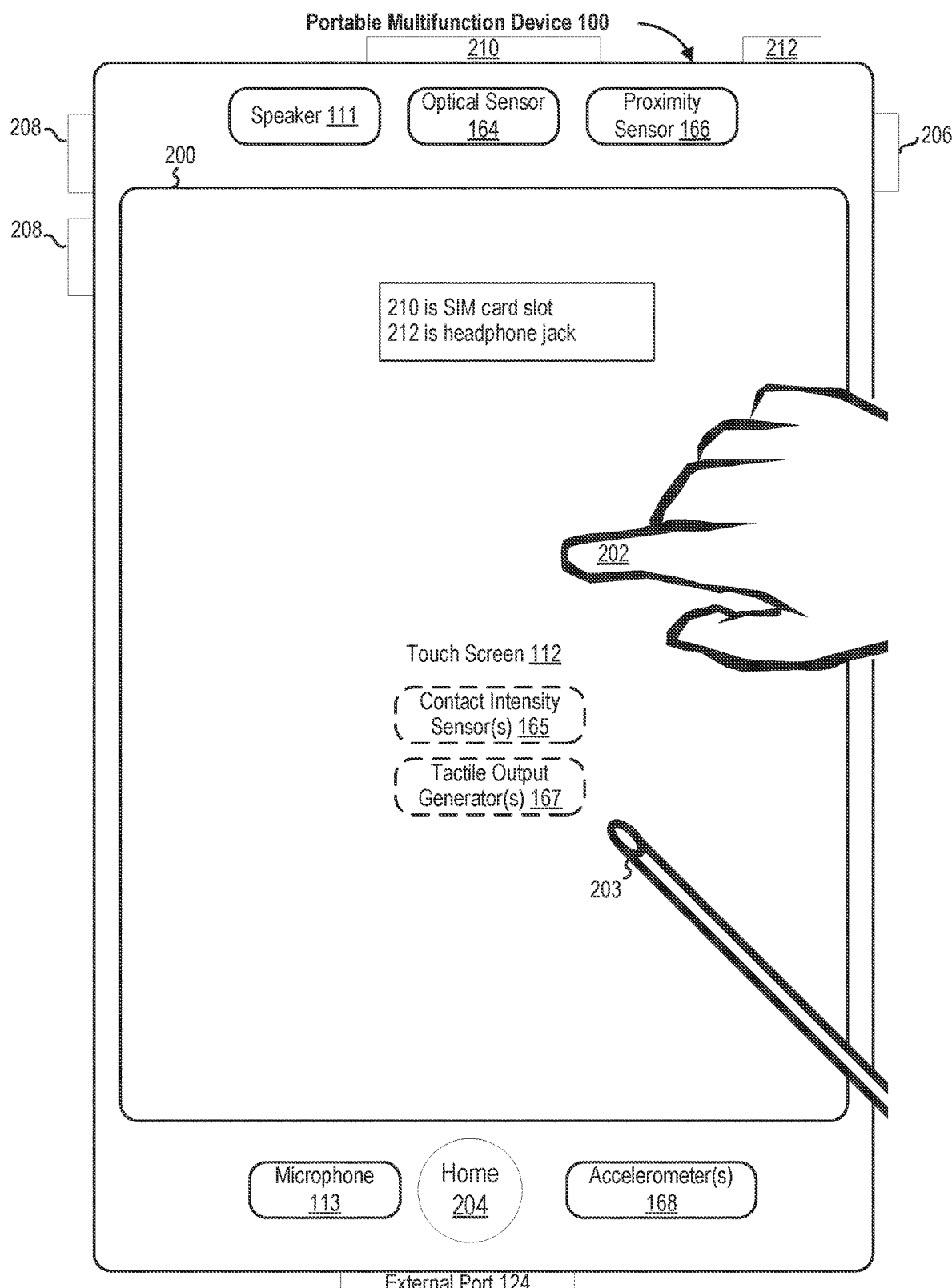
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
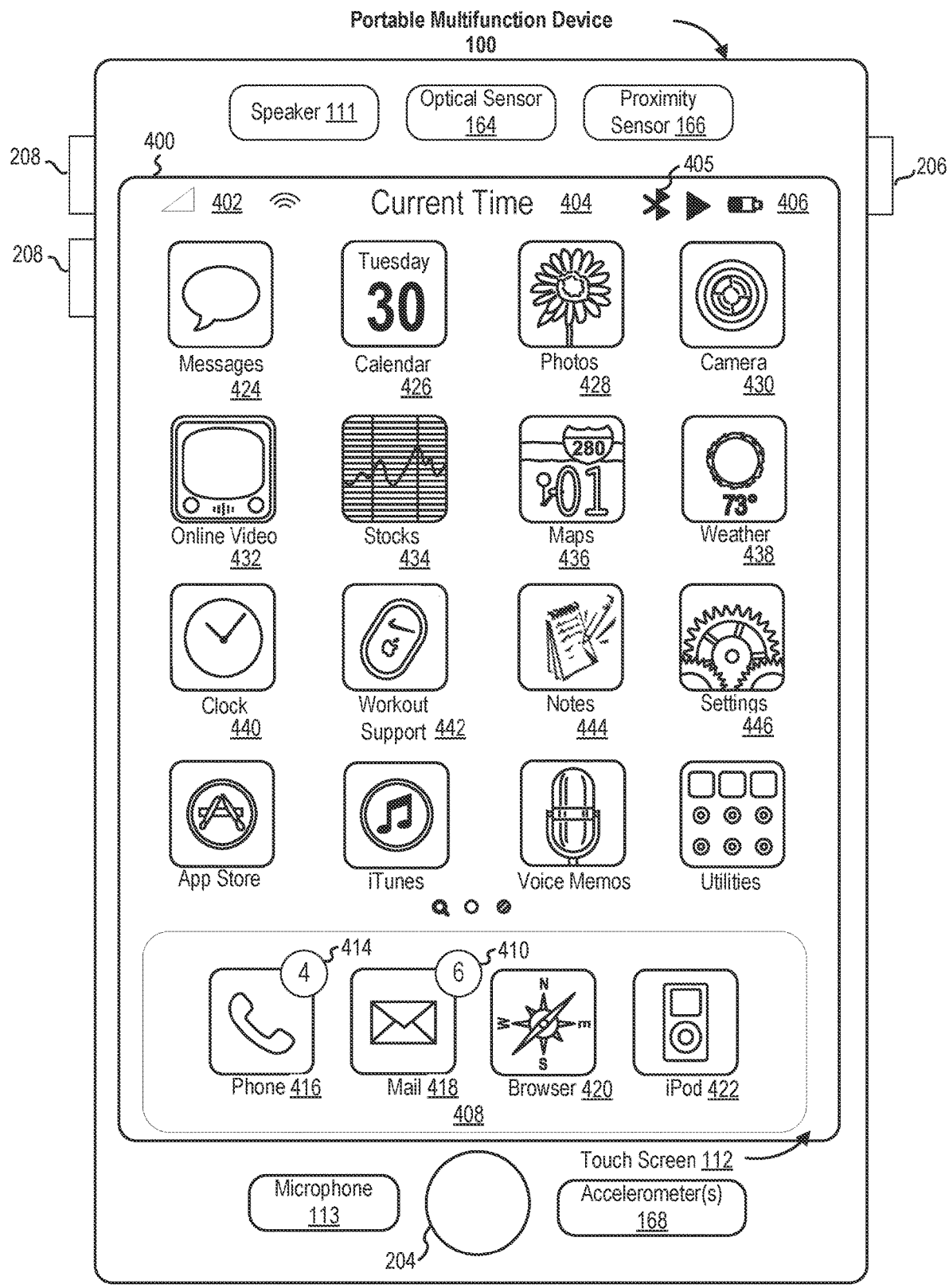
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
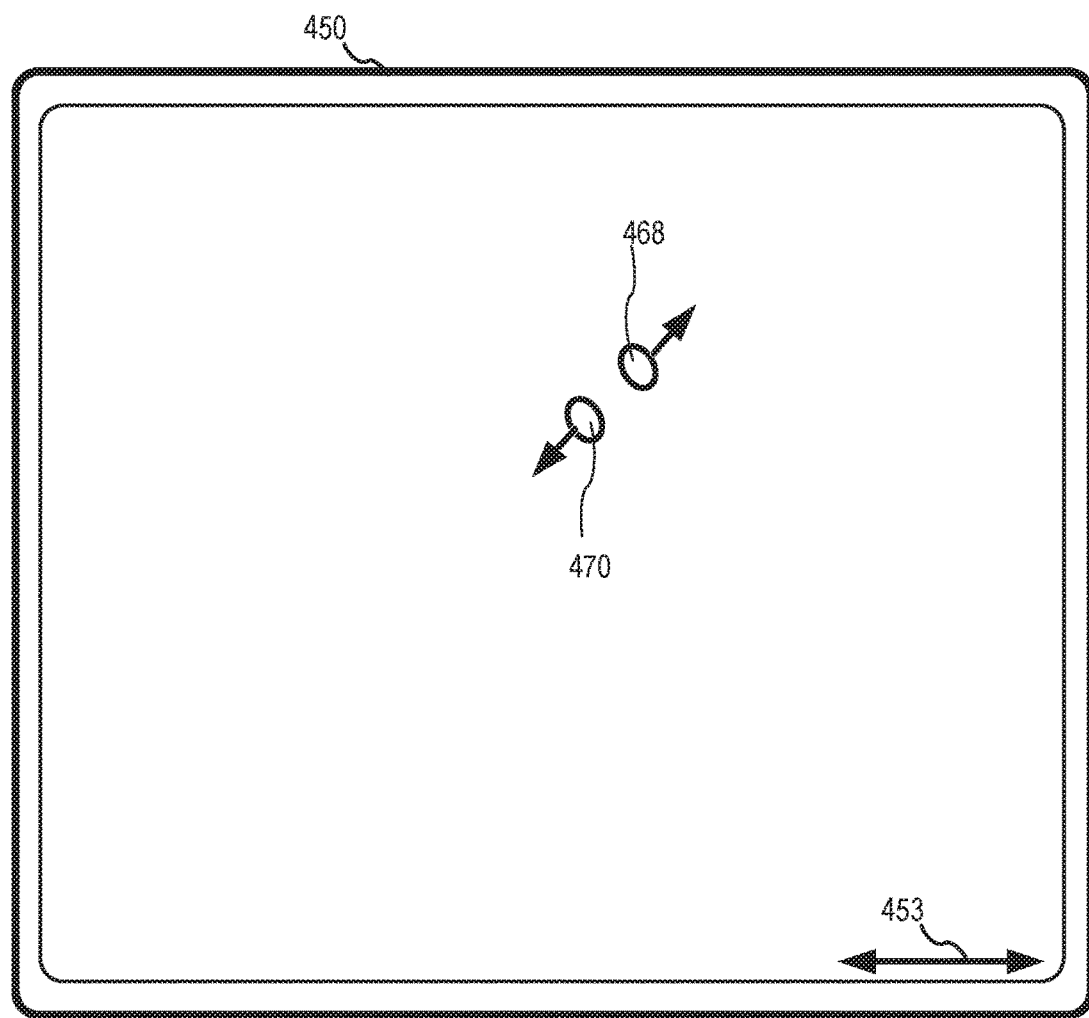
FIG. 4B illustrates an exemplary user interface for a multifunction device with a touch-sensitive surface that is separate from the display in accordance with some embodiments.
Figure 4B:
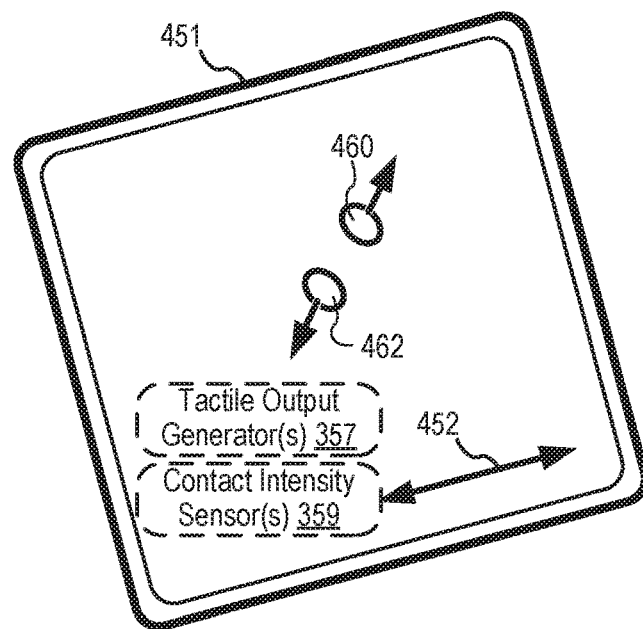

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
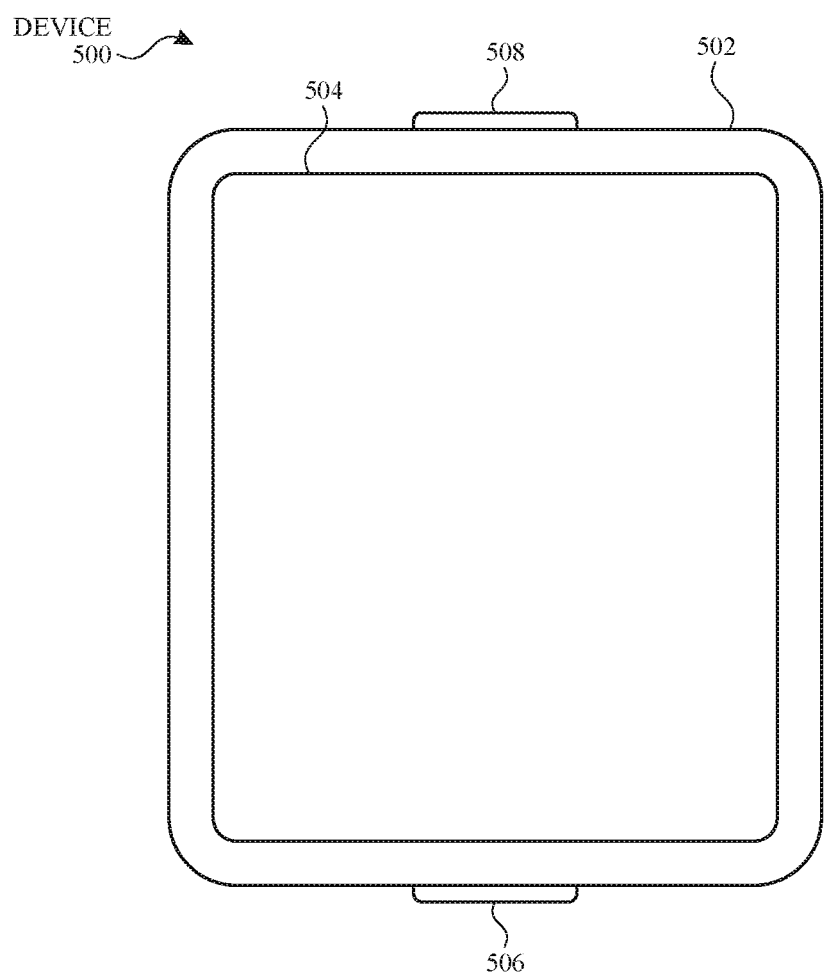
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
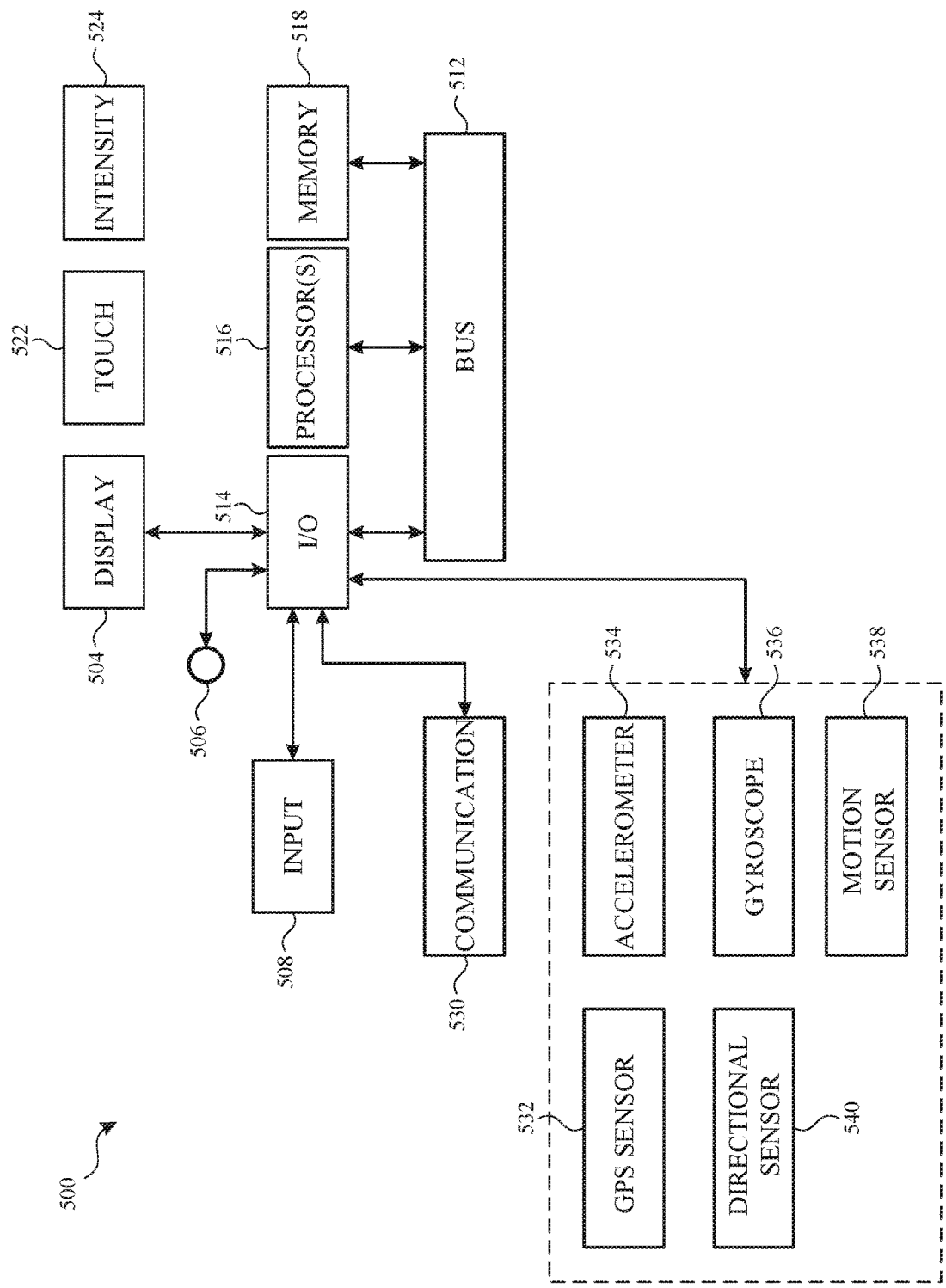
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
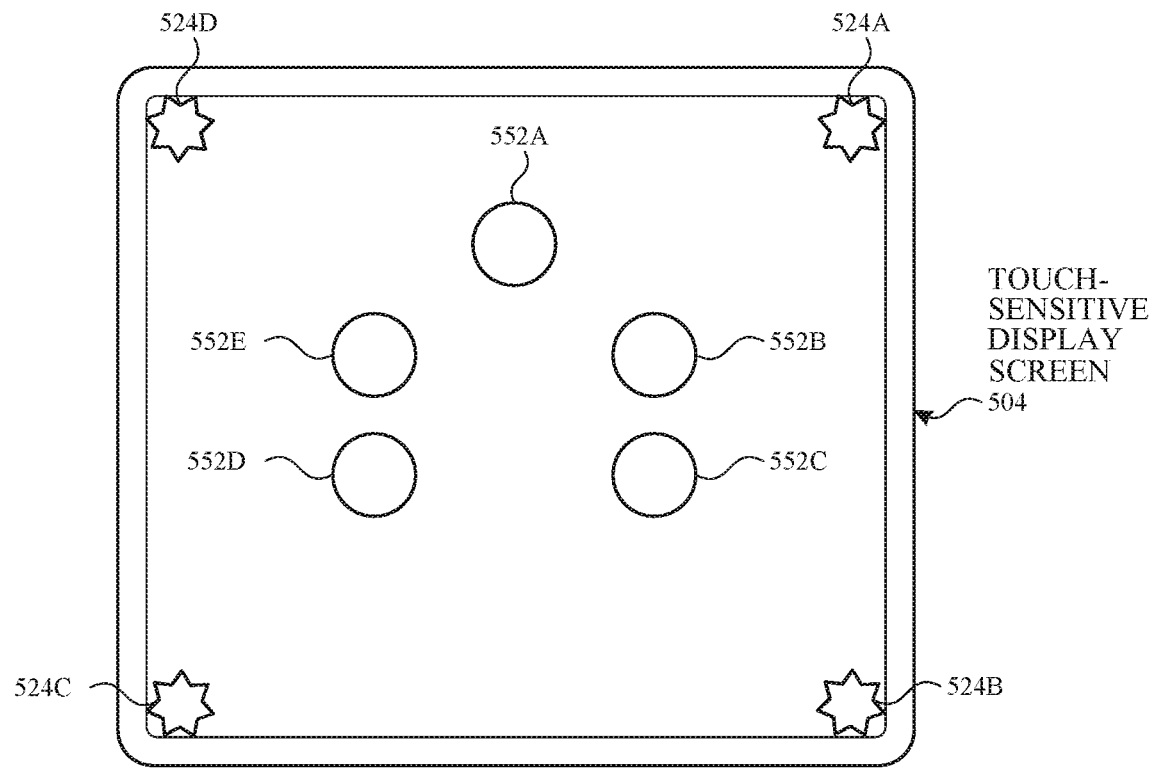
FIGS. 5C-5D illustrate exemplary components of a personal electronic device having a touch-sensitive display and intensity sensors in accordance with some embodiments.
Figure 5C:
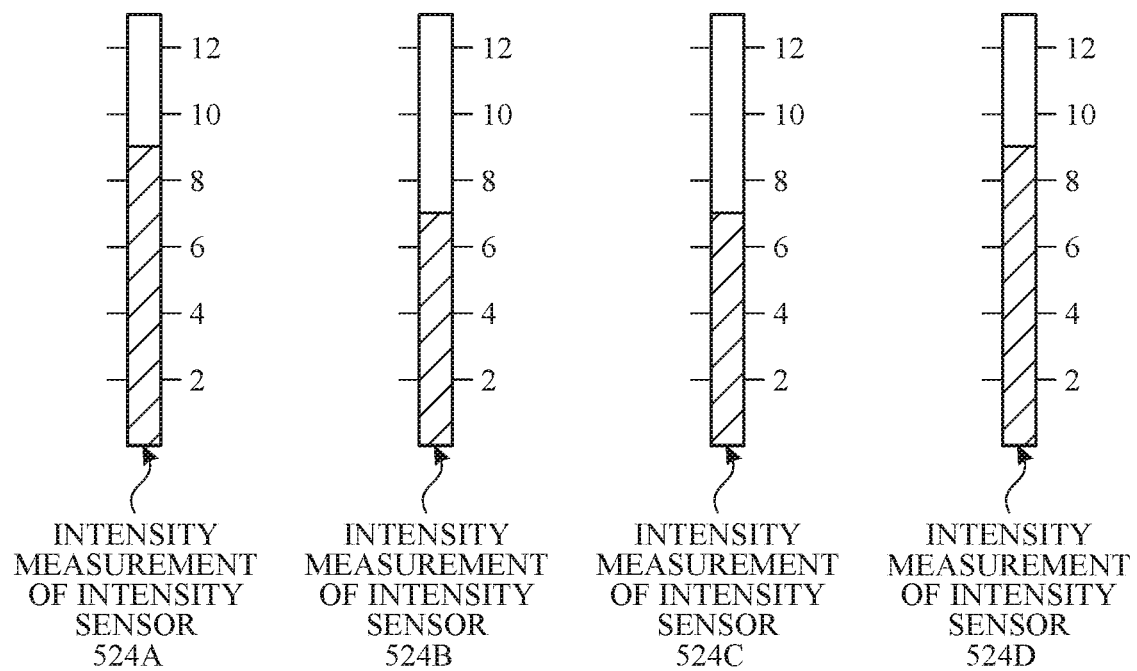
Figure 5D:
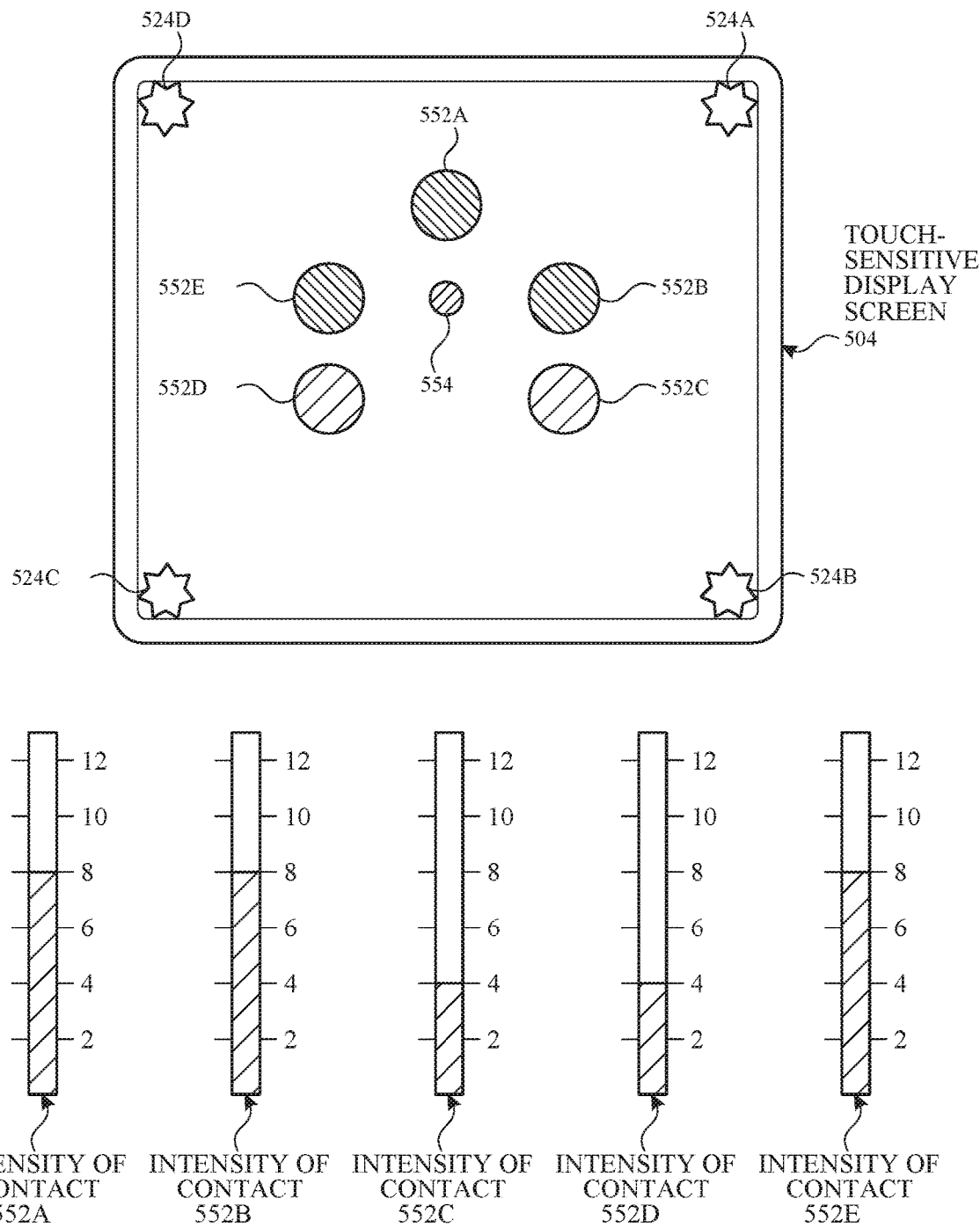

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
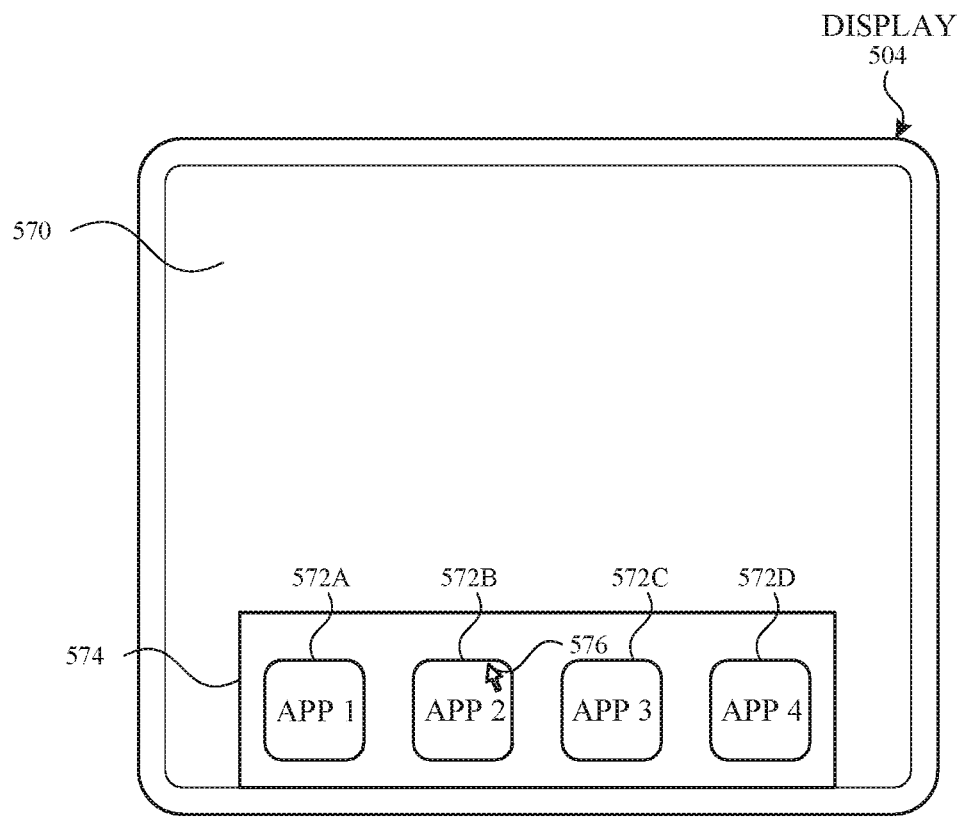
FIGS. 5E-5H illustrate exemplary components and user interfaces of a personal electronic device in accordance with some embodiments.
Figure 5E:
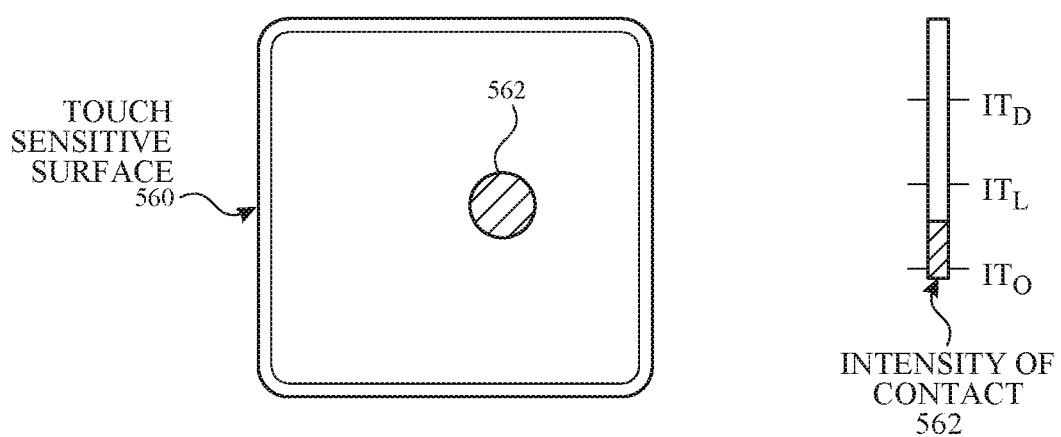
Figure 5F:
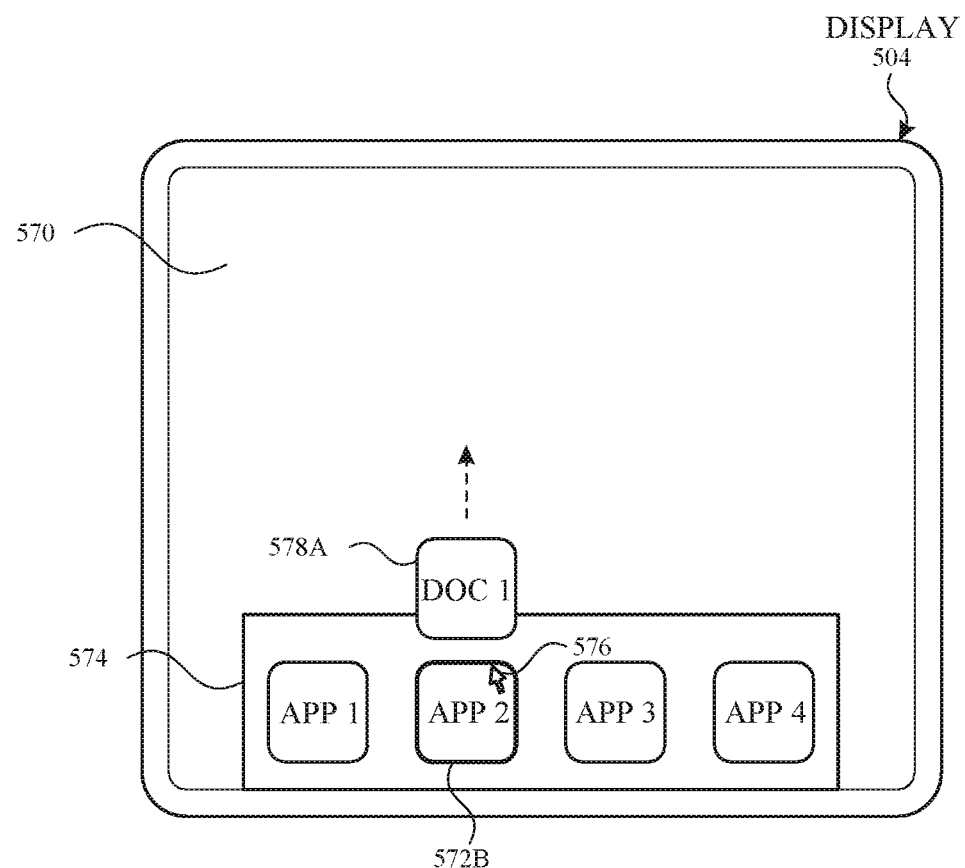
Figure 5F:
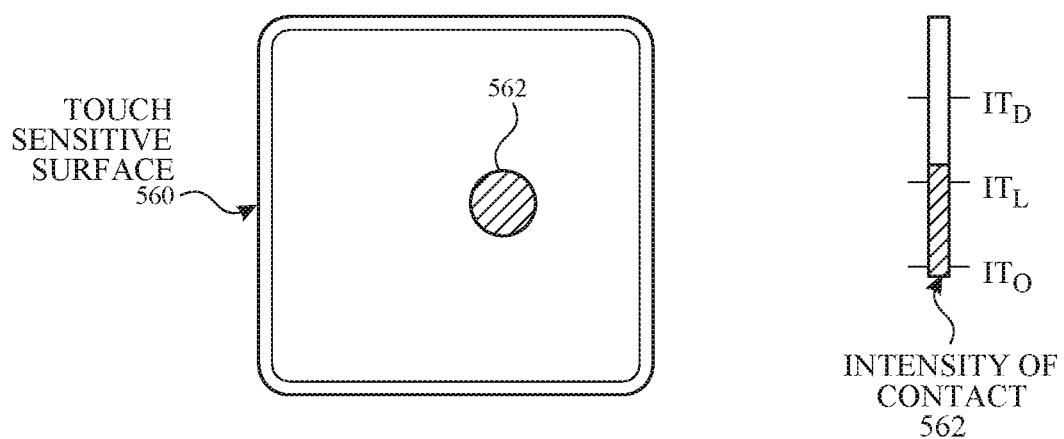
Figure 5G:
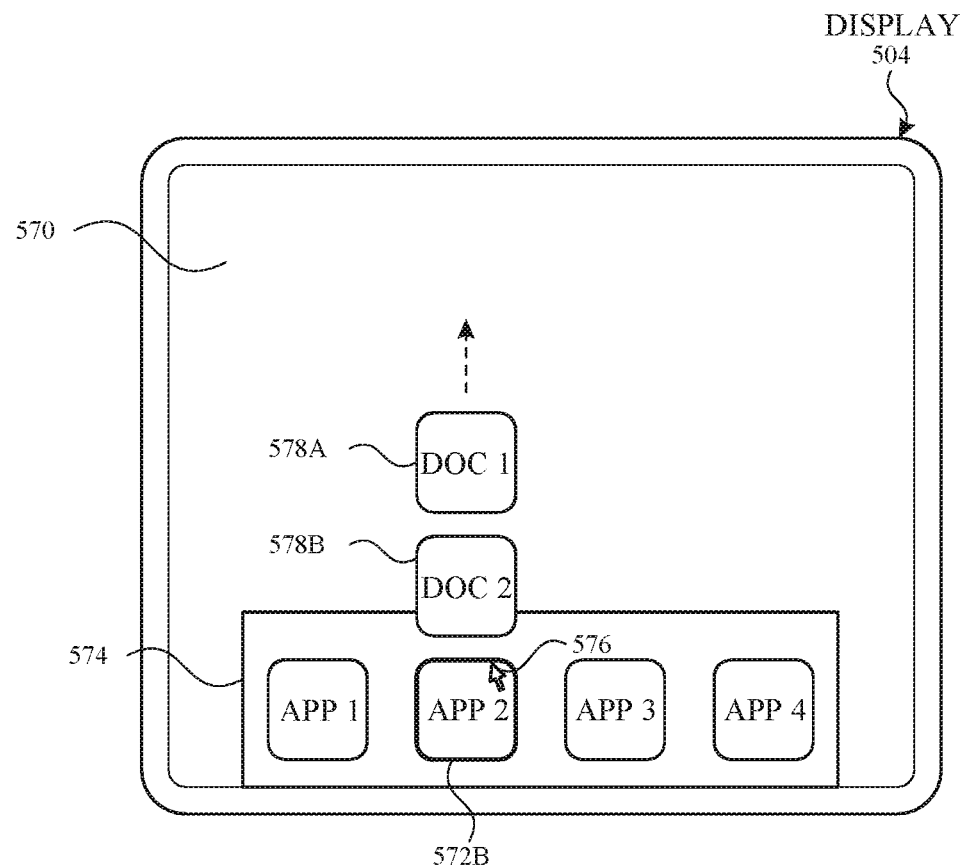
Figure 5G:
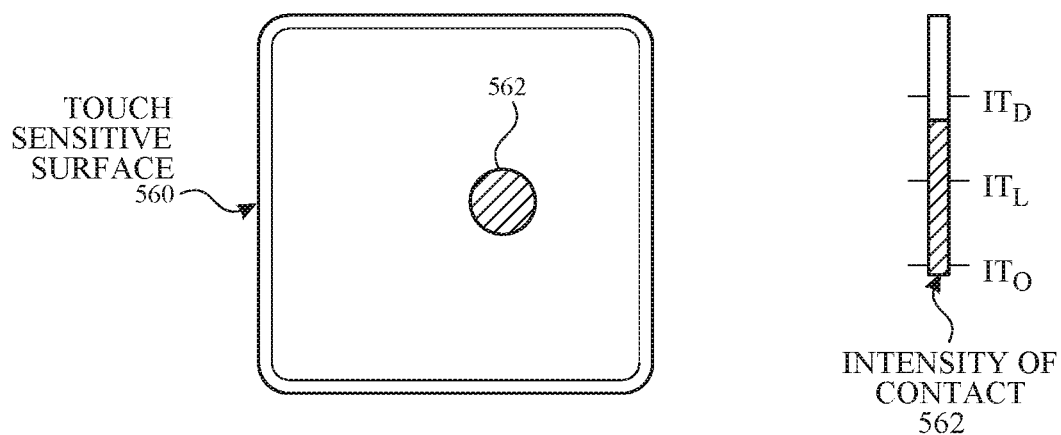
Figure 5H:
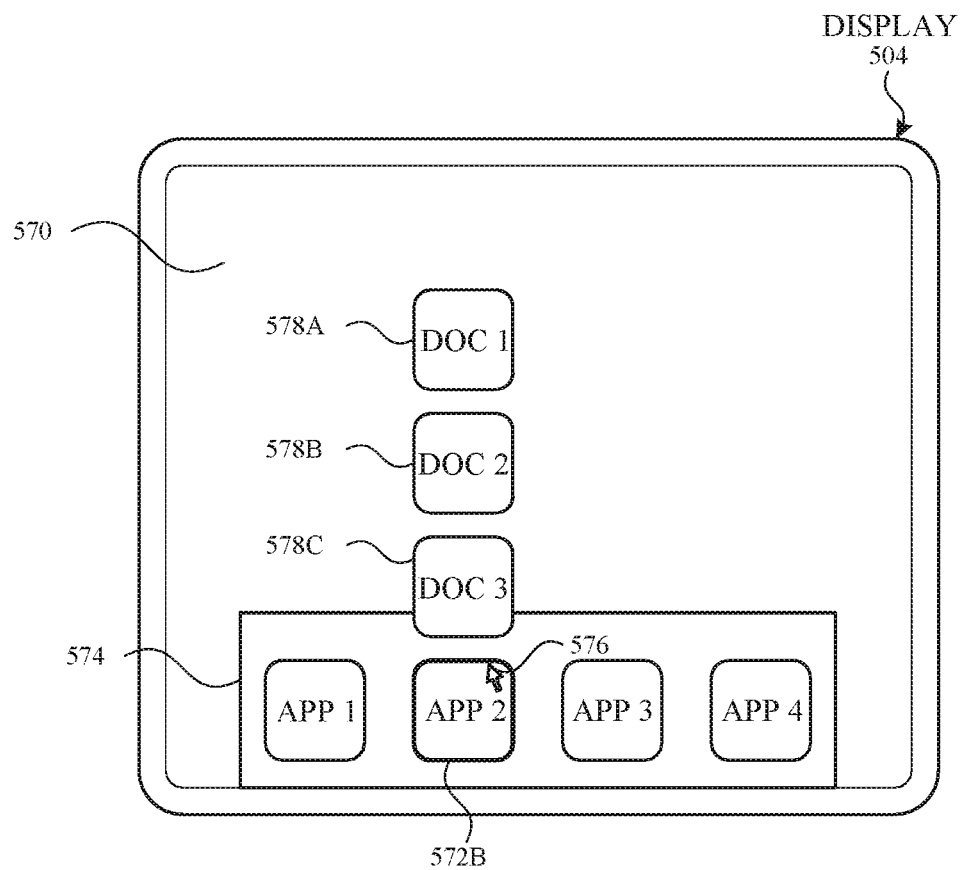
Figure 5H:
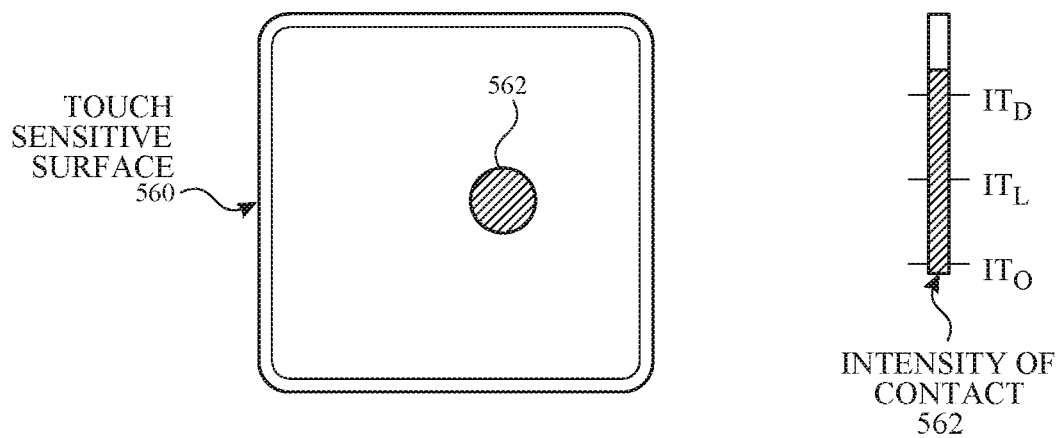

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;
a background application (or background processes), which is not currently displayed, but one or more processes for the application are being processed by one or more processors; and
a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Presenting Weak Password Warnings in a Password Management User Interface

Users interact with electronic devices in many different manners, including storing passwords associated with one or more user accounts. The embodiments described below provide ways in which an electronic device evaluates the strength of a password associated with a user account and presents a warning in a password management user interface if the password is weak. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6GG illustrate exemplary ways in which an electronic device 500a or 500b presents a weak password warning in a user interface that includes information about the account with which the password is associated in accordance with some embodiments of the disclosure. The embodiments in these figures are used to illustrate the processes described below, including the processes described with reference to FIGS. 7A-7F.

Although one or more operations are illustrated as being performed by one of the electronic devices 500a and 500b, it should be understood that both electronic devices 500a and 500b are generally able to perform all of the operations illustrated herein. That is to say that electronic device 500a is capable of performing operations illustrated as being performed by electronic device 500b, and vice-versa.

Figure 6B:
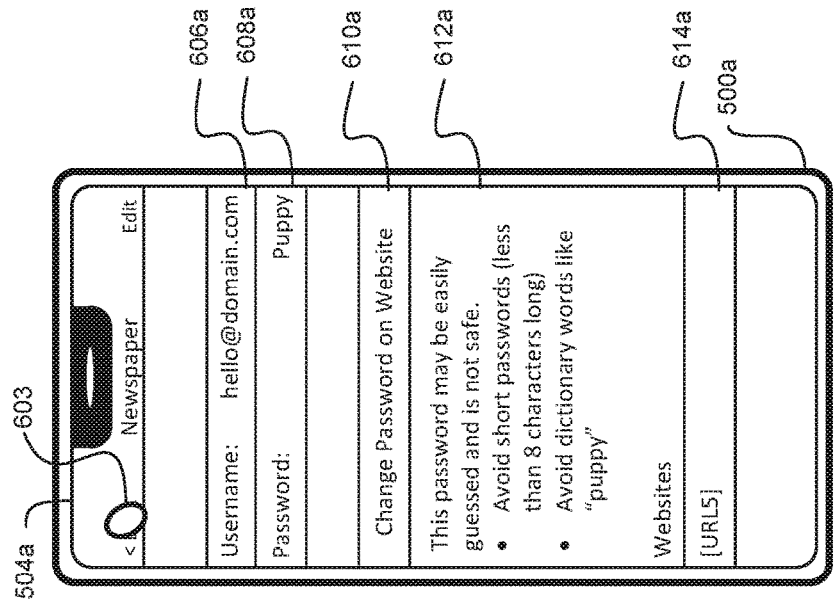
FIGS. 6A-6GG illustrate exemplary ways in which an electronic device presents a weak password warning in a user interface that includes information about the account with which the password is associated in accordance with some embodiments of the disclosure.
Figure 6A:
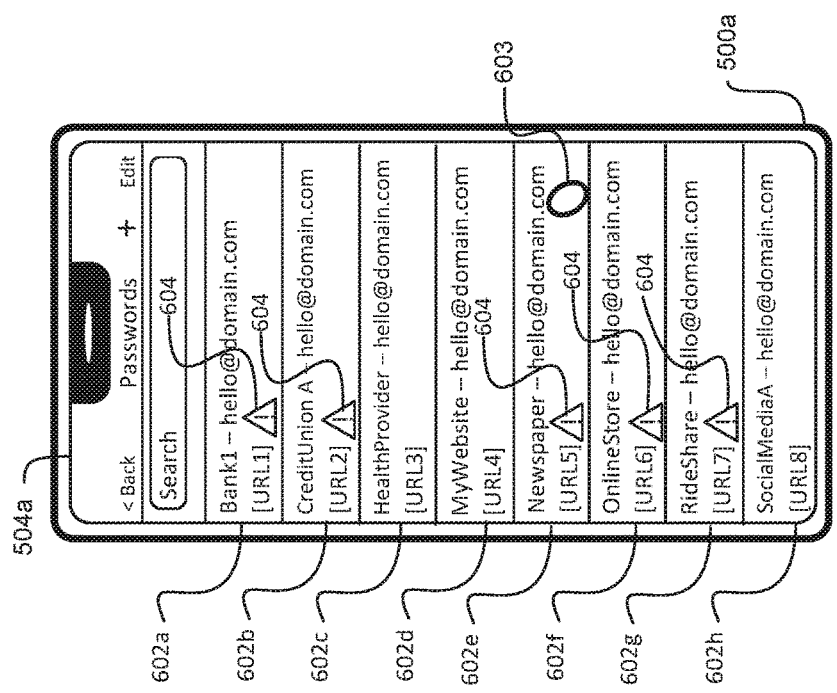

FIG. 6A illustrates a password management user interface. In some embodiments, the electronic device 500a saves login information for one or more user accounts and presents the login information in the password management user interface. In some embodiments, the password management user interface is generated by a password manager of the electronic device. Optionally, a password manager program or feature of another program or of the operating system of the electronic device is able to store the login information for one or more user accounts and fill in the user account information in one or more login user interfaces. In some embodiments, the password manager fills in the user account login information in response to detecting authentication of the user (e.g., biometric authentication, facial recognition, entry of a password or passcode associated with a user account that accesses the electronic device).

As shown in FIG. 6A, the password management user interface includes representations 602a-h of a plurality of user accounts for which login information is stored by the electronic device 500a or a user account of the electronic device 500a. Each representation 602 includes an indication of the website or application with which the user account is associated and the username (e.g., email address) associated with each user account. Some of the representations 602a, 602b, 602e, 602f, and 602g include a weak password indication 604 that indicates that the password is weak according to one or more criteria (e.g., the password fails to satisfy one or more strong password criteria). Although the weak password indications 604 illustrated in FIG. 6A are displayed to the right of the URLs associated with each user account, in some embodiments, the weak password indications 604 are displayed to the left of the URLs or next to the name of the website and username displayed above the URLs, or anywhere else in association with the user account representations in the user interface. In FIG. 6A, the user selects (e.g., with contact 603) one of the representations 602e of a user account.

FIG. 6B illustrates a user interface including information about a user account that is presented in response to the user's selection illustrated in FIG. 6A. As shown in FIG. 6B, the user interface includes an indication 606a of a username associated with the user account, an indication 608a of a password associated with the user account, a selectable option 610a that, when selected, causes the electronic device 500a to present a webpage of the website associated with the user account at which the user is able to change the password or a webpage (e.g., the homepage of the website) from which the user is able to navigate to a page at which to change the password, an indication 612a of why the password is weak, and an indication 614a of the website associated with the user account. As shown in FIG. 6B, the indication 612a of why the password is weak includes specific reasons why the password is weak, including the length of the password and the use of a dictionary word in the password. The indication 612a of why the password is weak references a specific portion of the password, such as indicating that the word "puppy" is a dictionary word. The electronic device 500a warns the user about the length of the password because the password is shorter than a predetermined number of characters associated with a strong password, but does not have a length that corresponds to a PIN or passcode (e.g., 4 or 6 characters). In some embodiments, the electronic device 500a does not present specific reasons why the password is weak and merely indicates that the password is weak.

As shown in FIG. 6B, the user selects (e.g., with contact 603) an option to navigate backward in the user interface. In response to the user's selection, the electronic device presents the password management user interface illustrated in FIG. 6C. In FIG. 6C, the user selects (e.g., with contact 603) a representation 602b of another user account.

Figure 6D:
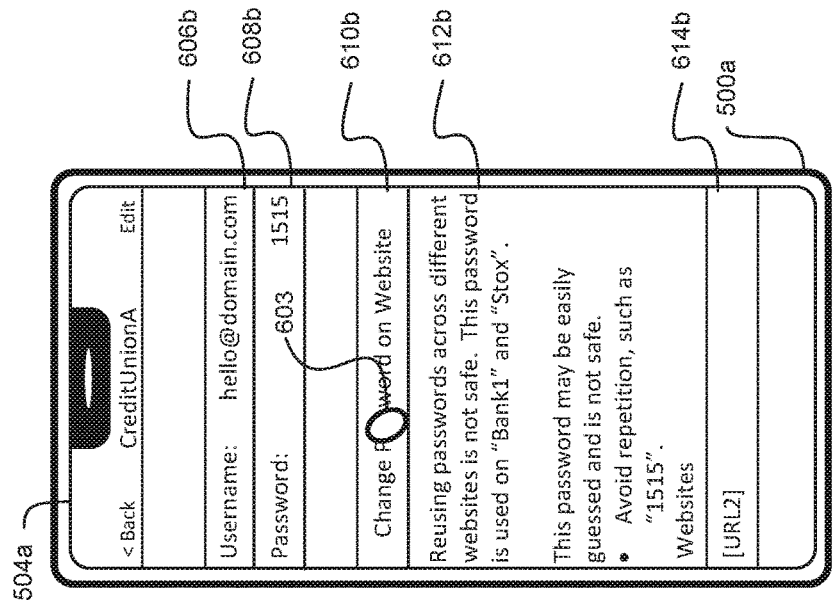
Figure 6C:
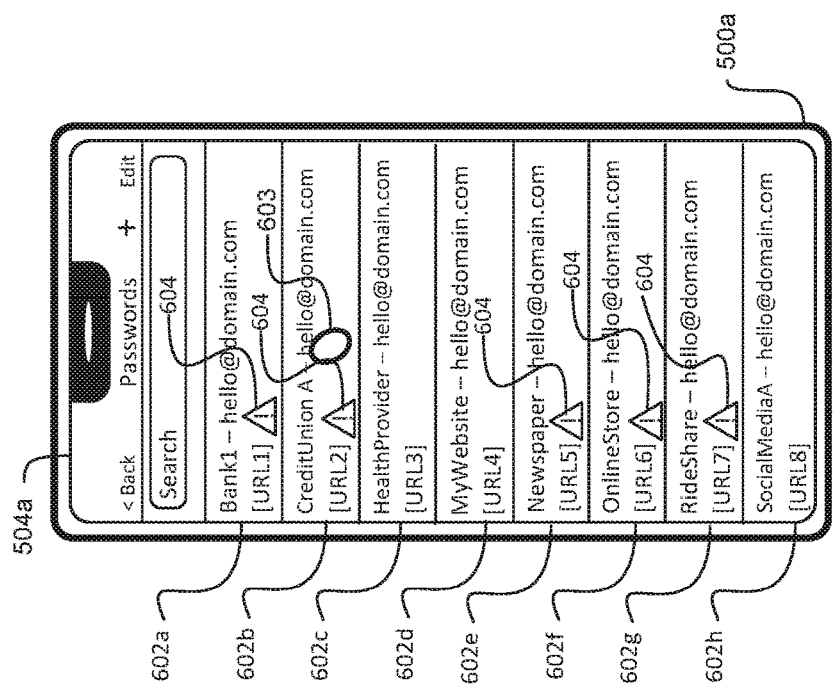

FIG. 6D illustrates a user interface including information about a user account that is presented in response to the user's selection illustrated in FIG. 6C. As shown in FIG. 6D, the user interface includes an indication 606b of a username associated with the user account, an indication 608b of a password associated with the user account, a selectable option 610b that, when selected, causes the electronic device 500a to present a webpage of the website associated with the user account at which the user is able to change the password or a webpage (e.g., the homepage of the website) from which the user is able to navigate to a page at which to change the password, an indication 612b of why the password is weak, and an indication 614b of the website associated with the user account. As shown in FIG. 6D, the indication 612b of why the password is weak includes specific reasons why the password is weak, including the reuse of the password for multiple websites and because the password includes the repetitive sequence "1515". The indication 612b of why the password is weak references the specific part of the password, such as the sequence "1515", that exhibits the weakness and explains why that portion of the password is weak. The electronic device 500a does not warn the user about the length of the password even though the password has fewer characters than a threshold number of characters associated with a strong password because the password has a length that corresponds to a PIN or passcode (e.g., 4 or 6 characters).

As shown in FIG. 6D, the user selects (e.g., with contact 603) the option 610b to change the password. In response to the user's selection, the electronic device 500a presents a webpage from which the user is able to change the password of the user account, as shown in FIG. 6E. The webpage is presented in an internet browser application. The webpage includes a field 616a in which the user is able to enter the user name of the user account, a field 618a in which the user is able to enter the existing PIN (e.g., password) associated with the user account, a field 620a in which the user is able to enter a new PIN (e.g., password), a field 622a in which the user is able to re-enter and confirm the new PIN, and a selectable option 624a that, when selected, causes the electronic device 500a to submit the new password to change the password. In FIG. 6E, the user selects (e.g., with contact 603) the field 616a for the user name of the user account. After selecting the field 616a, the user is able to enter the user name of the user account into the field.

Figure 6F:
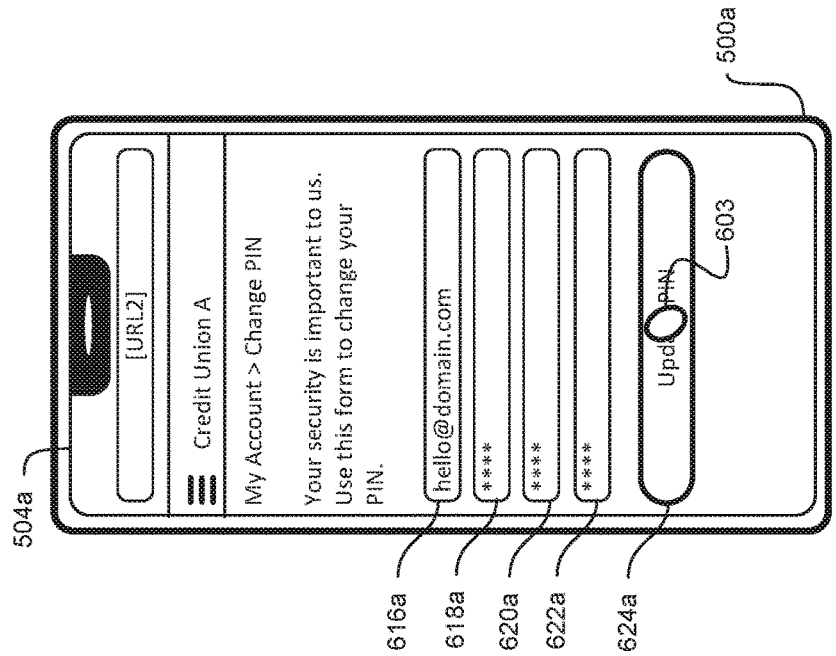
Figure 6E:
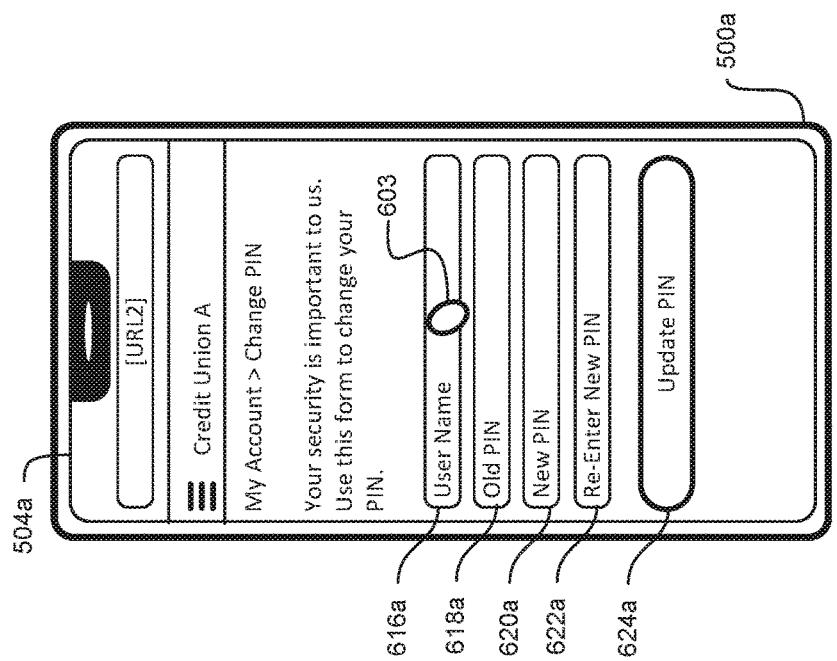
Figure 6H:
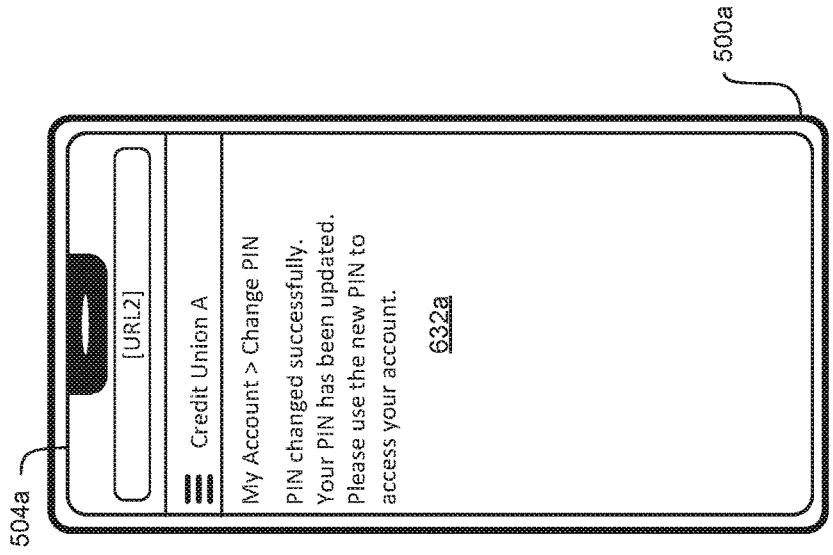
Figure 6G:
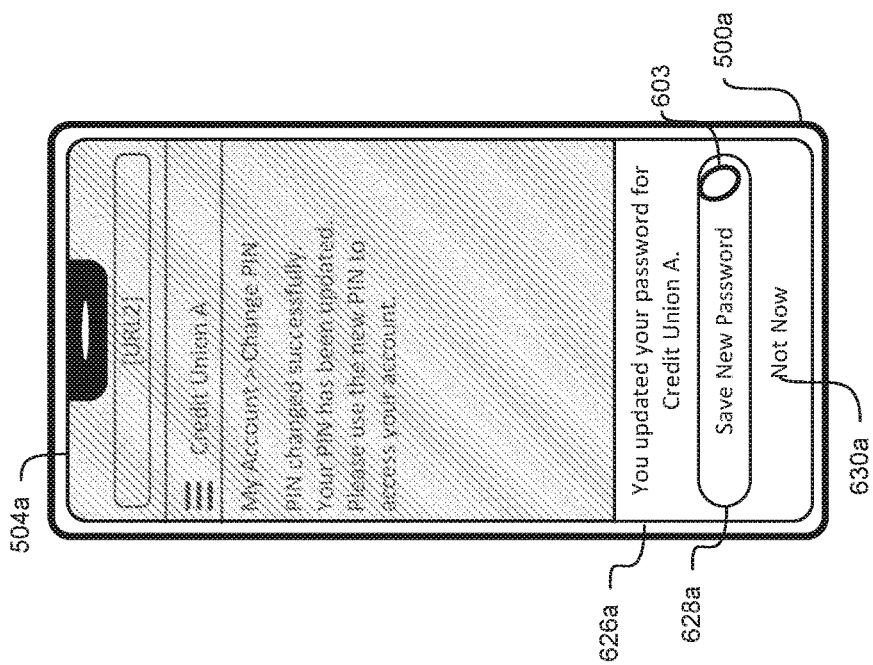

As shown in FIG. 6F, after the user enters the username, old password, and new password into the fields 616a-622a, the user selects (e.g., with contact 603) the option 624a to change the password. As shown in FIG. 6G, in response to detecting that the user updated the password, the electronic device 500a presents an alert 626a informing the user that the password has been changed. The alert 626a includes a selectable option 628a that, when selected, causes the electronic device 500a to save the new password in association with the user account and a selectable option 630a that, when selected, causes the electronic device 500a to dismiss the alert without saving the new password. As shown in FIG. 6G, the user selects (e.g., with contact 603) the option 628a to save the new password.

In response to the user's selection in FIG. 6G, the electronic device 500a ceases displaying the alert 626a and displays a webpage 632a in the internet browser application that confirms that the password of the user account has been changed.

FIGS. 6I-6N illustrate the electronic device 500a presenting warnings about reuse of one password for multiple user accounts for which login information is stored on the electronic device 500a. FIG. 6I illustrates the user interface including user account information for one of the user accounts for which login information is stored by the electronic device. The user interface illustrated in FIG. 6I is described above with reference to FIG. 6D, except the passwords 608b and warnings 612b are different because the password was changed in FIGS. 6D-6H. In particular, in FIG. 6I, the password is weak because the password is used across different websites and/or user accounts (but is otherwise not substantively weak).

As shown in FIG. 6I, the user selects (e.g., with contact 603) the option 610b to navigate to a website at which the user is able to change the password. In response to the user's selection, the electronic device 500a displays the user interface at which the user is able to change the password, as shown in FIG. 6J. The user interface illustrated in FIG. 6J is described above with reference to FIGS. 6E-6F. As shown in FIG. 6J, after entering the account information and new password, the user selects (e.g., with contact 603) the option 624a to change the password. It should be understood that, in some embodiments, the electronic device 500a presents the notification 626a to save the updated password, such as in FIG. 6G, in response to the user's selection in FIG. 6J.

Figure 6L:
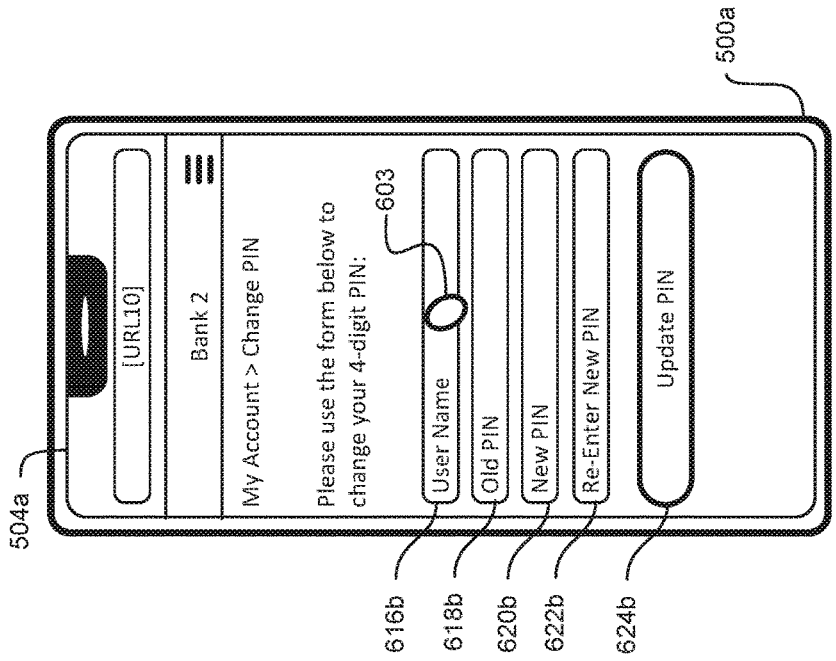
Figure 6K:
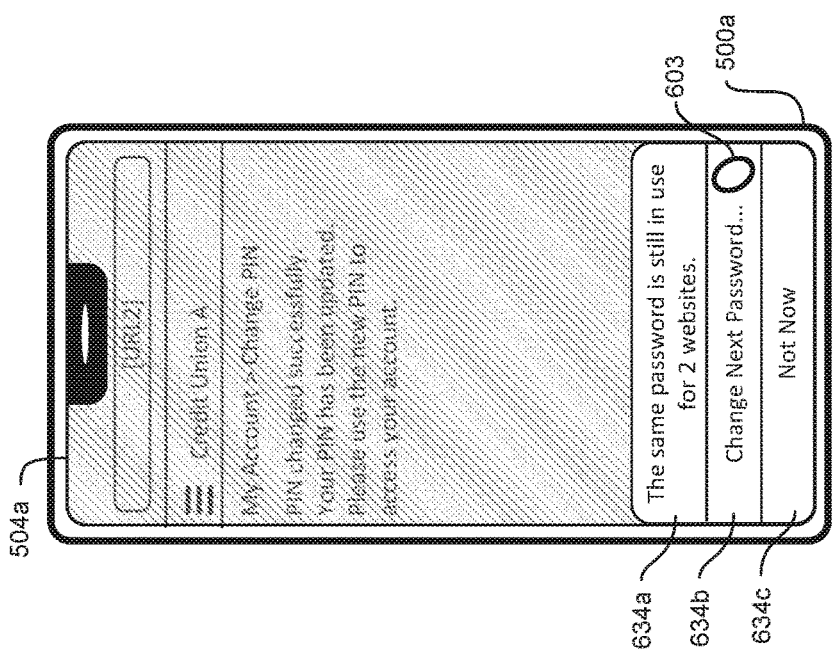

After the notification 626a is dismissed or in response to the selection in FIG. 6J, the electronic device 500a presents a notification 634a that the old password is still in use for other websites, as shown in FIG. 6K. The notification 634a includes a selectable option 634b that, when selected, causes the electronic device 500a to present a user interface to change a password of the next user account that uses the repeated password and a selectable option 634c that, when selected, causes the electronic device 500a to dismiss the notification 634a without displaying the user interface for changing the next password. As shown in FIG. 6K, the user selects (e.g., with contact 603) the option 634b to change the next password.

In response to the user's selection in FIG. 6K, the electronic device presents a webpage for changing the password of the next user account that uses the repeated password, as shown in FIG. 6L. The webpage includes a field 616b in which the user is able to enter the user name of the user account, a field 618b in which the user is able to enter the existing PIN (e.g., password) associated with the user account, a field 620b in which the user is able to enter a new PIN (e.g., password), a field 622b in which the user is able to re-enter and confirm the new PIN, and a selectable option 624b that, when selected, causes the electronic device 500a to submit the new password to change the password. In FIG. 6L, the user selects (e.g., with contact 603) the field 616b for the user name of the user account. After selecting the field 616b, the user is able to enter the user name of the user account into the field.

Figure 6N:
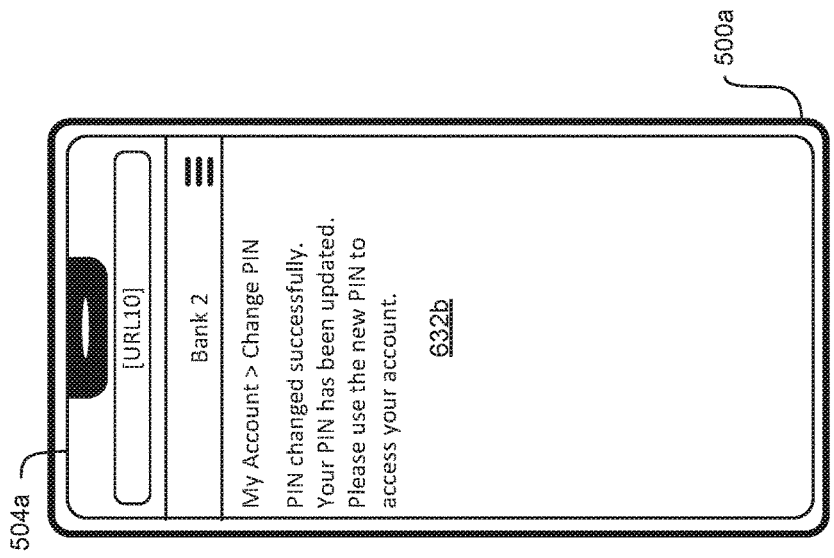
Figure 6M:
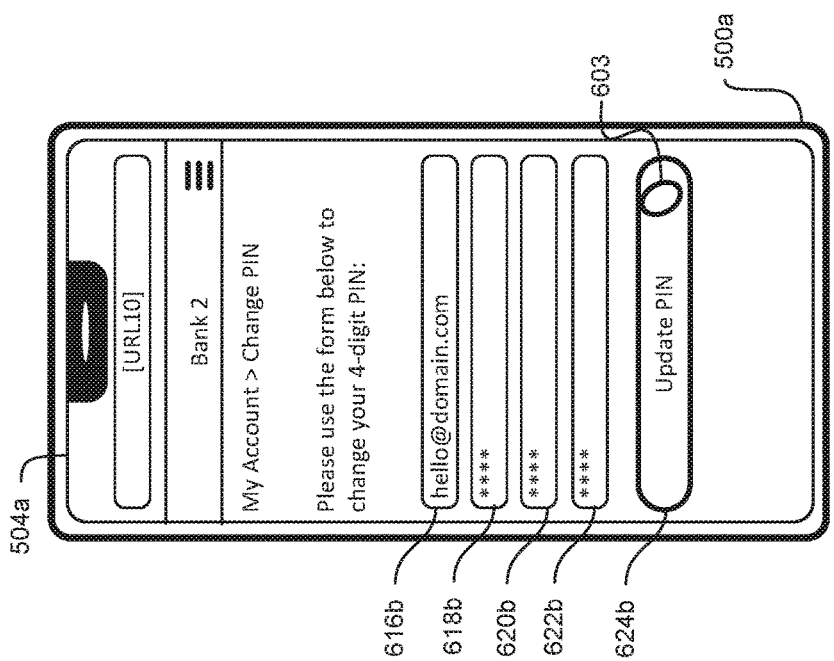

FIG. 6M illustrates the webpage for changing the password after the user has entered the username, password, and new password into the fields 616b-622b. As shown in FIG. 6M, the user selects (e.g., with contact 603) the selectable option 624b to change the password. In response to the user's selection, the website updates the password associated with the user account. It should be understood that, in some embodiments, the electronic device 500a presents the notification 626a to save the updated password, such as in FIG. 6G, in response to the user's selection in FIG. 6M.

As shown in FIG. 6N, after the password is updated and optionally after the electronic device 500a displays and ceases displaying the notification 626a to save the password, the electronic device 500a presents a webpage 632b that confirms the password was changed. Because there is now only one other website that has the password that had been shared by three websites, the electronic device 500a does not present a notification to change the password of the next website, such as the notification 634a illustrated in FIG. 6K.

Thus, FIGS. 6I-6N illustrate ways the electronic device 500a presents notifications to change the password of all but one user account that uses the same password as other user accounts.

FIGS. 6O-6T illustrate ways the electronic device 500b presents a home page of a website associated with a user account in response to selection of an option to change the password of the user account. For example, the electronic device 500b presents the home page in response to selection of the option to change the password of the user account in accordance with a determination that the web site of the user account does not support deep-linking to a webpage for changing the password.

Figure 6P:
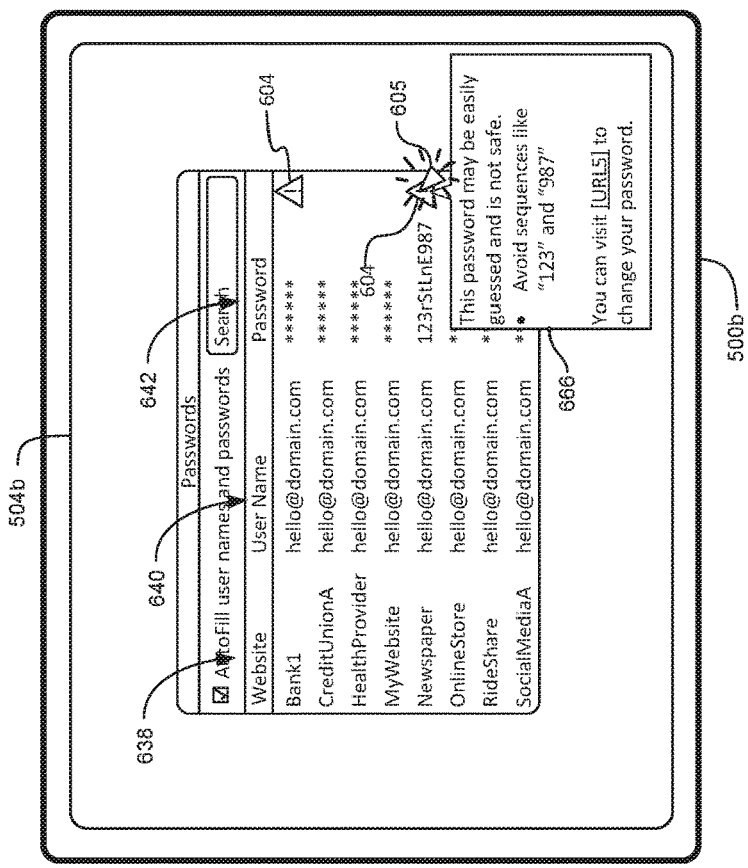
Figure 6O:
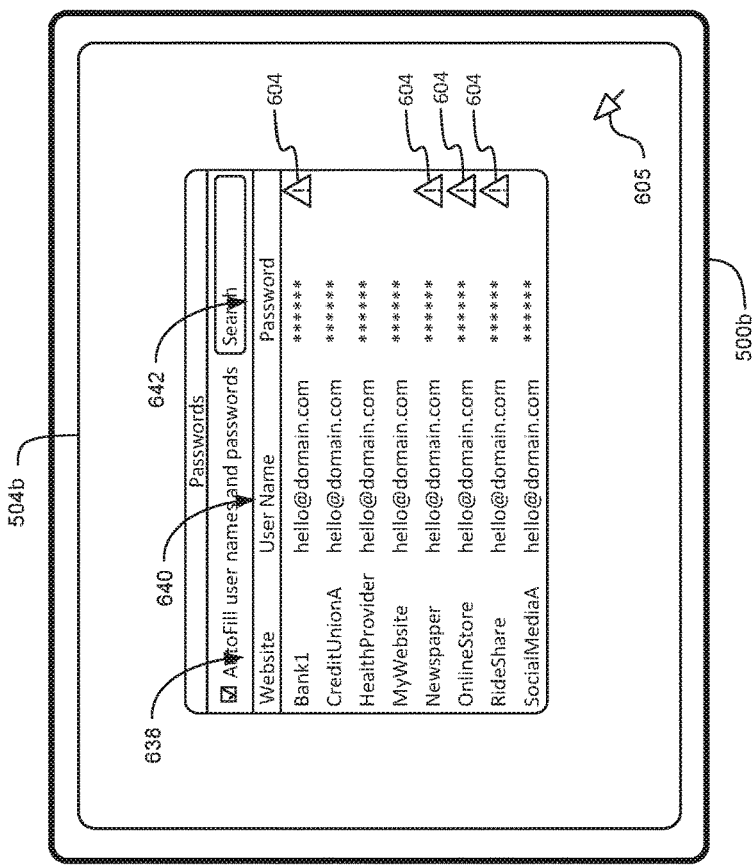

FIG. 6O illustrates a password management user interface. The password management user interface includes user account information including the name of the website 638, user name 640, and password 642 associated with each user account. As shown in FIG. 6O, the user interface redacts the text of the passwords 642, for privacy purposes. The user interface includes visual indications 604 next to passwords 642 that are determined to be weak. Although some figures, such as FIG. 6O, illustrate the user making a selection with cursor 605, it should be understood that the user is similarly able to make selections and interact with user interfaces via a touch screen or other input device in communication with an electronic device.

In FIG. 6P, the user selects (e.g., with cursor 605) one of the visual indications 604. In response to the user's selection, the electronic device 500b presents the text of the password 642 in the same row as the selected indication 604 a dialog 666 that includes an explanation why the password is weak, such as because the password includes two sequences of digits, such as "123" and "987". As shown in FIG. 6P, the dialog 666 explicitly states that the sequences of digits "123" and "987" make the password weak. The dialog 666 further includes a link to the website associated with the user account, from which the user is able to navigate to a webpage to change the password.

Figure 6R:
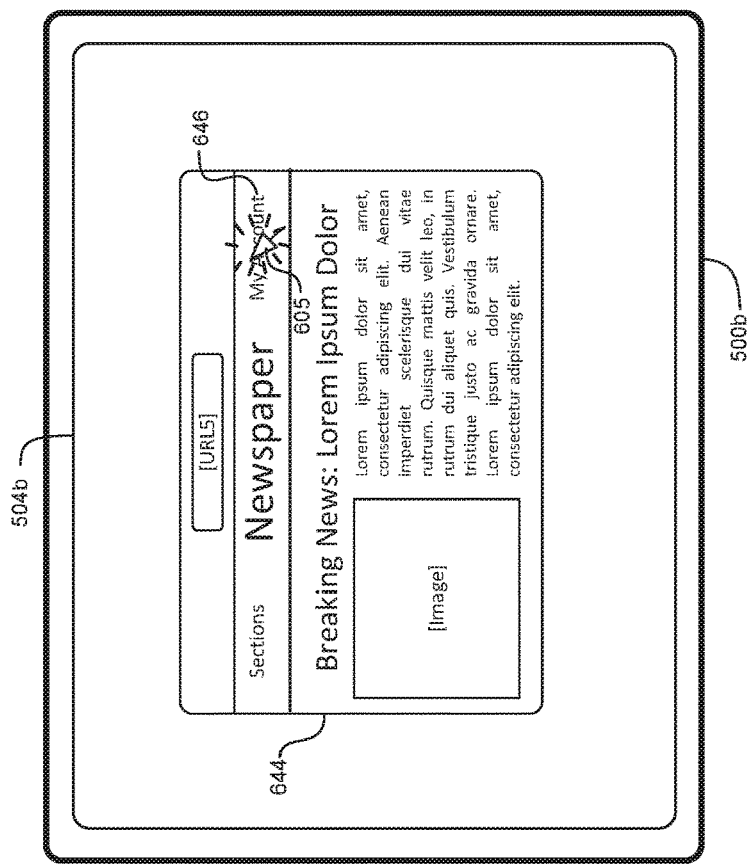
Figure 6Q:
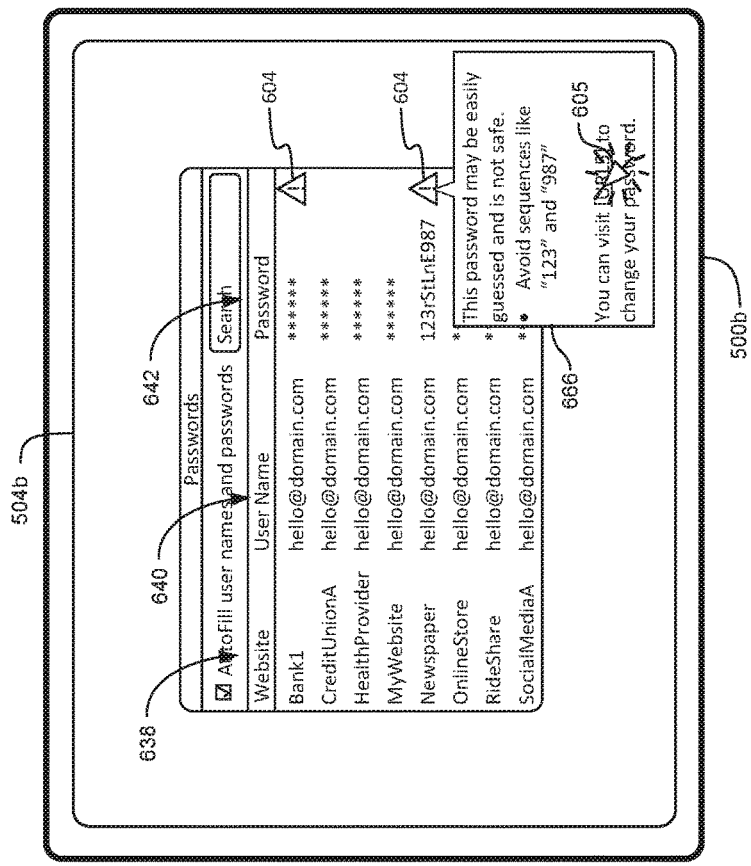

As shown in FIG. 6Q, the user selects (e.g., with cursor 605) the link to the website associated with the user account. In response to the user's selection in FIG. 6Q, the electronic device 500b presents the home page of the website 644 as shown in FIG. 6R. The home page includes a "My Account" option 646 that, when selected, causes the electronic device 500b to present an account menu illustrated in FIG. 6S.

Figures 6S, 6T:
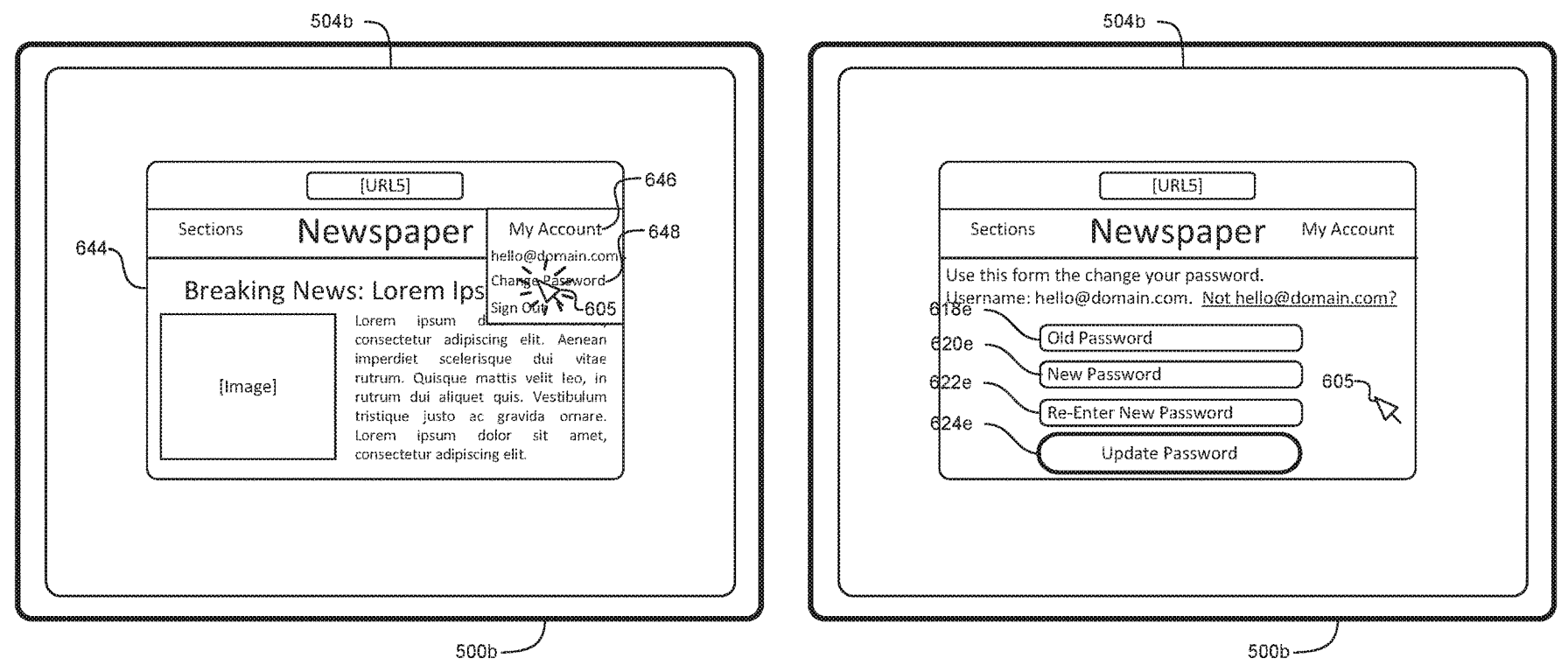

As shown in FIG. 6S, the user selects (e.g., with cursor 605) a selectable option 648 to navigate to a webpage at which the user is able to change password of the user account. In response to the user's selection in FIG. 6S, the electronic device 500b presents the webpage illustrated in FIG. 6T.

As shown in FIG. 6T, the webpage includes a field 618e for the current password of the user account, a field 620e for the new password, a field 622e for re-entry and confirmation of the new password, and a selectable option 624e that, when selected, causes the electronic device 500b to submit the new password form to the website. The user is able to fill out the fields 618e-624e in a manner similar to the manner described above with respect to FIGS. 6E-6G.

Thus, as illustrated in FIGS. 6O-6T, in some embodiments, the electronic device 500b presents an option within a password management user interface that is selectable to present the homepage of the website. From the home page, the user is able to navigate to a web page at which they are able to change the password.

FIGS. 6U-6W illustrate ways the electronic device displays a weak password warning for a user account the electronic device 500a received from another user account, such as a user account that is associated with an electronic device other than electronic device 500a without being associated with the electronic device 500a.

In FIG. 6U, the electronic device 500a receives user account information 656 from another user account, including a password. The user account information is optionally information pertaining to a user account that is not the same user account as the user account that transmits the information 656. As shown in FIG. 6U, in response to receiving the user account information 656, the electronic device 500 presents an indication 650 that the user account information was received, a selectable option 652 that, when selected, causes the electronic device 500a to save the user account information and a selectable option 654 that, when selected, causes the electronic device 500a to forgo saving the account information. The user selects (e.g., with contact 603) the option 652 to save the account information.

FIG. 6V illustrates the password management user interface after the electronic device 500a saved the user account information. As shown in FIG. 6V, the password management user interface includes a representation 602h of the user account information received from the other user account. The representation 602h includes a visual indication 604 of a weak password. The user selects (e.g., with contact 603) the representation 602h.

In response to the user's selection in FIG. 6V, the electronic device 500a presents the information about the user account illustrated in FIG. 6W. As shown in FIG. 6W, the information includes the username 606c and password 608c of the user account, an option 610c to change the password, an indication 612c of why the password is weak, and an indication 614c of the websites associated with the user account. As shown in FIG. 6W, the password is weak because it includes a common password and a dictionary word. The indication 612c of why the password is weak includes an indication of the common word "password" and the dictionary word "password" to explain to the user why the password is weak.

Therefore, as illustrated in FIGS. 6U-6W, in some embodiments, the electronic device 500a presents a weak password warning for passwords that were received from other user accounts.

FIGS. 6X-6DD illustrate ways in which the electronic device 500a shares a password with another user account and presents a notification with a selectable option to share the password again in response to detecting that the user changed the password after sharing the password.

Figures 6Y, 6Z:
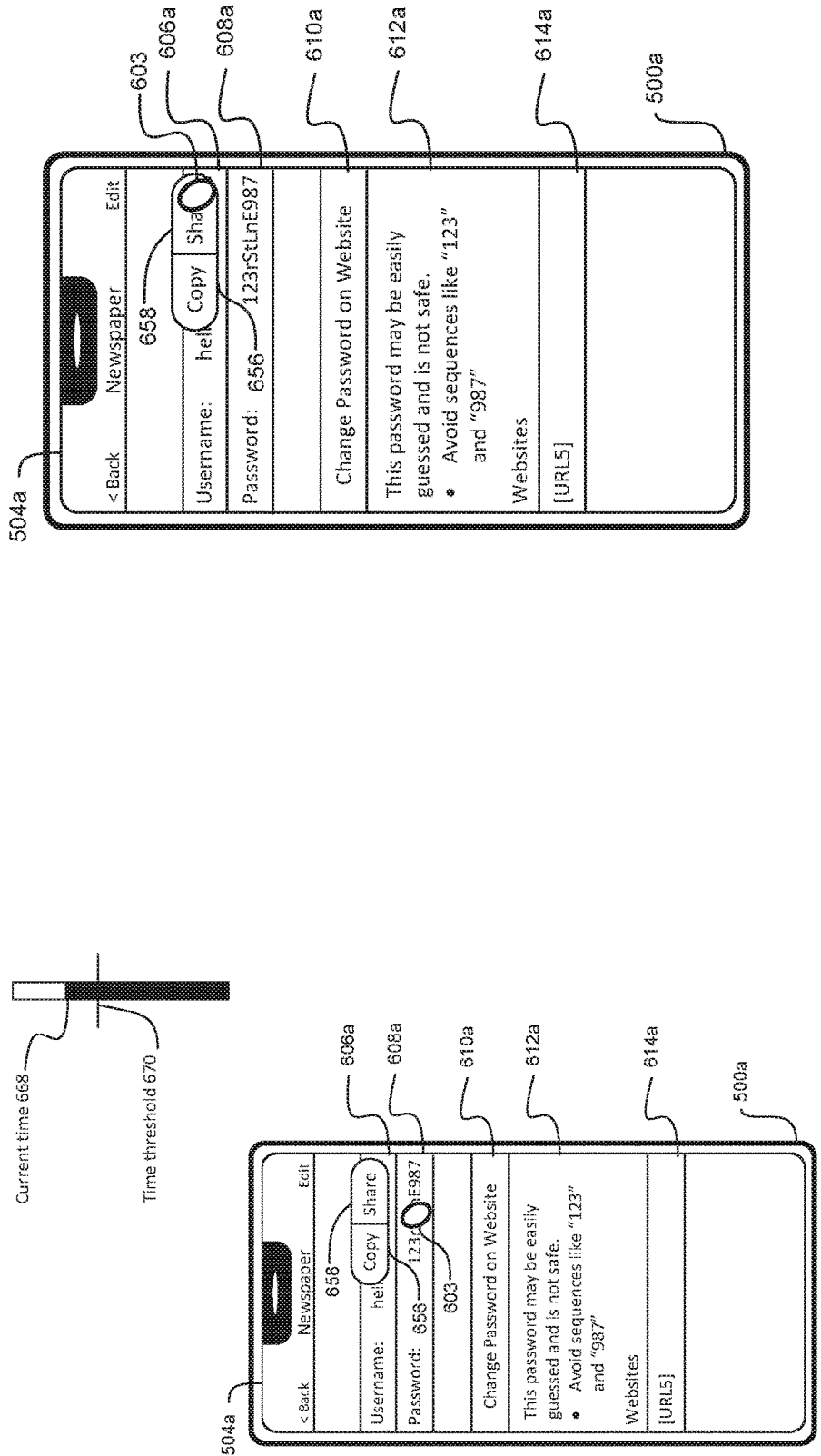
Figure 6D:
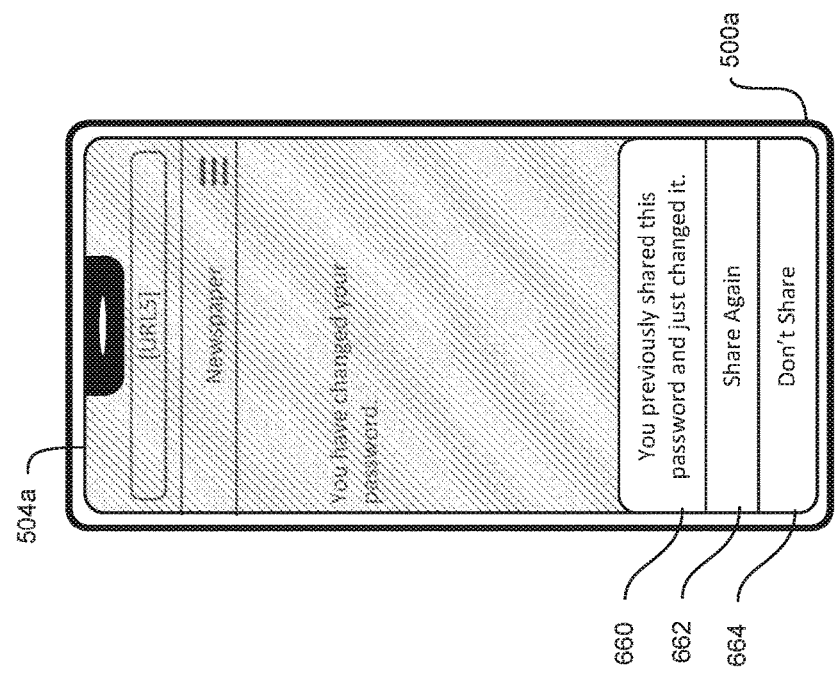
Figure 6C:
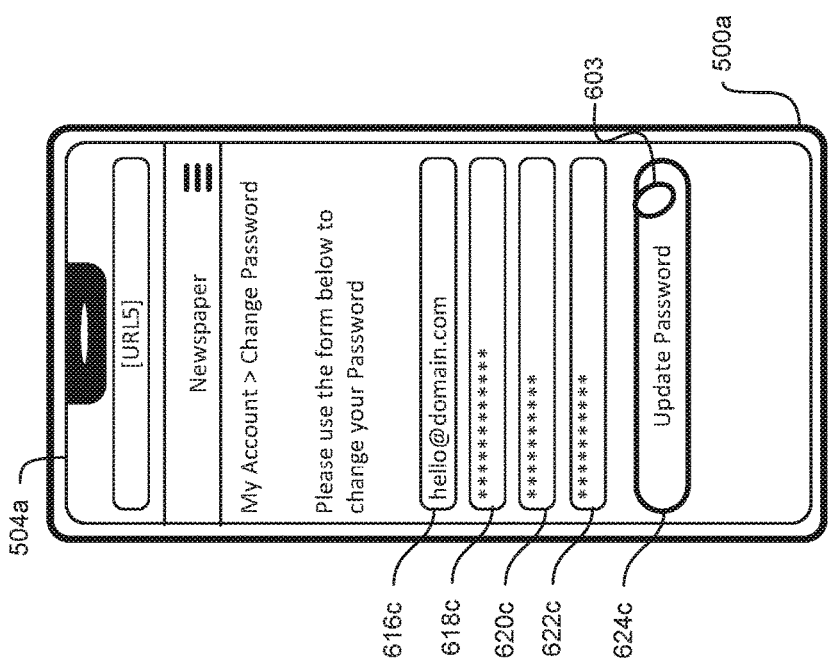
Figure 6G:
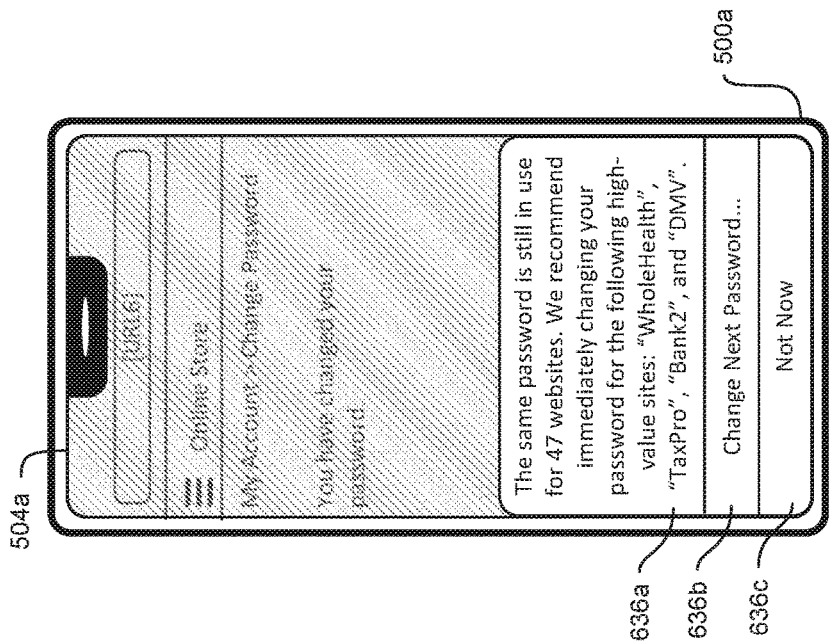
Figure 7A:
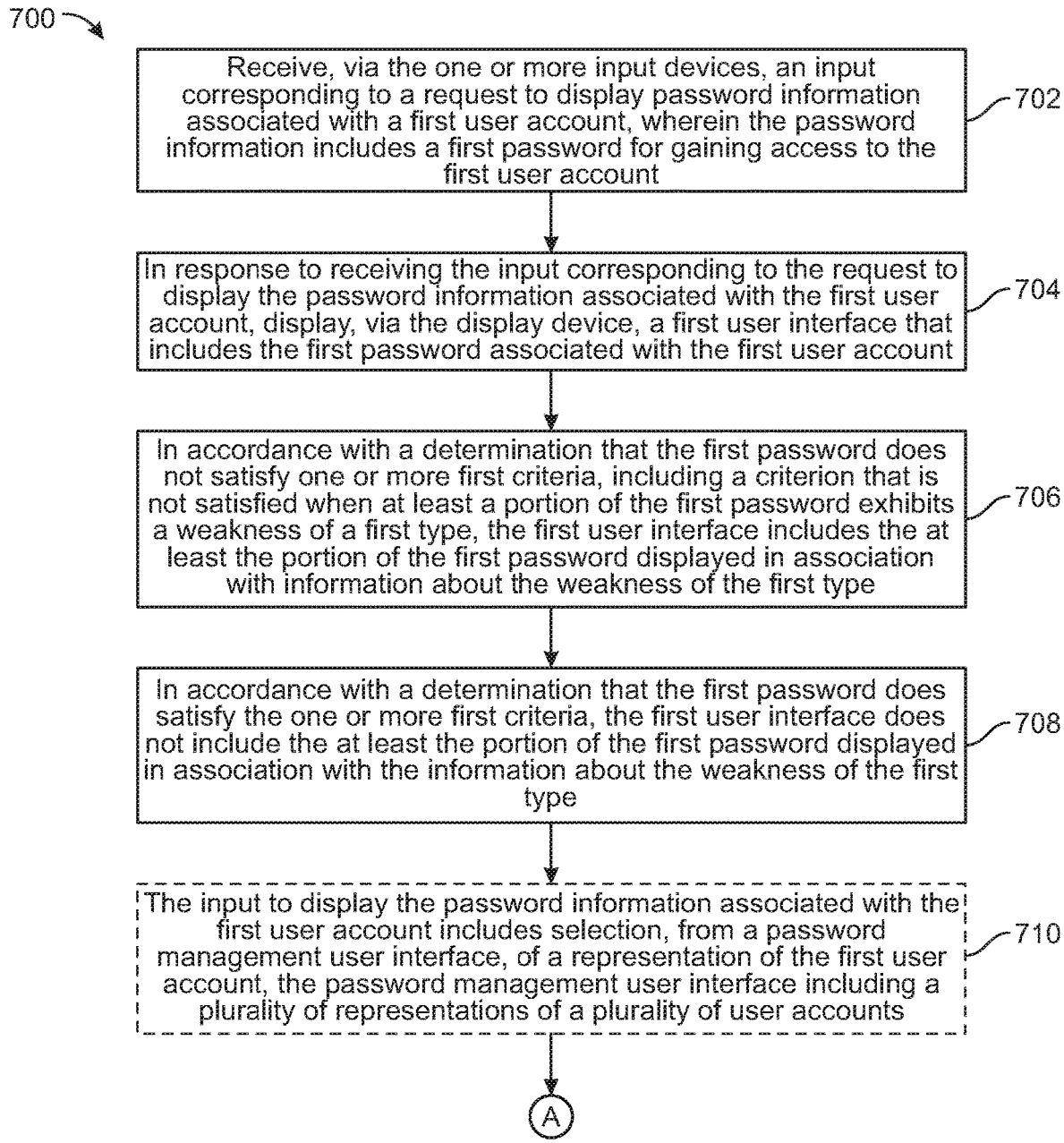
FIGS. 7A-7F are flow diagrams illustrating a method of presenting a weak password warning in a user interface that includes information about the account with which the password is associated in accordance with some embodiments of the disclosure.
Figure 7B:
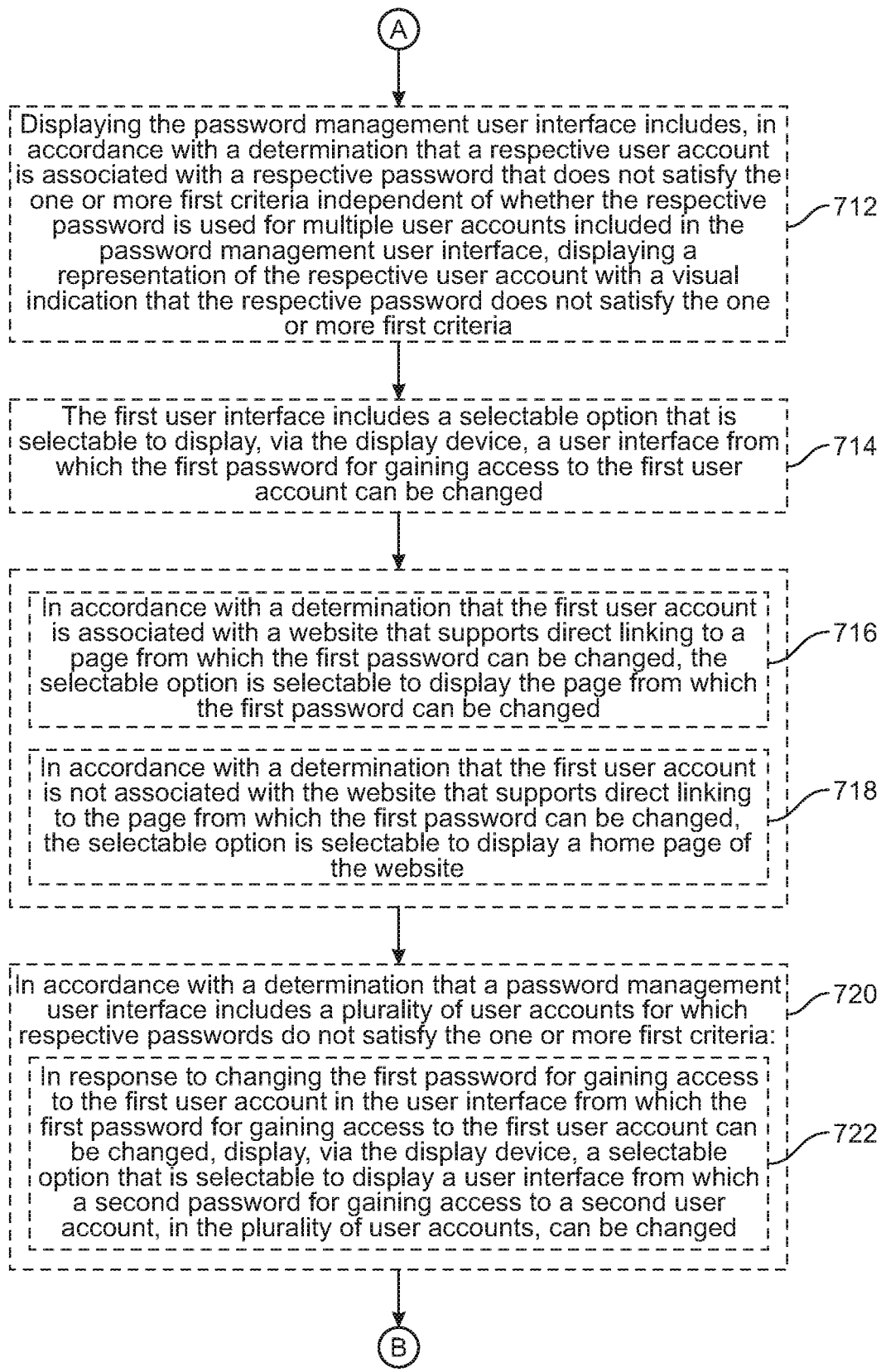
Figure 7C:
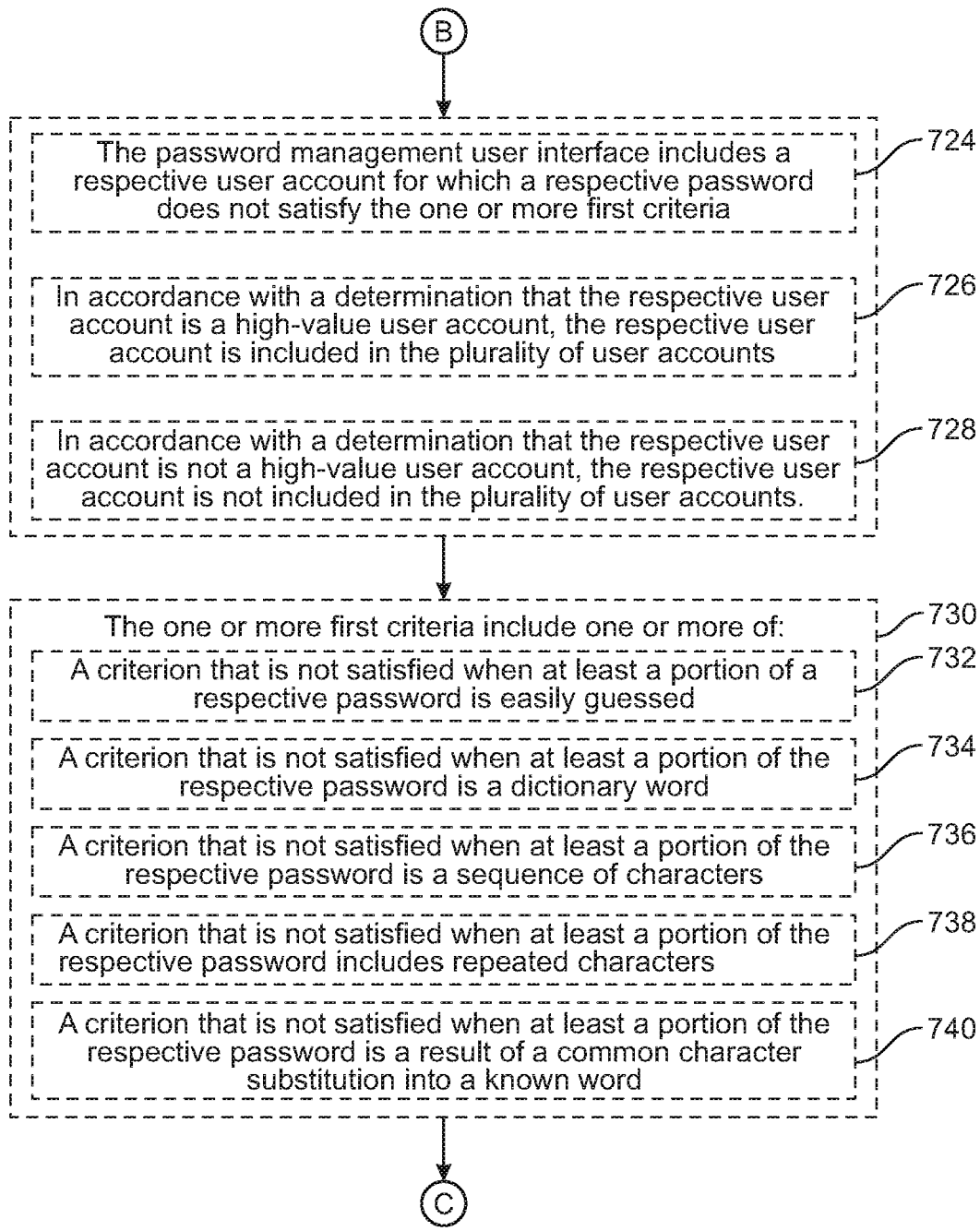
Figure 7D:
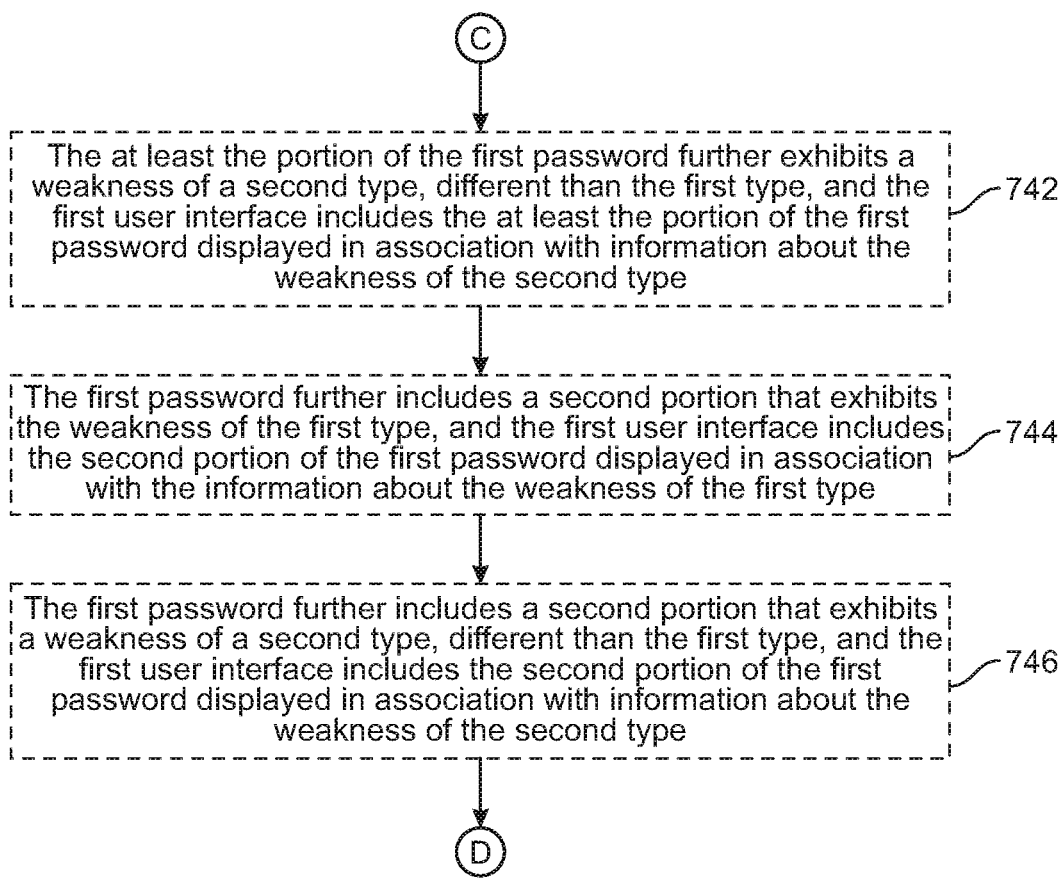
Figure 7E:
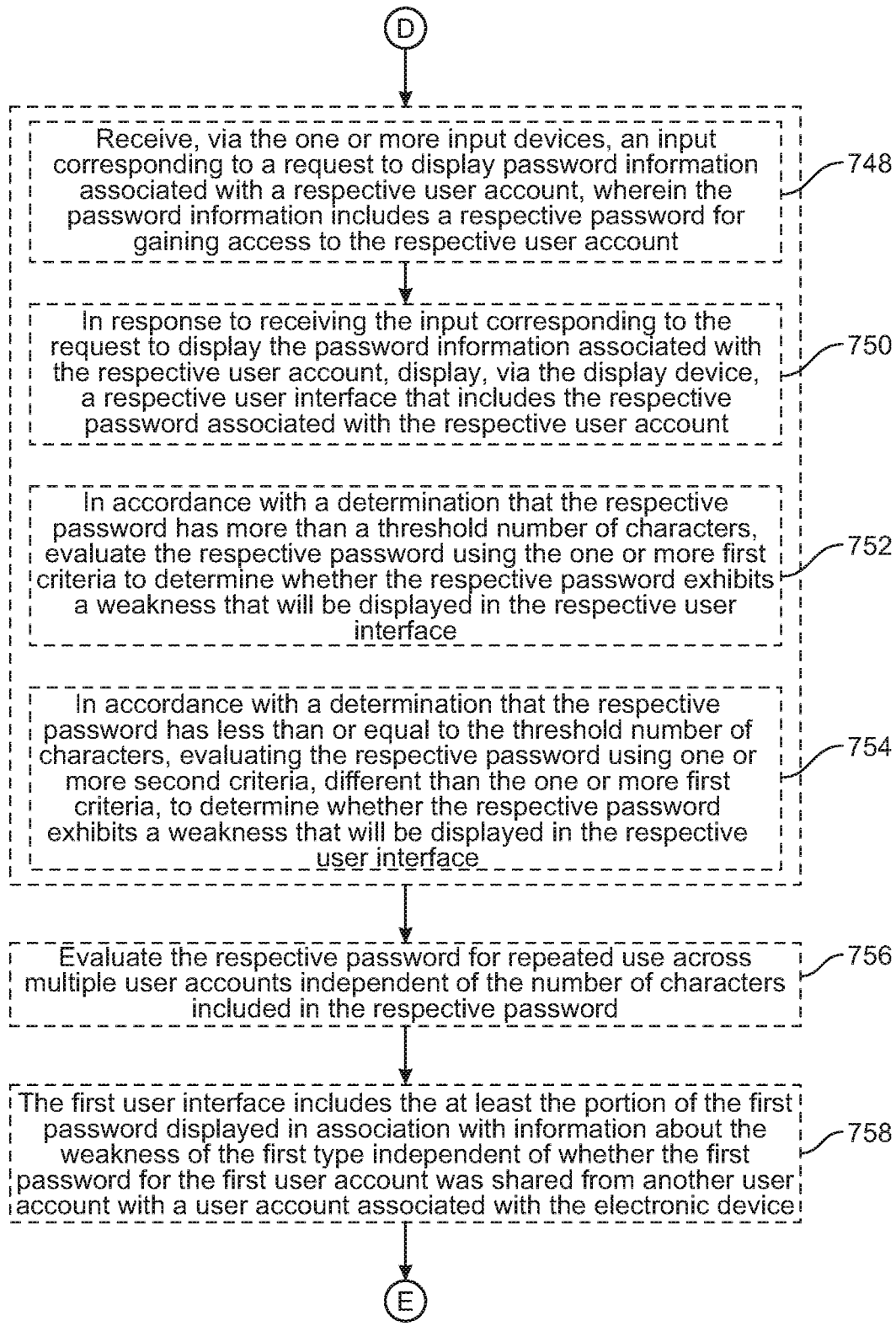
Figure 7F:
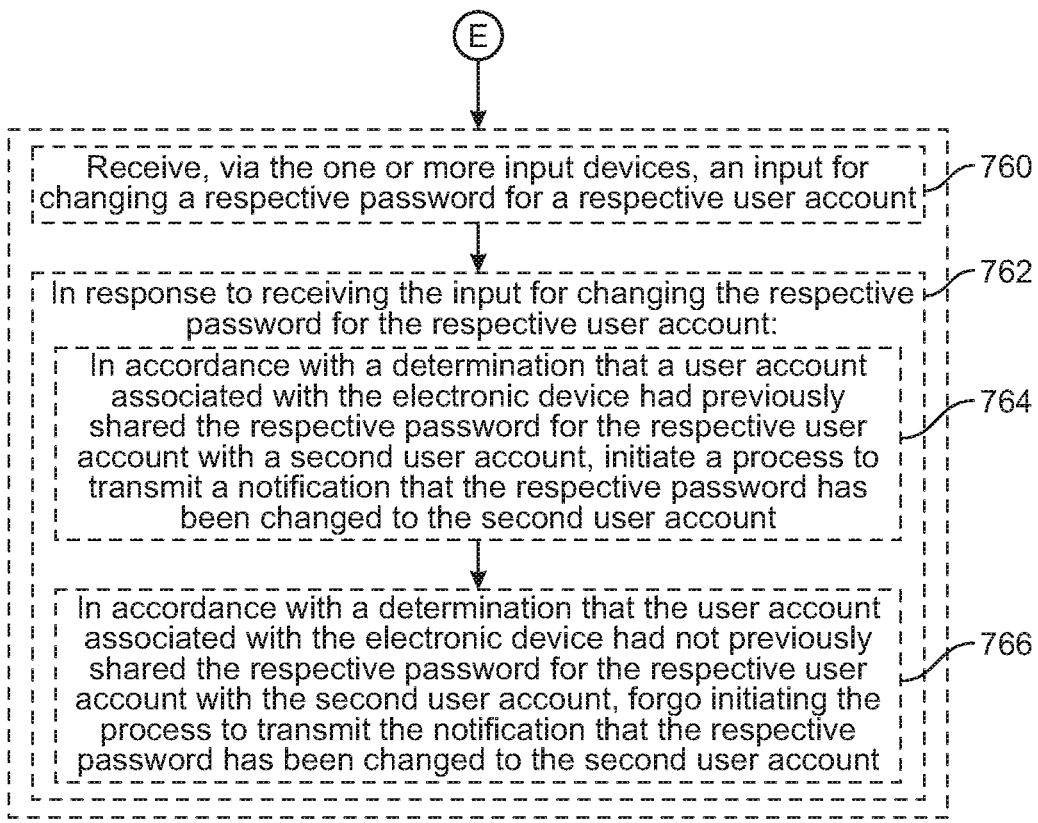

In FIG. 6X, the electronic device 500a displays a password management user interface with login information for a user account. The user selects (e.g., with contact 603) the indication 608a of the password of the user account and holds the contact 603 in place for an amount of time 668. As shown in FIG. 6Y, in response to detecting that the contact 603 remains in place for an amount of time 668 that exceeds a threshold amount of time 668 (e.g., 1 second, 3 seconds, etc.), the electronic device 500a displays a selectable option 656 that, when selected, causes the electronic device to copy the password 608a to a clipboard of the electronic device 500a and a selectable option 658 that, when selected, causes the electronic device 500a to initiate a process to share the password 608a with another user account.

In FIG. 6Z, the user selects (e.g., with contact 603) the selectable option 658 to initiate the process to share the password 608a with another user account. It should be understood that, in response to detecting one or more additional inputs for sharing the password 608a, the electronic device 500a transmits the password 608a to another user account (e.g., via e-mail, text message, enhanced data-based messaging, short-range wireless sharing protocol, etc.).

After sharing the password with the other user account, the electronic device 500a detects selection of the selectable option 610a for displaying a web page that is either a change password web page at which the user is able to change the password of the user account or the home page of the web site from which the user is able to navigate to the web page at which the user is able to change the password. In some embodiments, the user uses the electronic device 500a for one or more other functions not illustrated here before the electronic device 500a detects the selection of the selectable option 610a after sharing the password. In other words, detection of selection of the selectable option 610a is not necessarily directly after sharing the password.

In response to the user's selection in FIG. 6AA, the electronic device 500a presents the webpage illustrated in FIG. 6BB at which the user is able to change the password associated with the user account. The webpage includes a field 616c in which the user is able to enter the user name of the user account, a field 618c in which the user is able to enter the existing PIN (e.g., password) associated with the user account, a field 620c in which the user is able to enter a new PIN (e.g., password), a field 622c in which the user is able to re-enter and confirm the new PIN, and a selectable option 624c that, when selected, causes the electronic device 500a to submit the new password to change the password. In FIG. 6BB, the user selects (e.g., with contact 603) the field 616c for the user name of the user account. After selecting the field 616c, the user is able to enter the user name of the user account into the field.

As shown in FIG. 6CC, after the user enters the username, old password, and new password into the fields 616c-622c, the user selects (e.g., with contact 603) the option 624c to change the password. In response to the user's selection, the electronic device 500a submits the change password form to the website.

After changing the password, as shown in FIG. 6DD, the electronic device 500a presents a notification 660 that the password had been shared before it was changed. The notification 660 includes a selectable option 662 that, when selected, causes the electronic device 500a to share the password with the other user account again and a selectable option 664 that, when selected, causes the electronic device 500a to dismiss the notification 660 without sharing the password again.

Thus, as shown in FIGS. 6X-6DD, the electronic device 500a is able to share the password with another user account and display a notification 660 in response to detecting that the password has changed after it was shared.

FIGS. 6EE-6GG illustrate ways in which the electronic device 500a presents a notification to change the password of one or more high-value user accounts in response to detecting that the user changes a password of a user account of a plurality of user accounts that reuse the same password. FIG. 6EE illustrates a password management user interface that includes information about a respective user account, including username 606d and password 608d, a selectable option 610d that, when selected, causes the electronic device 500a to present a web page from which the user is able to change the password or a home page of the website, an indication 612d explaining why the password is weak, and an indication 614d of the website associated with the user account.

As shown in FIG. 6EE, the user selects (e.g., with contact 603) the option 610d to present a web page at which the user is able to change the password. In response to the user's selection in FIG. 6EE, the electronic device 500a presents the web page illustrated in FIG. 6FF.

In response to the user's selection in FIG. 6EE, the electronic device 500a presents the webpage illustrated in FIG. 6FF at which the user is able to change the password associated with the user account. The webpage includes a field 616d in which the user is able to enter the user name of the user account, a field 618d in which the user is able to enter the existing PIN (e.g., password) associated with the user account, a field 620d in which the user is able to enter a new PIN (e.g., password), a field 622d in which the user is able to re-enter and confirm the new PIN, and a selectable option 624d that, when selected, causes the electronic device 500a to submit the new password to change the password. In FIG. 6FF, the user selects (e.g., with contact 603) the field 616d for the user name of the user account. After selecting the field 616d, the user is able to enter the user name of the user account into the field.

After the user has completed all of the fields 616d-624d of the web page and selected the option 624d to update the password, the electronic device 500a displays the notification 636a illustrated in FIG. 6GG indicating that the old password is still in use on other websites. The notification 636a identifies a subset of the websites that use the old password that the user is recommended to change and includes a selectable option 636b that, when selected, causes the electronic device 500a to initiate a process to change the next password (e.g., display a web page from which the user is able to change the next password) and a selectable option 636c that, when selected, causes the electronic device 500a to cease displaying the notification 636a. In response to detecting selection of the selectable option 636b to change the next password, the electronic device 500a presents the website to change the password for one of the identified high-value sites. After changing the password of the next high-value website, the electronic device 500 optionally presents a notification similar to notification 636a again that identifies the remaining high-value sites. In some embodiments, once the user has changed the password for the identified high-value sites, the electronic device does not display a notification similar to notification 636a after the user changes the password of all of the high-value sites even though there are user account s remaining that use the same password.

FIGS. 7A-7F are flow diagrams illustrating a method 700 of presenting a weak password warning in a user interface that includes information about the account with which the password is associated in accordance with some embodiments of the disclosure. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

In some embodiments, such as in FIG. 6A, an electronic device 500 in communication with a display device 504 and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) receives (702), via the one or more input devices, an input (e.g., contact 603) corresponding to a request to display password information, such as in FIG. 6B, associated with a first user account (e.g., to access a user account on a web site, to access a user account in a local application, etc.), wherein the password information includes a first password 608a for gaining access to the first user account. In some embodiments, the electronic device displays a password management user interface that includes a plurality of selectable options each associated with a respective user account. Optionally, the electronic device detects selection of a selectable option associated with the first user account and, in response to detecting the selection, the electronic device displays the password information.

In some embodiments, such as in FIG. 6B, in response to receiving the input corresponding to the request to display the password information associated with the first user account, the electronic device 500 displays (704), via the display device, a first user interface that includes the first password 608a associated with the first user account. In some embodiments, the password information associated with the first user account includes the user name or login ID associated with the first user account, the password associated with the first user account, and one or more websites from which the first user account is accessible.

In some embodiments, such as in FIG. 6B, in accordance with a determination that the first password does not satisfy one or more first criteria (e.g., strong password criteria), including a criterion that is not satisfied when at least a portion of the first password exhibits a weakness of a first type, the first user interface includes (706) the at least the portion of the first password displayed in association with information about the weakness of the first type 612a. Optionally, the one or more first criteria (e.g., strong password criteria) include one or more of a criterion that is satisfied when the password does not include any words included in a dictionary accessible to the electronic device, a criterion that is satisfied when the password does not include any sequences of letters or numbers (e.g., numeric sequences like "123," alphabetic sequences like "xyz," and keyboard sequences like "qwerty"), a criterion that is satisfied when the password does not include repeated patterns of characters, a criterion that is satisfied when the password does not include common character substitutions (e.g., substituting "a" for "@", "s" for "$", etc. in a dictionary word), a criterion that is satisfied when the password does not include patterns on a keyboard (e.g., "qawsed"), and a criterion that is satisfied when the password does not include information included in contact information associated with the user stored on the electronic device (e.g., the user's name, portions of the user's address, etc.). Optionally, the electronic device displays text that explains which part of the password does not satisfy the one or more first criteria. For example, if the password is "Football123", the electronic device displays one or more messages such as "Avoid dictionary words like 'football'" and "Avoid sequences like '123'". In some embodiments, the one or more first criteria include a criterion that is not satisfied if the password is the same as a password for another user account stored on the electronic device. In some embodiments, the electronic device presents a warning that the password is weak without presenting a portion of the password that does not satisfy strong-password criteria with information about why the password does not satisfy the strong password criteria.

In some embodiments, in accordance with a determination that the first password does satisfy the one or more first criteria (e.g., strong password criteria), the first user interface does not include (708) the at least the portion of the first password displayed in association with the information about the weakness of the first type. For example, the user interface illustrated in FIG. 6B does not include indication 612a if the password 608a satisfies the one or more first criteria. In some embodiments, when the one or more first criteria are satisfied, the electronic device does not present a warning including details about why the password is weak because the password is not weak.

The above-described manner of displaying the portion of the first password in association with information about the weakness of the first type in accordance with a determination that the portion of the first password exhibits the weakness of the first type allows the electronic device to inform the user why the first password exhibits the weakness, which simplifies the interaction between the user and the electronic device and enhances the operability of the electronic device and makes the user-device interface more efficient (e.g., by enabling the user to avoid using passwords with the first weakness in the future, reducing the need to change the passwords later), which additionally reduces power usage and improves battery life of the electronic device by enabling the user to use the electronic device more quickly and efficiently.

In some embodiments, such as in FIG. 6A, the input to display the password information associated with the first user account includes selection (e.g., with contact 603), from a password management user interface, of a representation 602e of the first user account, the password management user interface including a plurality of representations 602 of a plurality of user accounts (710). In some embodiments, the password management user interface is a user interface that lists the user accounts for which passwords are stored by a password management program. Optionally, each representation of a respective user account includes an indication of the website/entity and user name with which the account is associated. In some embodiments, in response to detecting selection of the representation of the user account, the electronic device presents a user interface that includes the password of the account and the information about the weakness of the password, if the password is weak.

The above-described manner of displaying the password information in response to selection of the representation of the first user account in the password management user interface allows the electronic device to present additional information about user accounts in response to selection of a respective user account in the password management user interface, which simplifies the interaction between the user and the electronic device and enhances the operability of the electronic device and makes the user-device interface more efficient (e.g., by reducing the number of inputs needed to view information about a respective user account while viewing the password management user interface), which additionally reduces power usage and improves battery life of the electronic device by enabling the user to use the electronic device more quickly and efficiently.

In some embodiments, such as in FIG. 6A, in accordance with a determination that a respective user account is associated with a respective password that does not satisfy the one or more first criteria (e.g., strong password criteria) independent of whether the respective password is used for multiple user accounts included in the password management user interface, the electronic device displays a representation 602e of the respective user account with a visual indication 604 that the respective password does not satisfy the one or more first criteria (712). In some embodiments, the representation of the user account includes text or an image that indicates that the password is weak (e.g., a weak password icon). Optionally, the visual indication is displayed if the password fails to meet the strong password criteria, regardless of whether or not the password is used for multiple user accounts associated with different websites (e.g., a password that is not used for multiple user accounts optionally still displays the visual indication of weakness if it does not satisfy the strong password criteria). In some embodiments, the password management user interface includes the visual indication of the weak password without including the information about what makes the password weak.

The above-described manner of displaying the visual indication that the respective password does not satisfy the one or more first criteria allows the electronic device to indicate to the user that the user should change the password while the user is viewing the password management user interface, which simplifies the interaction between the user and the electronic device and enhances the operability of the electronic device and makes the user-device interface more efficient (e.g., by encouraging the user to click the representation, which causes the electronic device to display a user interface that includes a link to change the password), which additionally reduces power usage and improves battery life of the electronic device by enabling the user to use the electronic device more quickly and efficiently, such as by reducing the number of inputs needed to change the password after learning that the password should be changed.

In some embodiments, such as in FIG. 6D, the first user interface includes a selectable option 610b that is selectable to display, via the display device, a user interface from which the first password for gaining access to the first user account can be changed (714). In some embodiments, the first user interface includes a link to a website associated with the first user account. Optionally, in response to detecting selection of the link, the electronic device displays a webpage of the website associated with the user account for changing the password of the user account. In some embodiments, in response to detecting selection of the link, the electronic device displays the homepage of the website associated with the user account from which the user is able to navigate to the website for changing the password associated with the user account.

The above-described manner of providing a link to the page from which the password can be changed allows the electronic device to reduce the number of inputs needed to change the password, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIGS. 6D-6E, in accordance with a determination that the first user account is associated with a website that supports direct linking to a page from which the first password can be changed (e.g., the selectable option is a link to a website for changing a password of the user account), the selectable option 610b shown in FIG. 6D is selectable to display the page from which the first password can be changed, as shown in FIG. 6E (e.g., a "change password" page of the website, without requiring that the user enter the password/username of the account to access the "change password" page) (716).

In some embodiments, such as in FIGS. 6Q-6R, in accordance with a determination that the first user account is not associated with the website that supports direct linking to the page from which the first password can be changed, the selectable option is selectable to display a home page of the website such as in FIG. 6R (718). In some embodiments, the user is able to navigate to a page from which the first password can be changed from the home page of the website.

The above-described manner of presenting a link to the homepage of the website if the website does not support deep linking allows the electronic device to reduce the number of inputs needed to change the password, which simplifies the interaction between the user and the electronic device and enhances the operability of the electronic device and makes the user-device interface more efficient (e.g., by allowing the user to navigate directly to the website from the user interface), which additionally reduces power usage and improves battery life of the electronic device by enabling the user to use the electronic device more quickly and efficiently.

In some embodiments, such as in FIG. 6I, in accordance with a determination that a password management user interface includes a plurality of user accounts for which respective passwords do not satisfy the one or more first criteria (e.g., strong password criteria) (720), in response to changing the first password for gaining access to the first user account in the user interface from which the first password for gaining access to the first user account can be changed, such as in FIG. 6J, the electronic device 500 displays (722), via the display device, a selectable option 634b that is selectable to display a user interface from which a second password for gaining access to a second user account, in the plurality of user accounts, can be changed, such as in FIG. 6K. In some embodiments, the respective passwords are the same password or each respective password is a unique password that is a weak password, or the passwords include some substantively weak passwords and some substantively strong passwords that are used repeatedly, or any combination of the above. In some embodiments, after the user changes the first password associated with the first user account, the electronic device presents an option that, when selected, presents a user interface from which the second password of the second user account can be changed. Optionally, the electronic device continues to present a selectable option that, when selected, presents a user interface for changing a respective password associated with a respective user account after the user changes each password, until all of the respective passwords satisfy the one or more first criteria or the user selects an option to decline to change a password. In some embodiments, the first password and second password are the same and the electronic device continues to present options to change any other passwords that are the same as the first and second passwords. In some embodiments, if the plurality of user accounts have the same password, the electronic device will present the selectable option to change the next password for all of the user accounts with the same password except one user account (e.g., because once there is only one user account with that password, the password is not used for multiple user accounts and does not need to be changed).

The above-described manner of displaying the selectable option for presenting the user interface from which the second password can be changed allows the electronic device to reduce the number of inputs needed to change the next password that has the same password as the password the user just changed, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6GG, the password management user interface includes a respective user account for which a respective password does not satisfy the one or more first criteria (e.g., strong password criteria) (724).

In some embodiments, such as in FIG. 6GG, in accordance with a determination that the respective user account is a high-value user account, the respective user account is included in the plurality of user accounts 636*a* (726). Optionally, high-value user accounts belong to a set of high-value categories, such as financial information, health information, user accounts that are used to sign in to multiple websites, and other user accounts that store or access sensitive information.

In some embodiments, such as in FIG. 6G, in accordance with a determination that the respective user account is not a high-value user account, the respective user account is not included in the plurality of user accounts 636*a* (728). In some embodiments, after the user changes a password, the electronic device presents a selectable option that, when selected, causes the electronic device to present a user interface for changing a password associated with a high-value user account until the passwords of all of the high-value user accounts or a predetermined number of the high-value user accounts have been changed. However, in some embodiments, the electronic device does not automatically prompt the user to change password, even if weak, for user accounts that are not included in the collection of high-value user accounts.

The above-described manner of presenting a selectable option to change the password of a high-value user account allows the electronic device to make it easier for the user to change the passwords of high-value user accounts, which simplifies the interaction between the user and the electronic device and enhances the operability of the electronic device and makes the user-device interface more efficient (e.g., by reducing the number of inputs needed to change the passwords of high-value user accounts), which additionally reduces power usage and improves battery life of the electronic device by enabling the user to use the electronic device more quickly and efficiently.

In some embodiments, the one or more first criteria (e.g., strong password criteria) include one or more of (730) a criterion (732) that is not satisfied when at least a portion of a respective password is easily guessed, such as in FIG. 6W (e.g., a portion of the respective password belongs to a predetermined list of words or strings of characters that are commonly used in passwords); a criterion (734) that is not satisfied when at least a portion of the respective password is a dictionary word, such as in FIG. 6W (e.g., the portion of the respective password is included in a dictionary accessible to the electronic device); a criterion (736) that is not satisfied when at least a portion of the respective password is a sequence of characters, such as in FIG. 6Q (e.g., a sequence of characters that are next to each other in the alphabet (e.g., "abc", "xyz", etc.) or are ascending or descending numbers (e.g., "123", "987", etc.)); a criterion (738) that is not satisfied when at least a portion of the respective password includes repeated characters (e.g., the portion of the respective password includes three or more repeated characters in a row), such as in FIG. 6D; and a criterion (740) that is not satisfied when at least a portion of the respective password is a result of a common character substitution into a known word (e.g., the portion of the respective password is a word found in a dictionary, with common character substitutions (e.g., substituting the number zero for the letter "O" and the like)). In some embodiments, the criteria further includes a criterion that is not satisfied when the password is in use for multiple user accounts managed by the electronic device.

The above-described manner of including the above-listed criteria in the one or more first criteria allows the electronic device to inform the user of the weakness of the password in a consistent manner, regardless of which weakness the password has, which simplifies the interaction between the user and the electronic device and enhances the operability of the electronic device and makes the user-device interface more efficient (e.g., by reducing the amount of time it takes the user to learn how to check if one or more passwords are weak), which additionally reduces power usage and improves battery life of the electronic device by enabling the user to use the electronic device more quickly and efficiently.

In some embodiments, such as in FIG. 6W, the at least the portion of the first password further exhibits a weakness of a second type, different than the first type, and the first user interface includes the at least the portion of the first password displayed in association with information about the weakness of the second type (742), such as indication 612*c*. In some embodiments, the same portion of the password exhibits two different weaknesses and the user interface includes an indication of each weakness. For example, if the password includes the word "password," the electronic device includes a warning that "password" is a dictionary word and a warning that "password" is a common component of passwords and, therefore, may be easily guessed.

The above-described manner of displaying the indication of the weakness of the first type and the weakness of the second type allows the electronic device to concurrently present information about both weaknesses of the password, which simplifies the interaction between the user and the electronic device and enhances the operability of the electronic device and makes the user-device interface more efficient (e.g., by reducing the number of inputs needed to view all of the weaknesses of the password), which additionally reduces power usage and improves battery life of the electronic device by enabling the user to use the electronic device more quickly and efficiently.

In some embodiments, such as in FIG. 6X, the first password 608*a* further includes a second portion that exhibits the weakness of the first type, and the first user interface includes the second portion of the first password displayed in association with the information about the weakness of the first type (744) as indicated by indication 612*a*. In some embodiments, the password includes two portions that each exhibit the same kind of weakness and the user interface includes an indication of each portion and its respective weakness. For example, if the password is "123rStLnE789", the user interface includes a warning that "123" is a sequence and a warning that "789" is a sequence.

The above-described manner of displaying the indication of the shared weakness of the first and second portions allows the electronic device to concurrently present information about both portions of the password, which simplifies the interaction between the user and the electronic device and enhances the operability of the electronic device and makes the user-device interface more efficient (e.g., by reducing the number of inputs needed to view all of the weaknesses of the password), which additionally reduces power usage and improves battery life of the electronic device by enabling the user to use the electronic device more quickly and efficiently.

In some embodiments, such as in FIG. 6B, the first password 608a further includes a second portion that exhibits a weakness of a second type, different than the first type, and the first user interface includes the second portion of the first password displayed in association with information about the weakness of the second type (746). In some embodiments, the password includes two portions that each have a different weakness and the electronic device presents a warning identifying each sequence and its respective weakness. For example, if the password is "Octopus888", the electronic device presents a warning that "Octopus" is a dictionary word and "888" is a sequence of repeated characters.

The above-described manner of displaying the indication of the weakness of the first type and the weakness of the second type allows the electronic device to concurrently present information about both weaknesses of the password, which simplifies the interaction between the user and the electronic device and enhances the operability of the electronic device and makes the user-device interface more efficient (e.g., by reducing the number of inputs needed to view all of the weaknesses of the password), which additionally reduces power usage and improves battery life of the electronic device by enabling the user to use the electronic device more quickly and efficiently.

In some embodiments, such as in FIG. 6A, the electronic device receives (748), via the one or more input devices, an input (e.g., with contact 603) corresponding to a request to display password information associated with a respective user account 602e, wherein the password information includes a respective password for gaining access to the respective user account (e.g., selection of a representation of the user account in a user interface that includes representations of each respective user account stored by the password manager on the electronic device).

In some embodiments, such as in FIG. 6B, in response to receiving the input corresponding to the request to display the password information associated with the respective user account, the electronic device 500 displays (750), via the display device, a respective user interface that includes the respective password 608a associated with the respective user account (e.g., the electronic device presents a user interface that indicates the website corresponding to the user account, the user name associated with the user account, and the password associated with the user account).

In some embodiments, such as in FIG. 6B in accordance with a determination that the respective password 608a has more than a threshold number of characters (e.g., four, six, eight), the electronic device evaluates (752) the respective password using the one or more first criteria to determine whether the respective password exhibits a weakness that will be displayed in the respective user interface in indication 612a (e.g., password criteria associated with passwords that are not also PINs (e.g., personal identification numbers that are generally 4 or 6 characters long and may or may not consist entirely of digits for entry at an ATM or via telephone)). In some embodiments, the electronic device evaluates PIN and non-PIN passwords using different criteria due to the common restrictions placed on PINs, such as a predetermined length (e.g., 4 or 6 characters) or a predetermined set of available characters (e.g., numbers only). For example, passwords that are a length that is not 4 or 6 characters or passwords that are a length that exceeds 6 characters are evaluated using the non-PIN password criteria.

In some embodiments, such as in FIG. 6D, in accordance with a determination that the respective password 608b has less than or equal to the threshold number of characters, the electronic device 500 evaluates (754) the respective password using one or more second criteria, different than the one or more first criteria, to determine whether the respective password exhibits a weakness that will be displayed in the respective user interface in indication 612b (e.g., password criteria associated with passwords that are also PINs (e.g., personal identification numbers that are generally 4 or 6 characters long and may or may not consist entirely of digits for entry at an ATM or via telephone)). In some embodiments, the electronic device evaluates PIN and non-PIN passwords using different criteria due to the common restrictions placed on PINs, such as a predetermined length (e.g., 4 or 6 characters) or a predetermined set of available characters (e.g., numbers only). For example, passwords that are a length that is 4 or 6 characters or passwords that are a length that is 6 characters or less are evaluated using the PIN password criteria. In some embodiments, the PIN password criteria do not include criteria that are not satisfied if the password is below a predetermined length (e.g., 8 characters) and do not include criteria that are not satisfied if the password only includes one type of character (e.g., the password includes numbers only).

The above-described manner of using different criteria for passwords that have more than the threshold number of characters and for passwords that have less than the threshold number of characters allows the electronic device to reduce the number of erroneous indications of weak passwords, which simplifies the interaction between the user and the electronic device and enhances the operability of the electronic device and makes the user-device interface more efficient (e.g., by making it easier for the user to locate passwords that are weak), which additionally reduces power usage and improves battery life of the electronic device by enabling the user to use the electronic device more quickly and efficiently.

In some embodiments, such as in FIG. 6D, the electronic device 500 evaluates (756) the respective password 608b for repeated use across multiple user accounts independent of the number of characters included in the respective password. In some embodiments, the electronic device presents warnings about repeated passwords for both PIN and non-PIN passwords, even though substantive weaknesses of PINs and non-PINs are evaluated differently. For example, if a password is used as the password for more than one user account for which password information is stored on the electronic device, the electronic device presents a warning that the password is used for multiple user accounts, regardless of the length of the password.

The above-described manner of evaluating the password for repeated use across multiple user accounts regardless of the number of characters in the password allows the electronic device to indicate to the user when passwords are repeated for passwords of all lengths, which simplifies the interaction between the user and the electronic device and enhances the operability of the electronic device and makes the user-device interface more efficient (e.g., by reducing the number of inputs needed to determine if the password is repeated), which additionally reduces power usage and improves battery life of the electronic device by enabling the user to use the electronic device more quickly and efficiently.

In some embodiments, such as in FIG. 6W, the first user interface includes the at least the portion of the first password 608c displayed in association with information about the weakness of the first type independent of whether the first password for the first user account was shared from another user account with a user account associated with the electronic device (758). In some embodiments, the electronic device is able to store account information that is shared by another electronic device. Optionally, the electronic device is able to present information about the account that was shared by another electronic device in a manner similar to the manner in which the electronic device presents information about accounts that were not shared by another electronic device (e.g., accounts that were configured on the electronic device itself). In some embodiments, while presenting the information about the user account that was shared by the other electronic device, the electronic device presents information about a portion of the shared password that has a respective weakness, just like other passwords that were not shared from another user account.

The above-described manner of presenting the information about the weakness of a password that was shared by another user account allows the electronic device to present the weak password information in a consistent manner, which simplifies the interaction between the user and the electronic device and enhances the operability of the electronic device and makes the user-device interface more efficient (e.g., by reducing the amount of time it takes for the user to learn how to check if a password is weak), which additionally reduces power usage and improves battery life of the electronic device by enabling the user to use the electronic device more quickly and efficiently.

In some embodiments, such as in FIG. 6CC, the electronic device 500 receives (760), via the one or more input devices, an input (e.g., with contact 603) for changing a respective password for a respective user account (e.g., detecting entry of a new password in a new password form of a website associated with the respective user account. In some embodiments, after the user changes the password, the electronic device detects an input requesting the electronic device to update the saved password of the electronic device.

In some embodiments, such as in FIG. 6DD, in response to receiving the input for changing the respective password for the respective user account (762), in accordance with a determination that a user account associated with the electronic device had previously shared the respective password for the respective user account with a second user account, the electronic device 500 initiates (764) a process to transmit a notification 660 that the respective password has been changed to the second user account (e.g., the electronic device presents a prompt to re-share the account information with the second user account and detects selection of a selectable option that, when selected, causes the electronic device to share the updated account information with the second user account).

In some embodiments, such as in FIGS. 6M-6N, in response to receiving the input (e.g., selection of option 624b) for changing the respective password for the respective user account (762), in accordance with a determination that the user account associated with the electronic device had not previously shared the respective password for the respective user account with the second user account, the electronic device 500 forgoes (766) initiating the process to transmit the notification that the respective password has been changed to the second user account, as shown in FIG. 6N. In some embodiments, if the electronic device has not shared the password with the second user account, the electronic device does not share the account information and does not present a prompt to share the account information. The above-described manner of prompting the user to re-share a password that was changed after having been shared allows the electronic device to make it easier for the user to re-share the password, which simplifies the interaction between the user and the electronic device and enhances the operability of the electronic device and makes the user-device interface more efficient (e.g., by reducing the number of inputs needed to re-share the password), which additionally reduces power usage and improves battery life of the electronic device by enabling the user to use the electronic device more quickly and efficiently.

It should be understood that the particular order in which the operations in FIGS. 7A-7F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIGS. 7A-7F. For example, the ways of presenting a weak password warning in a login user interface described above with reference to method 700 optionally have one or more of the characteristics of the ways of presenting the weak password warning in a password management user interface, etc., described herein with reference to other methods described herein (e.g., method 900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7F are, optionally, implemented by components depicted in FIGS. 1A-1B. For example, displaying operations 704, 722, and 750 receiving operations 702, 748, and 760, and initiating operation 764, are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Weak Password Warnings in a Login User Interface

Users interact with electronic devices in many different manners, including logging into user accounts. In some embodiments, an electronic device presents a weak password warning in response to detecting a user logging into a user account that has a weak password. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8B:
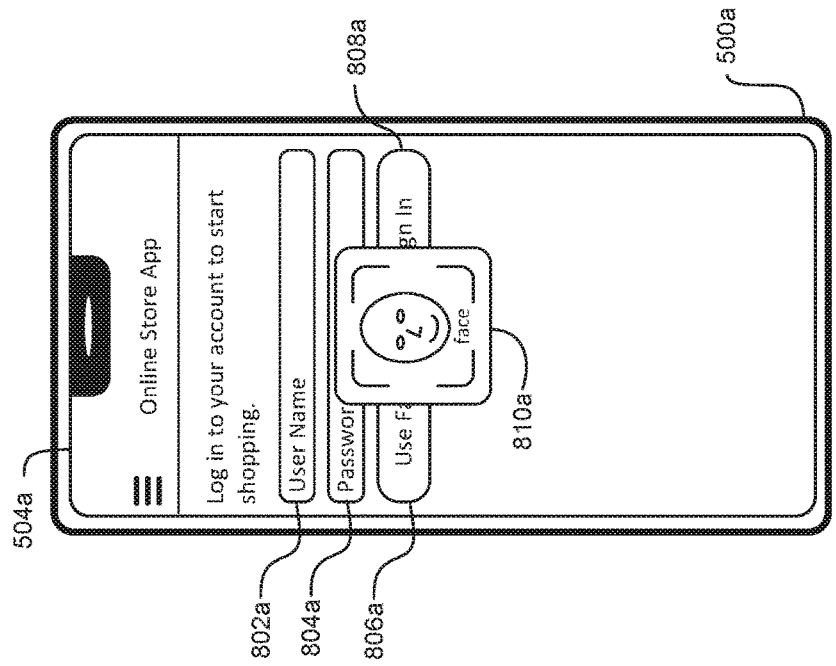
FIGS. 8A-8UU illustrate exemplary ways an electronic device presents a warning that a password of a user account is weak while presenting a login user interface of the user account in accordance with some embodiments of the disclosure.
Figure 8A:
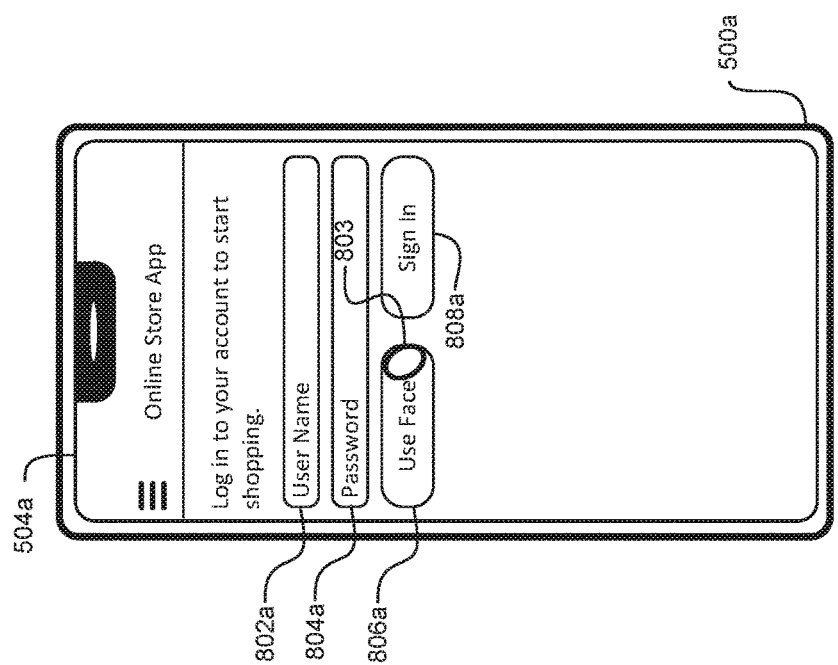
Figures 8C, 8D:
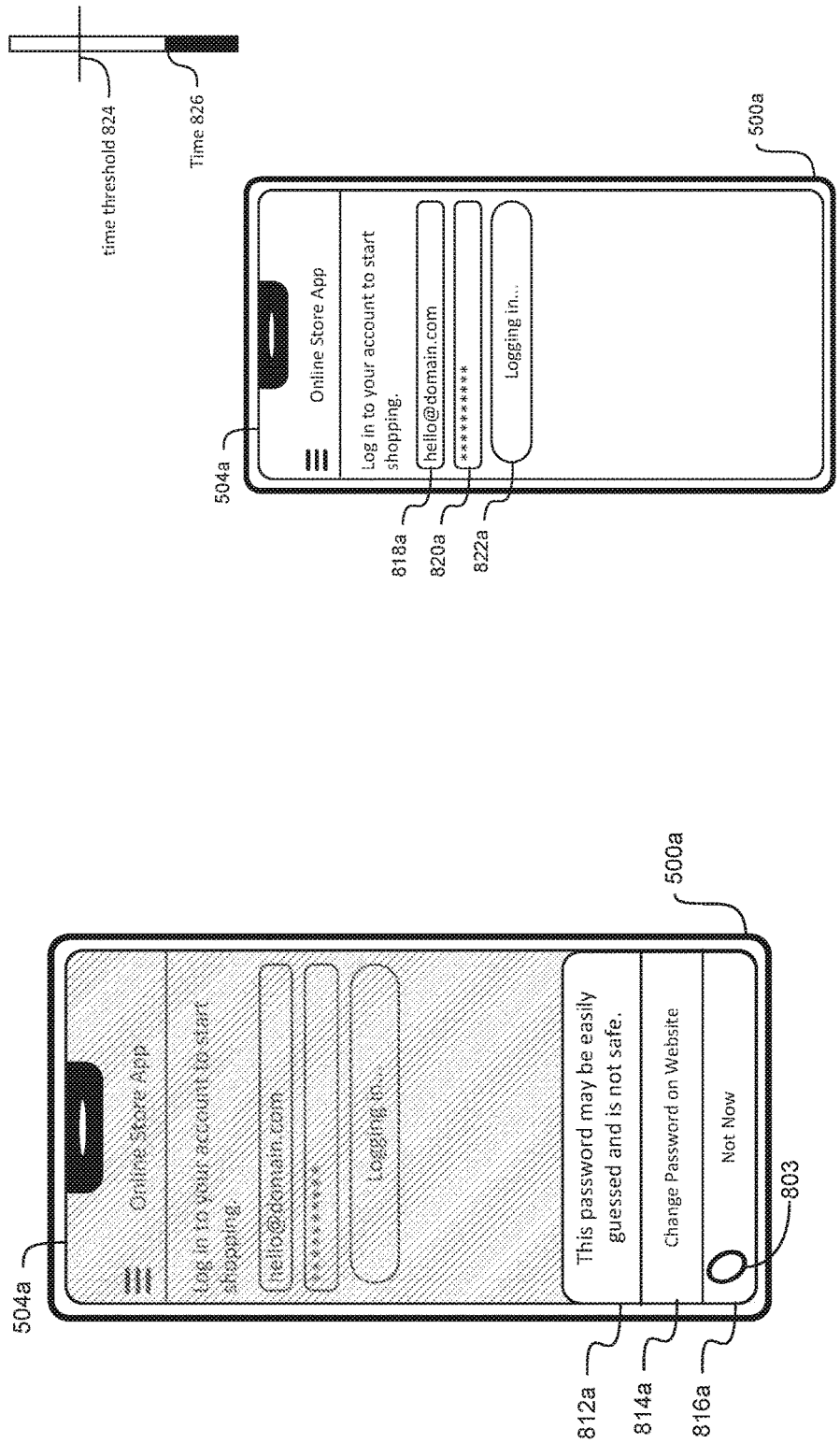
Figure 8H:
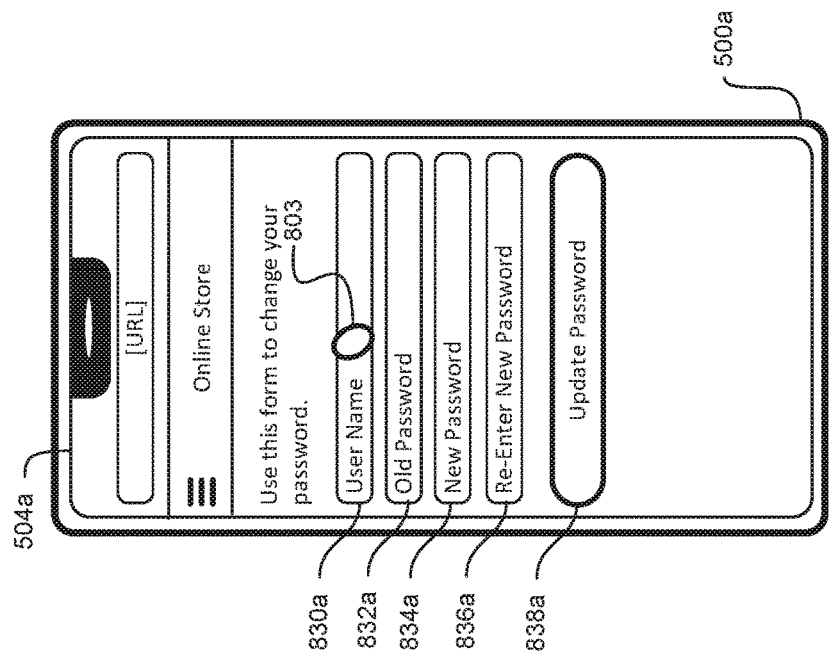
Figure 8G:
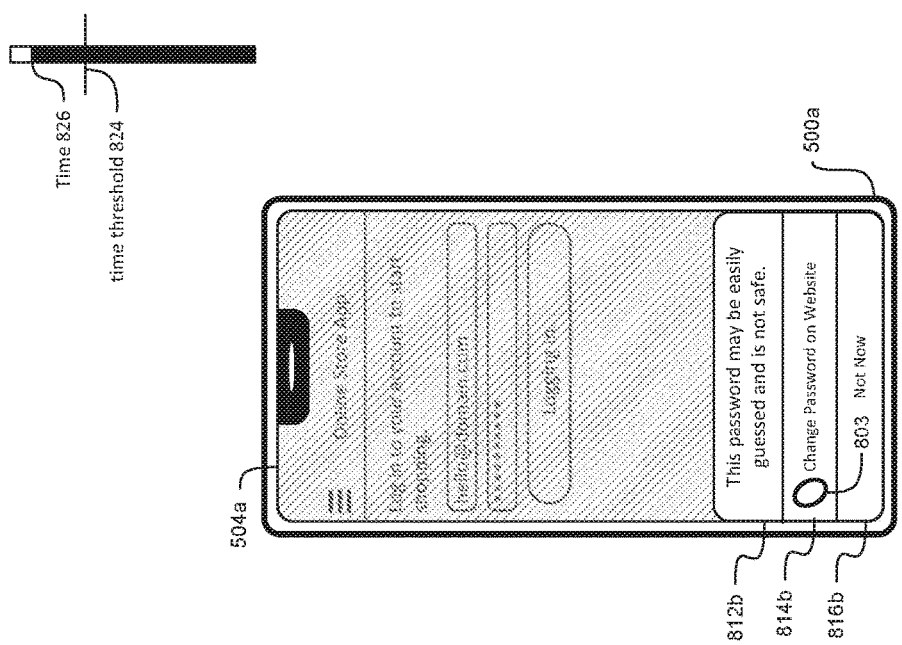
Figure 8J:
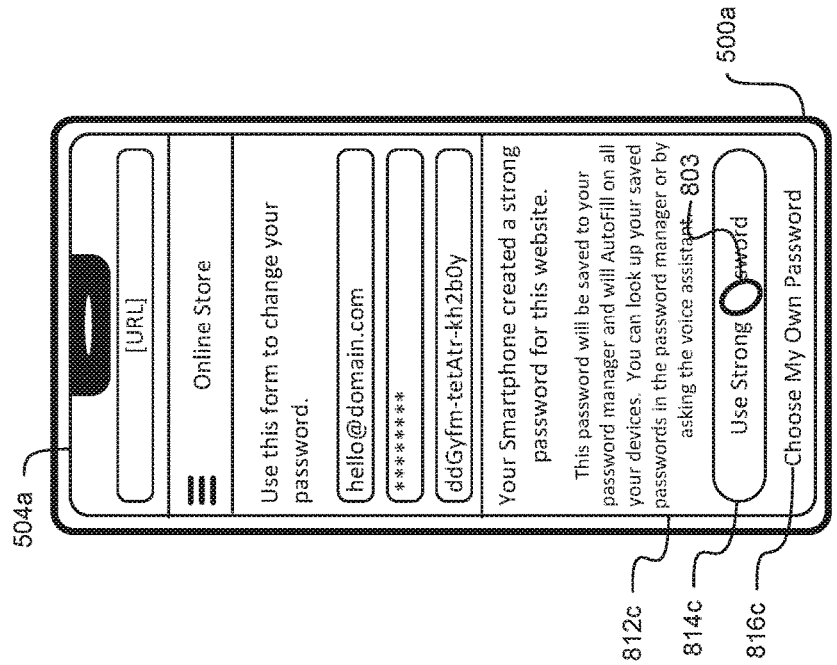
Figure 8I:
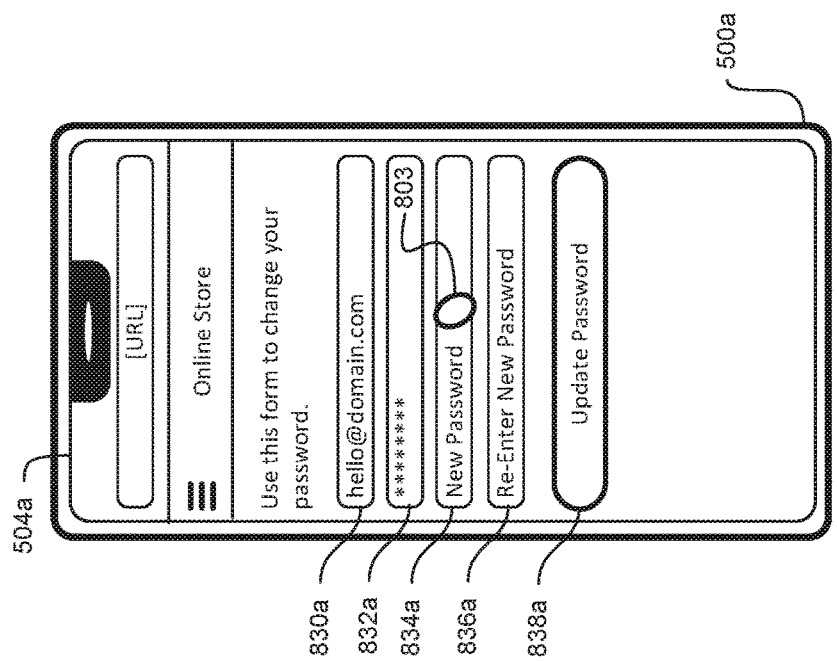
Figure 8L:
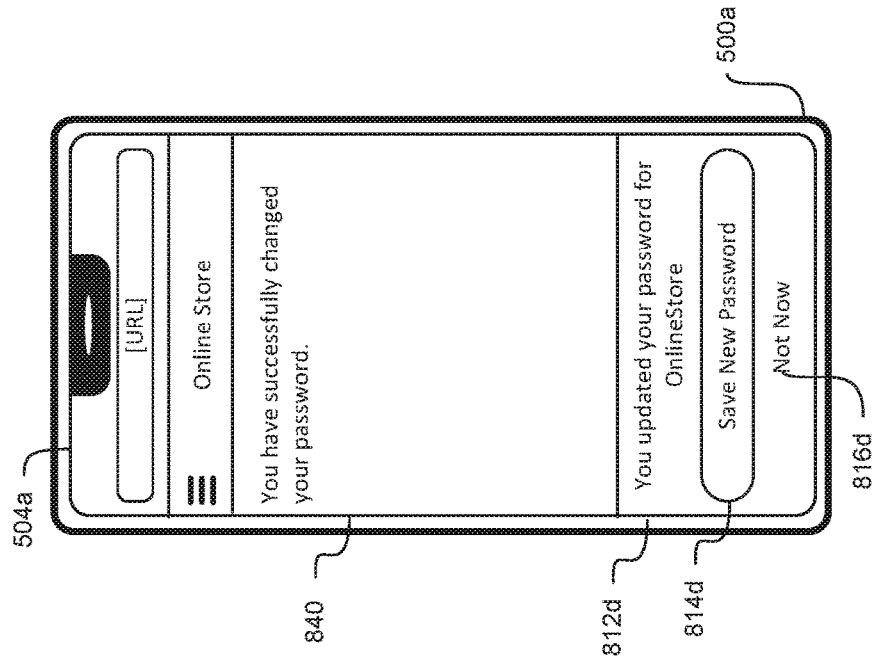
Figure 8K:
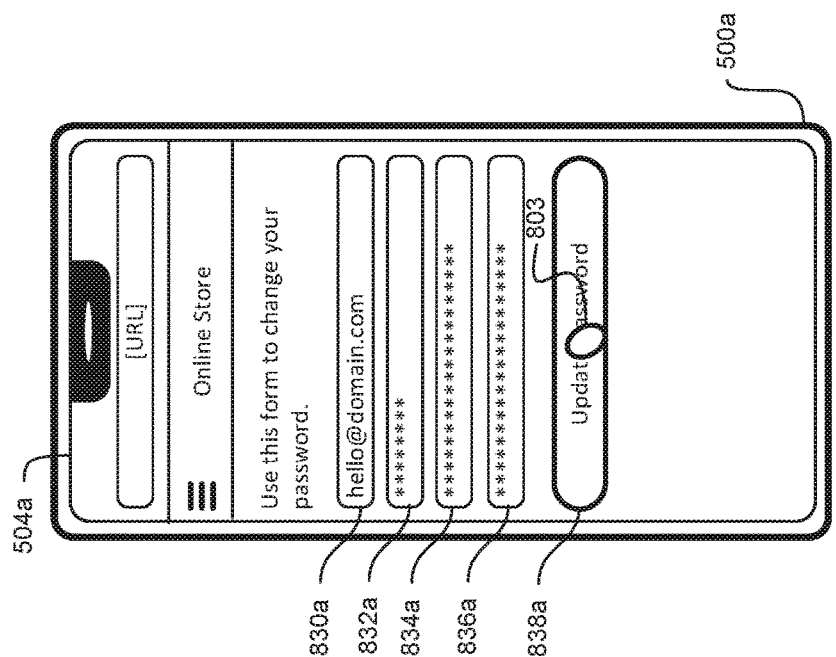
Figure 8P:
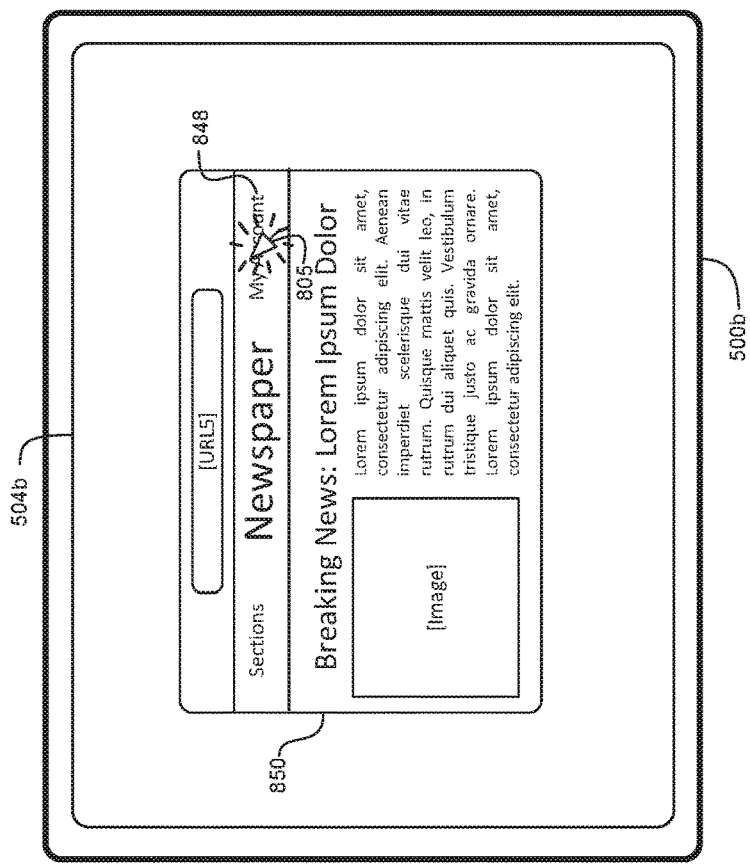
Figure 8O:
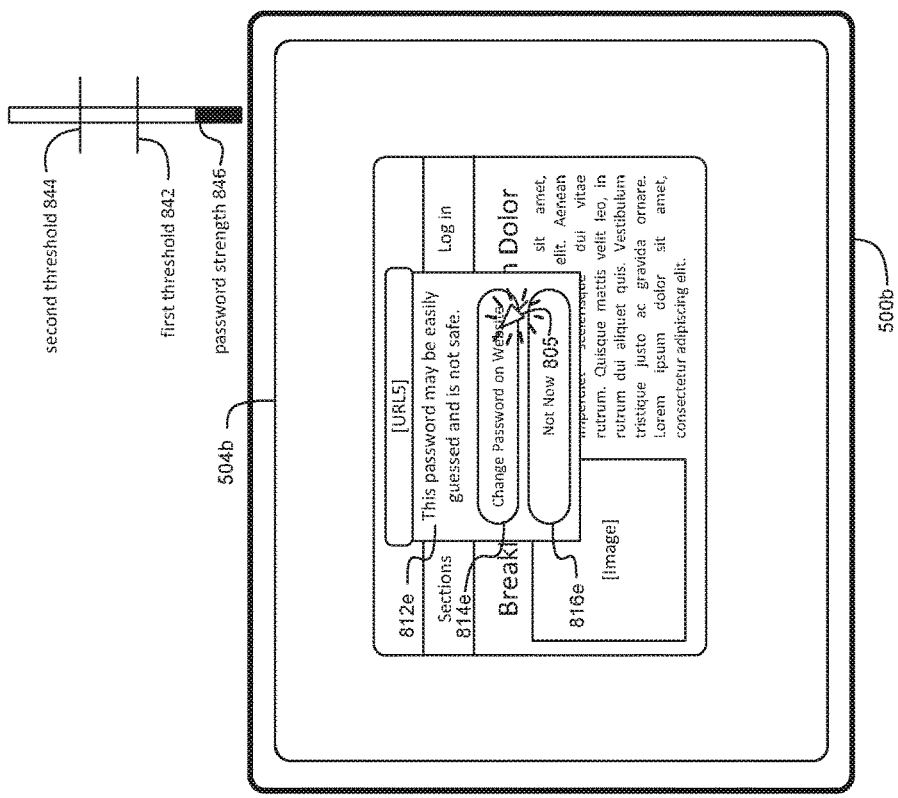
Figures 8Q, 8R:
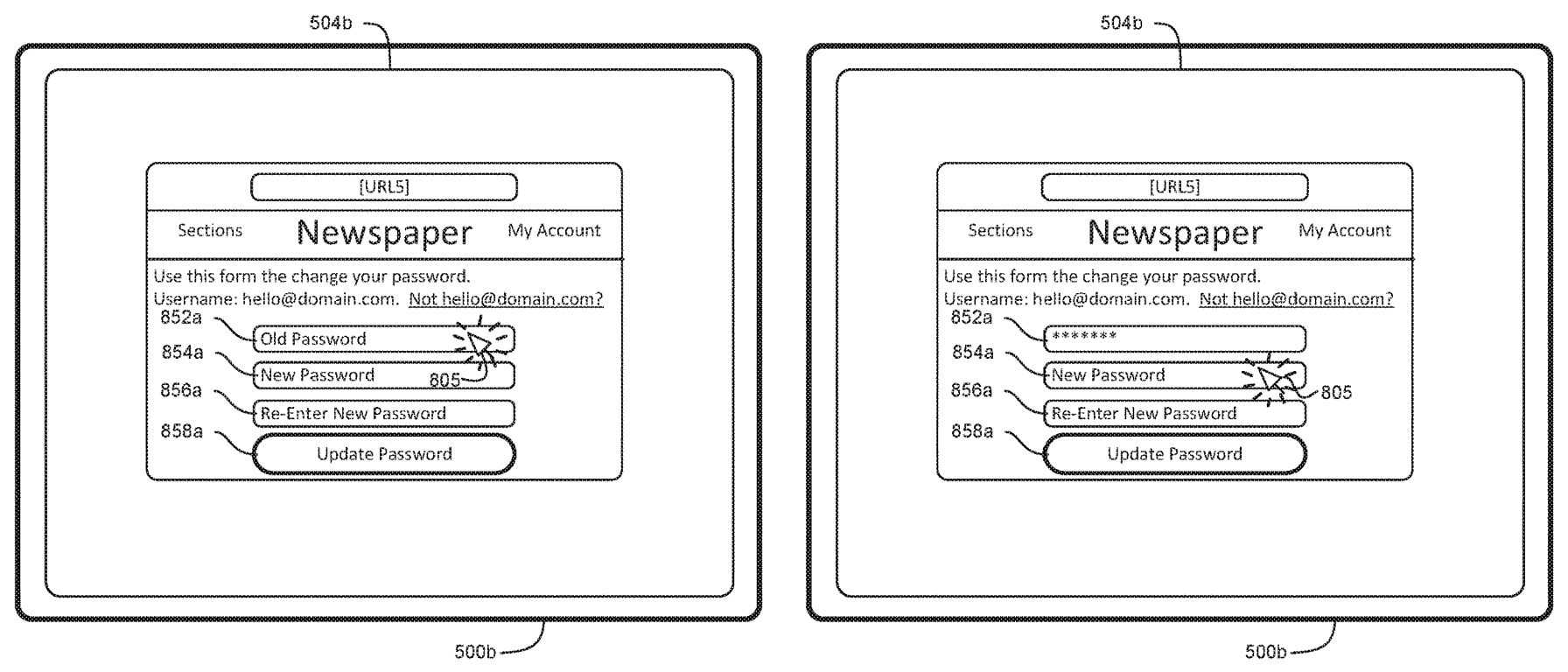
Figure 8T:
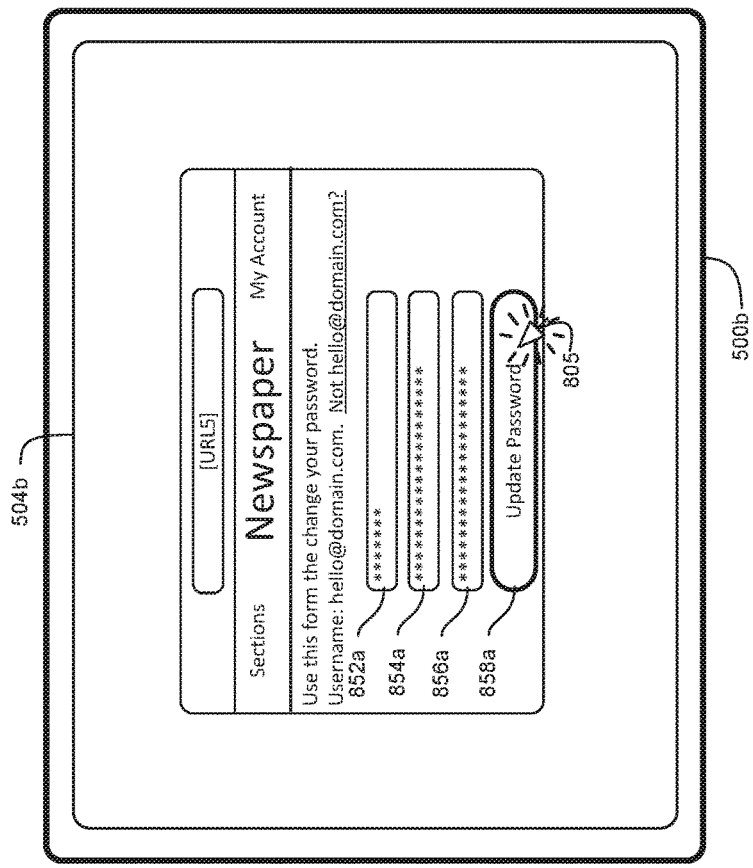
Figure 8S:
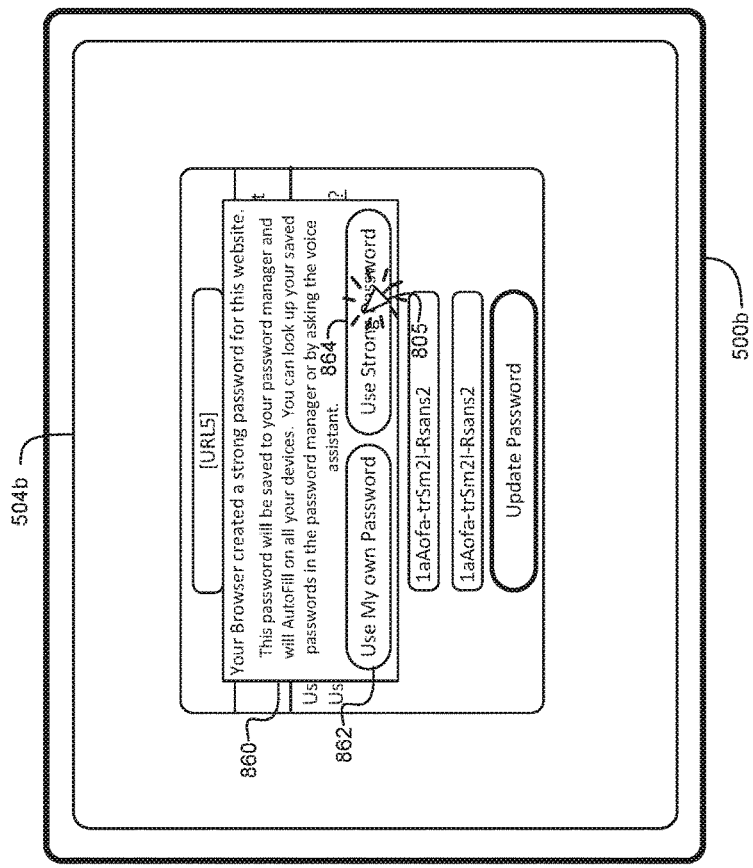
Figure 8V:
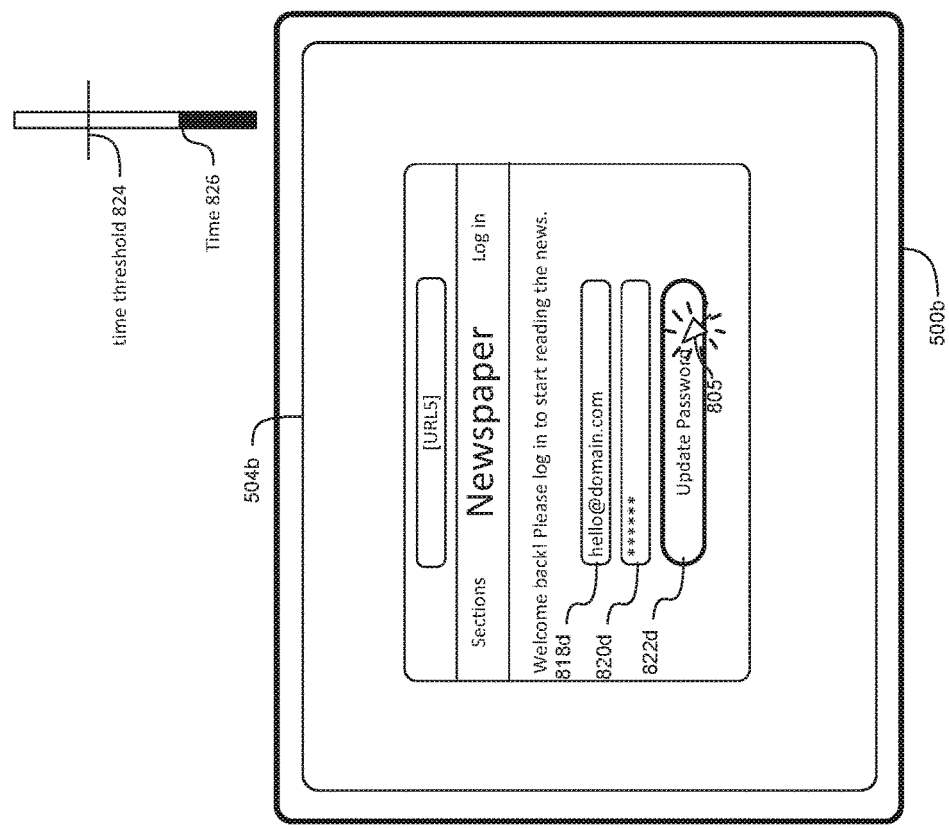
Figure 8U:
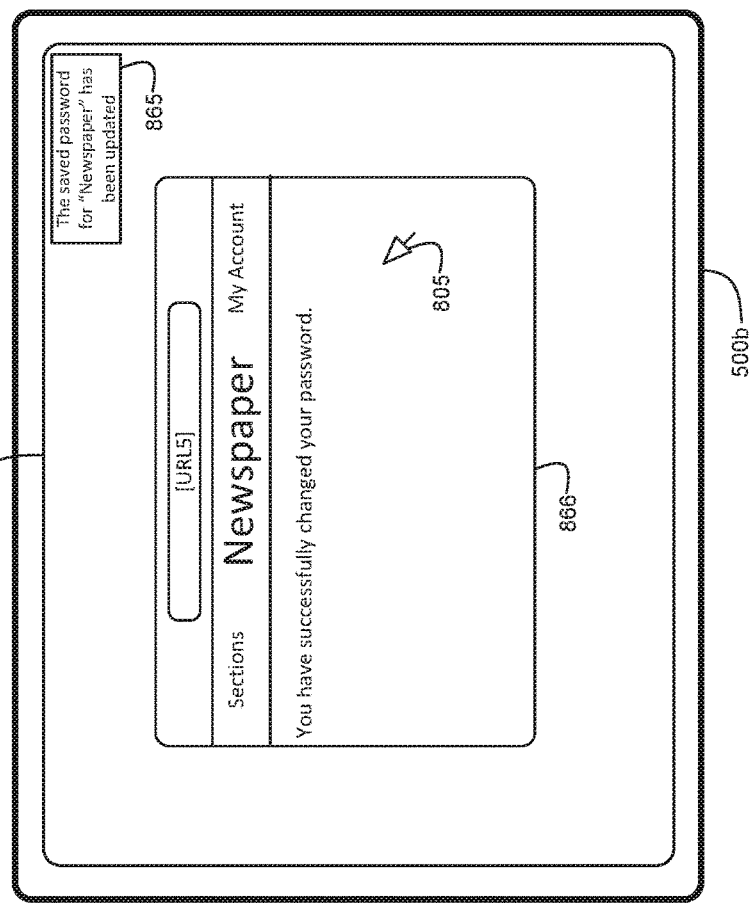
Figure 8B:
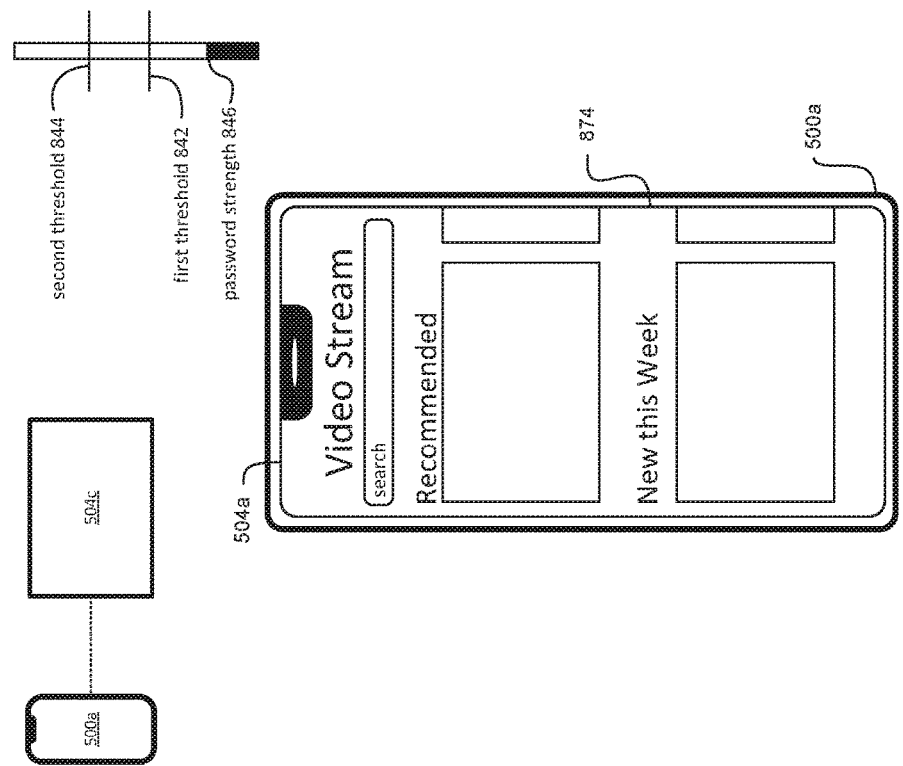
Figure 8A:
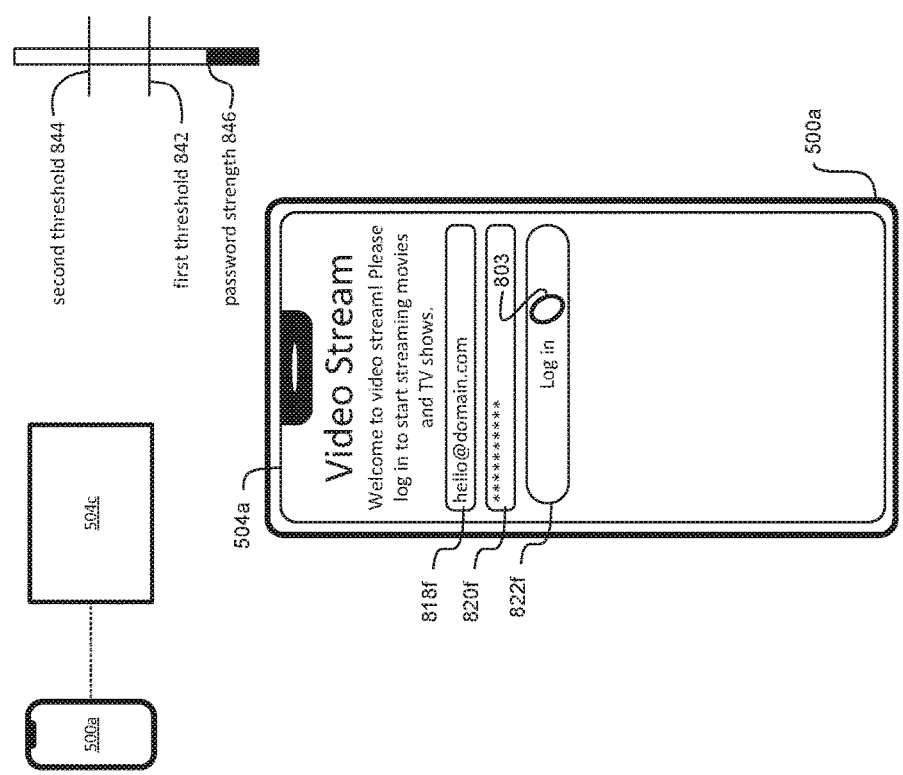

FIGS. 8A-8UU illustrate exemplary ways an electronic device 500a or 500b presents a warning that a password of a user account is weak while presenting a login user interface of the user account in accordance with some embodiments of the disclosure. The embodiments in these figures are used to illustrate the processes described below, including the processes described with reference to FIGS. 9A-9F.

FIGS. 8A-8C illustrate ways an electronic device 500a displays a weak password warning in a login user interface after the electronic device 500a enters the account information into a login user interface in response to detecting authentication of the electronic device 500a and/or password manager via facial recognition.

In FIG. 8A, the electronic device 500a displays a login user interface that includes a field 802a for the user name of the user account, a field 804a for the password of the user account, a selectable option 806a that, when selected, causes the electronic device 500a to enter the username and password in response to authentication by facial recognition, and a selectable option 808a that, when selected, causes the electronic device 500a to submit the user name and password entered in fields 802a and 804a, respectively, to the web site to log in. The user selects (e.g., with contact 803) the option 806a to cause the electronic device 500a to enter the user name and password in response to facial recognition authentication.

In FIG. 8B, in response to the user's selection in FIG. 8A, the electronic device 500a displays a visual indication 810a that the electronic device 500a is capturing an image of the user's face while the image of the user's face is captured. In FIG. 8C, in response to authenticating the user based on the image of the face, the electronic device 500a (optionally before logging into the user account) presents a warning 812a that the password is a weak password. The warning 812a includes a selectable option 814a that, when selected, causes the electronic device 500a to present either the home page of the website of the user account or a website (or other user interface) at which the user is able to change the password and a selectable option 816a that, when selected, causes the electronic device 500a to dismiss the warning 812a without displaying the homepage or the website at which the user is able to change the password. As shown in FIG. 8C, the warning 812a does not include an explanation why the password is weak.

Thus, as shown in FIGS. 8A-C, the electronic device 500a presents a weak password warning in response to detecting that the password is weak after the password was entered by the electronic device 500a in response to authenticating the user with facial recognition.

FIGS. 8D-8G illustrate forgoing presenting the weak password warning within a predetermined amount of time since the warning was last dismissed by the user and presenting the weak password warning once the predetermined amount of time has passed.

In FIG. 8D, the user has entered the user name and password into fields 818a and 820a and submitted the login form to the website at a time 826 that is less than the threshold time 824 since the weak password warning 812a illustrated in FIG. 8C was dismissed by the user in response to detecting selection of selectable option 816a to close the warning 812a without changing the password.

Figure 8F:
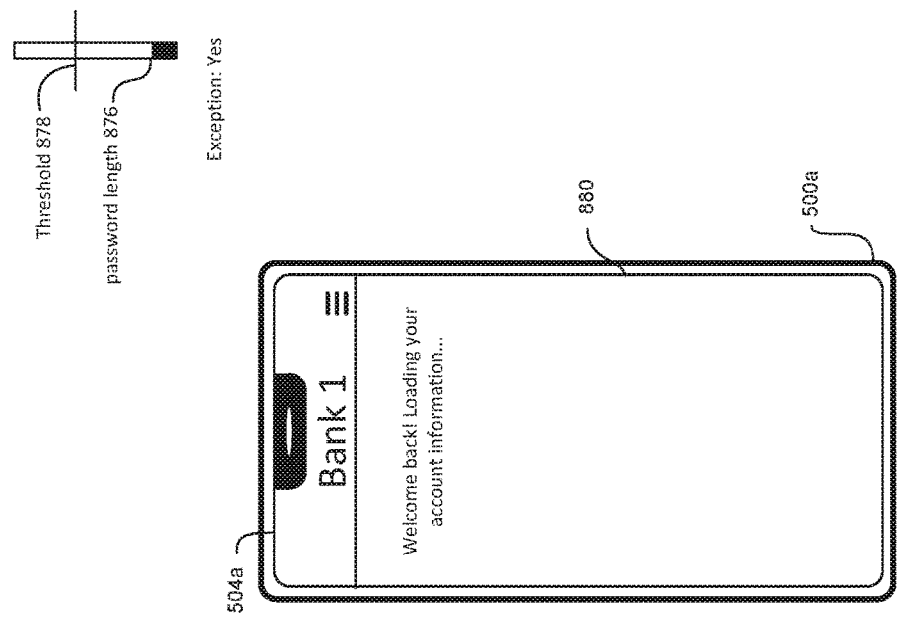
Figure 8E:
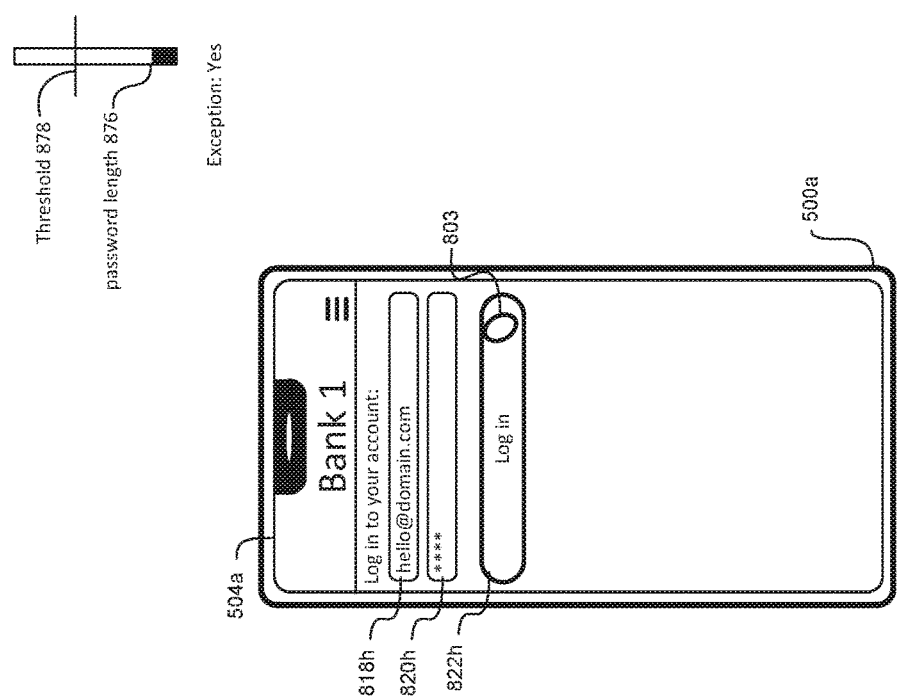
Figure 8J:
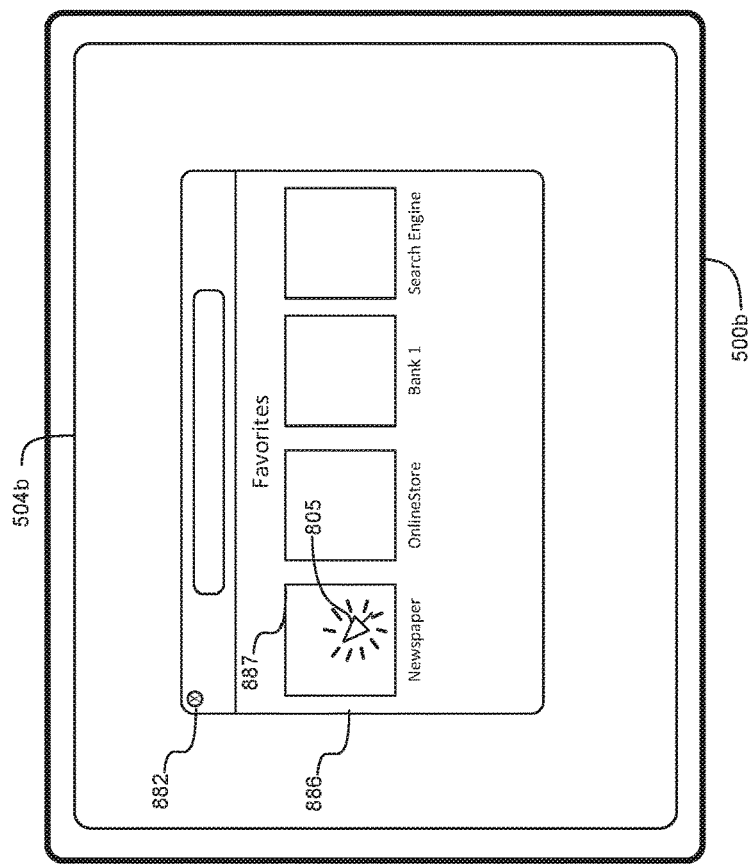
Figure 8I:
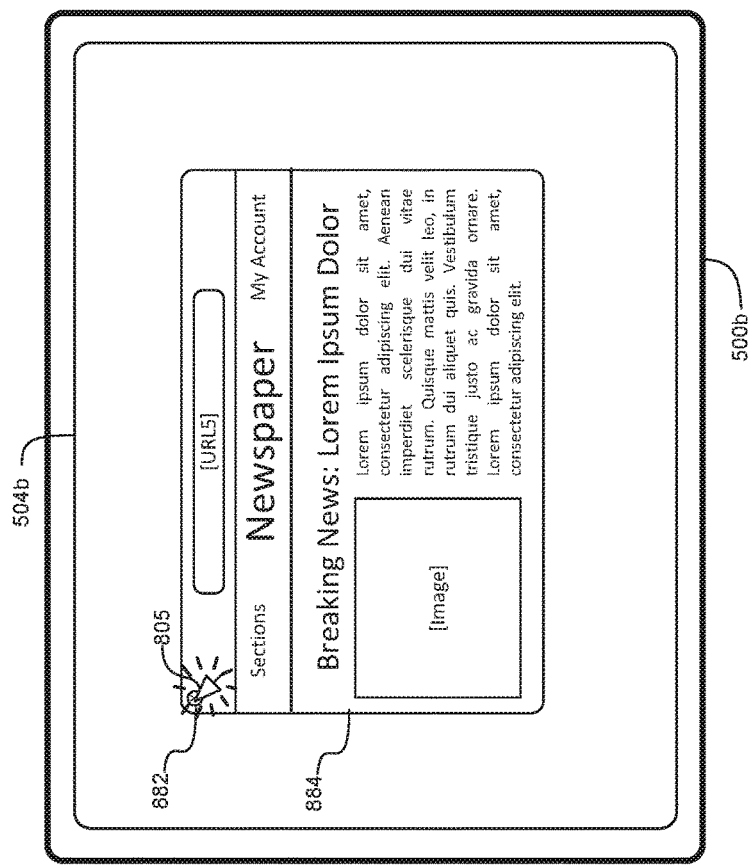
Figure 8L:
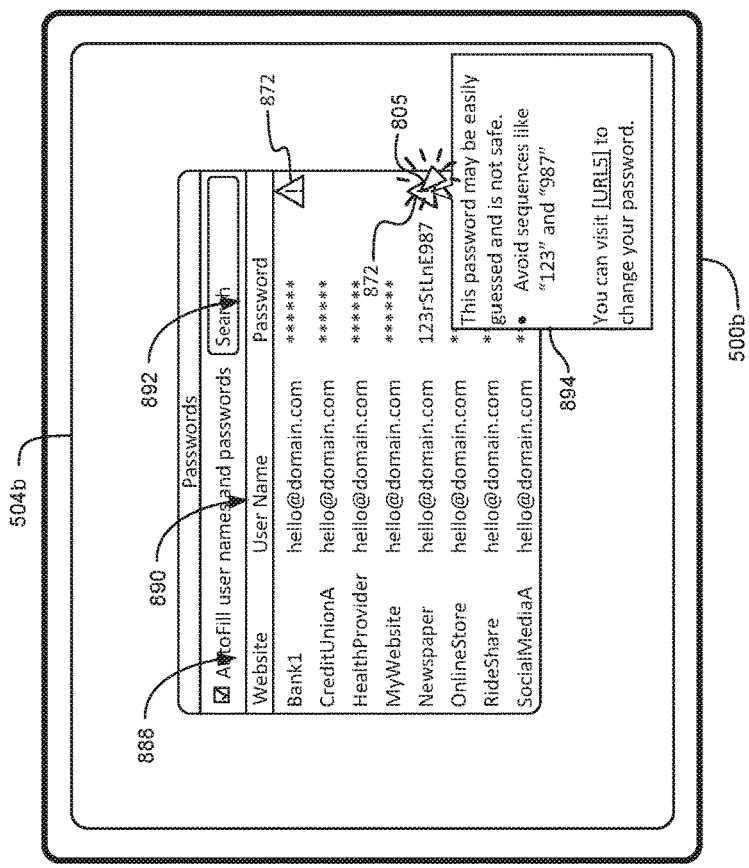
Figure 8K:
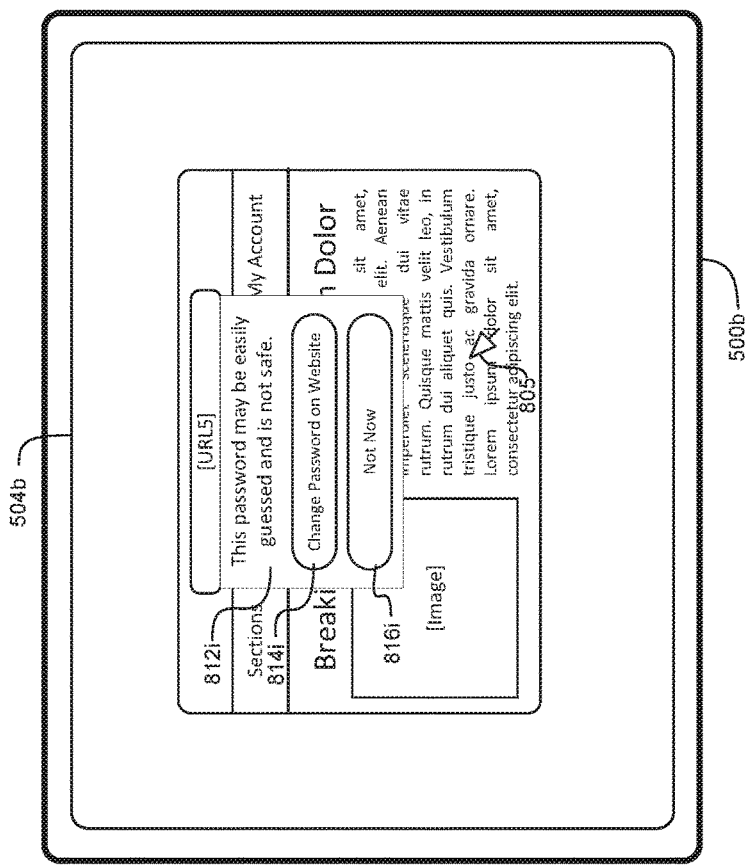

As shown in FIG. 8E, in response to entry of the correct user name and password, the website grants access to the user account and presents a user interface 828a of the website. The electronic device 500a did not present a weak password warning because the predetermined amount of time since the electronic device 500a presented the weak password warning for this website has not yet passed.

In FIG. 8F, the user has entered the user name and password into fields 818b and 820b and submitted the login form to the website at a time 826 that is more than the threshold time 824 since the weak password warning 812a illustrated in FIG. 8C was presented.

As shown in FIG. 8G, in response to entry of the correct user name and password, the device once again presents the weak password warning 812b because more than the threshold time 824 has passed since the electronic device 500a presented the weak password warning associated with this website.

Thus, as shown in FIGS. 8D-8G, the electronic device 500a does not present the weak password warning again until the predetermined amount of time has passed since the weak password warning was presented and dismissed (e.g., via selection of "not now") in association with a respective user account.

FIGS. 8G-8L illustrate ways the electronic device 500a provides a link to a website to change the password within the weak password warning and then generates and stores a new password associated with the user account.

As shown in FIG. 8G, the weak password warning 812b includes a selectable option 814b that, when selected, causes the electronic device 500a to navigate to a website that is either the home page of the website associated with the user account or a web page at which the user is able to change the password associated with the user account and a selectable option 816b that, when selected, causes the electronic device 500a to dismiss the warning 812b without changing the password. The user selects (e.g., with contact 803) the option 814b to navigate to the home page or the web page at which the user is able to change the password.

In FIG. 8H, the electronic device 500a presents a web page at which the user is able to change the password associated with the user account in response to the user's selection in FIG. 8I. The web page includes a field 830a for the user name, a field 832a for the old password, a field 834a for the new password, a field 836a to re-enter the new password, and a selectable option, that, when selected, causes the electronic device 500a to submit the content of fields 830a-836a to the website. As shown in FIG. 8H, the user selects (e.g., with contact 803) the user name field 830a. After selecting the user name field 830a, the user is able to enter the user name associated with the user account into the field.

In FIG. 8I, after the user enters the user name 830a and current password 834a, the user selects (e.g., with contact 803) the field 834a to enter the new password. As shown in FIG. 8J, in response to the user's selection in FIG. 8I, the electronic device 500a presents an indication 812c that the electronic device 500a generated a strong password for use with the user account. The indication 812c includes a selectable option 814c that, when selected, causes the electronic device 500a to use the strong password and a selectable option 816c to forgo using the strong password to allow the user to pick the new password. In some embodiments, in response to detecting selection of the option 816c to allow the user to pick the new password themselves, the electronic device displays a soft keyboard via which the user is able to enter their own password into the password text entry field of the webpage. The user selects (e.g., with contact 803) the option 814c to use the strong password.

In FIG. 8K, in response to the user's selection in FIG. 8J, the electronic device 500a fills in the fields 834a and 836a for the new password. The user selects (e.g., with contact 803) the option 838a to update the password on the website.

In response to the user's selection in FIG. 8K, the electronic device 500a presents a webpage 840 that confirms that the password has been successfully changed. In response to detecting that the password has been changed, the electronic device 500a presents a notification 812d of the changed password, an option 814d to update the password saved in association with the user account, and an option 816d to dismiss the notification 812d without updating the saved password.

Thus, as shown in FIGS. 8G-8L, the electronic device 500a provides a link to a website to change the password within the weak password warning and then generates and stores a new password associated with the user account.

FIGS. 8M-8U illustrate ways the electronic device 500b provides a link to the homepage of a website within the weak password warning and generates and stores a new password associated with the user account.

Figures 8M, 8N:
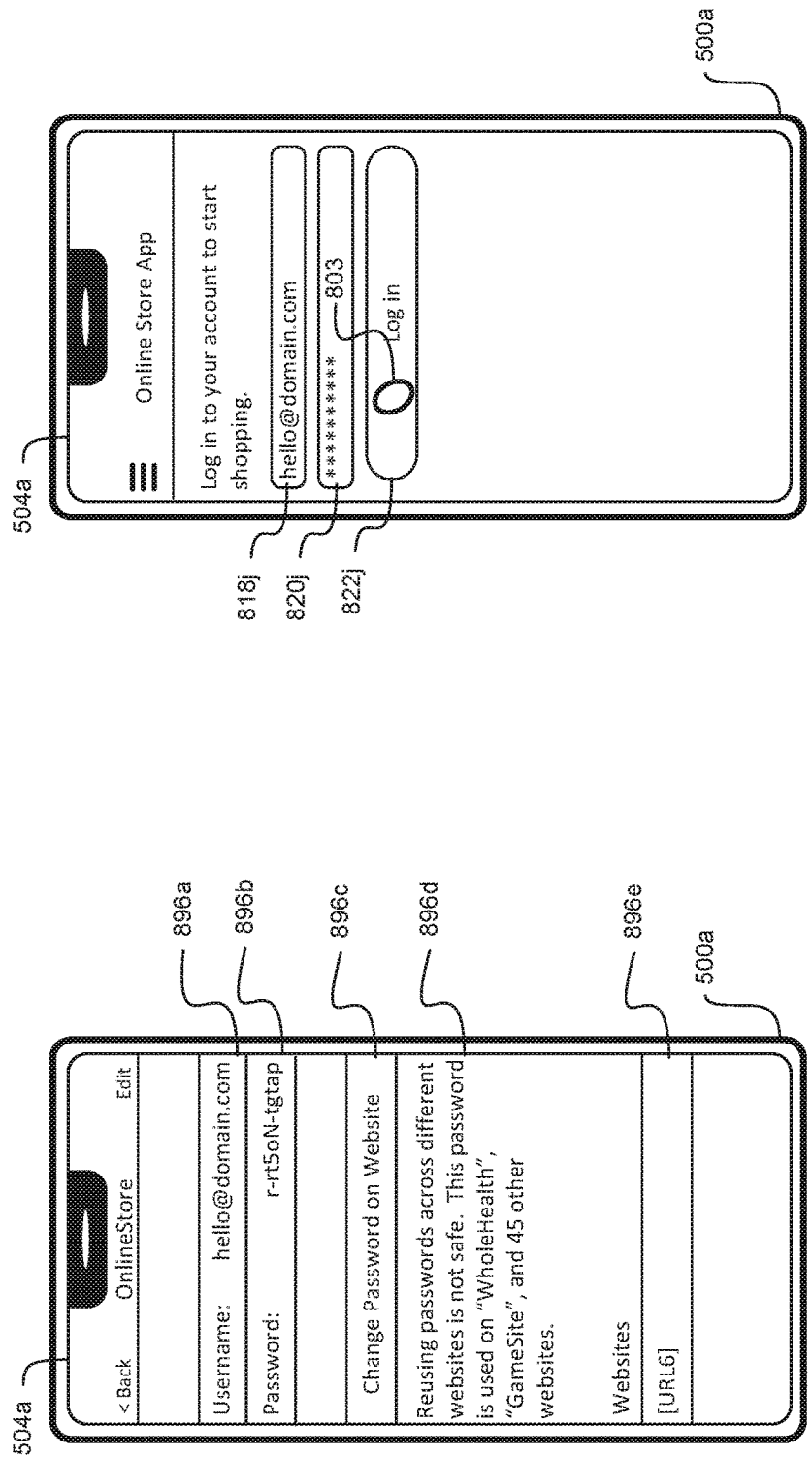
Figure 8P:
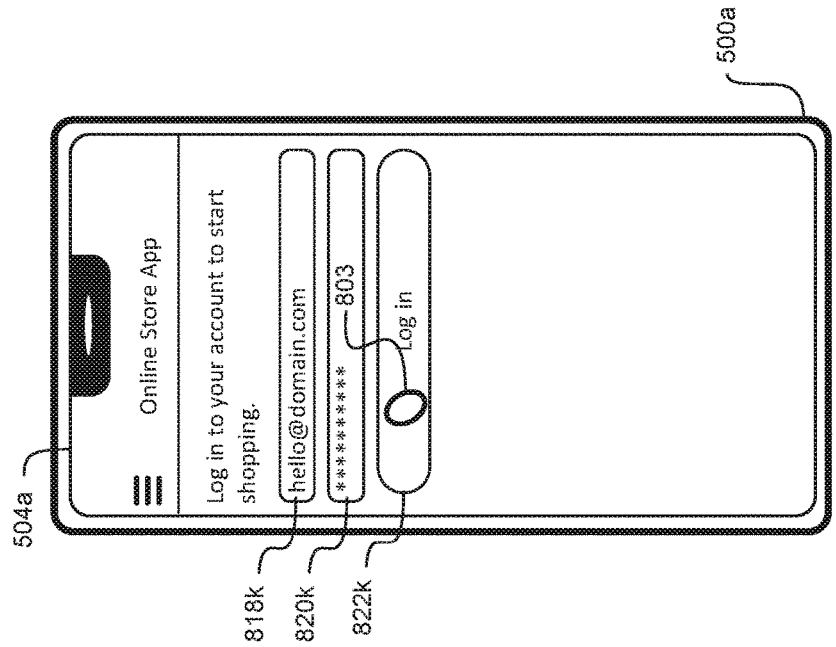
Figure 8O:
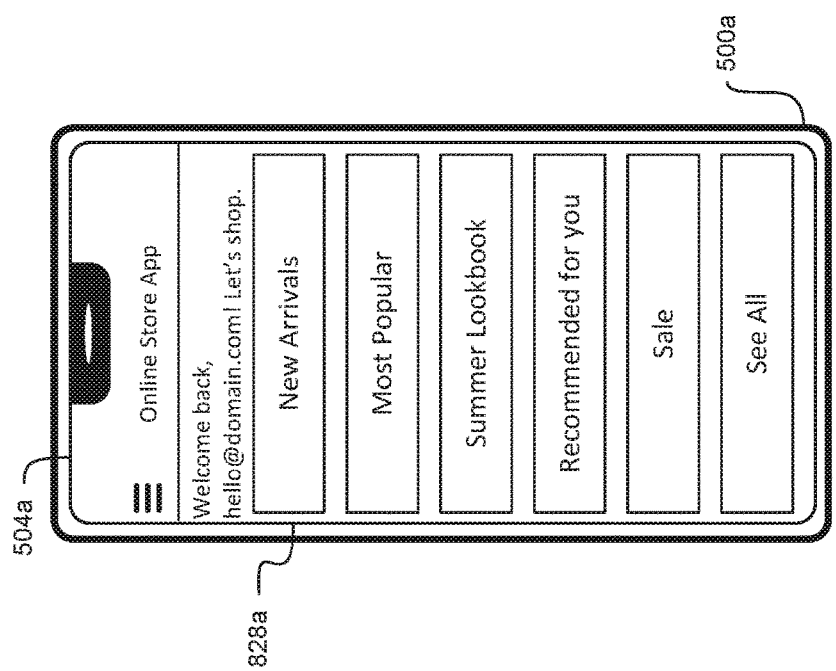
Figure 8U:
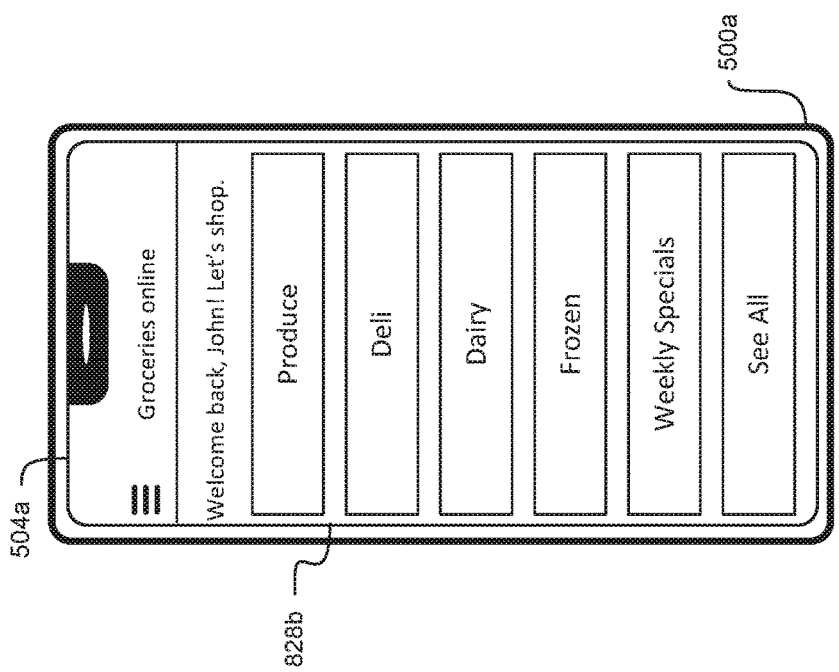
Figure 9A:
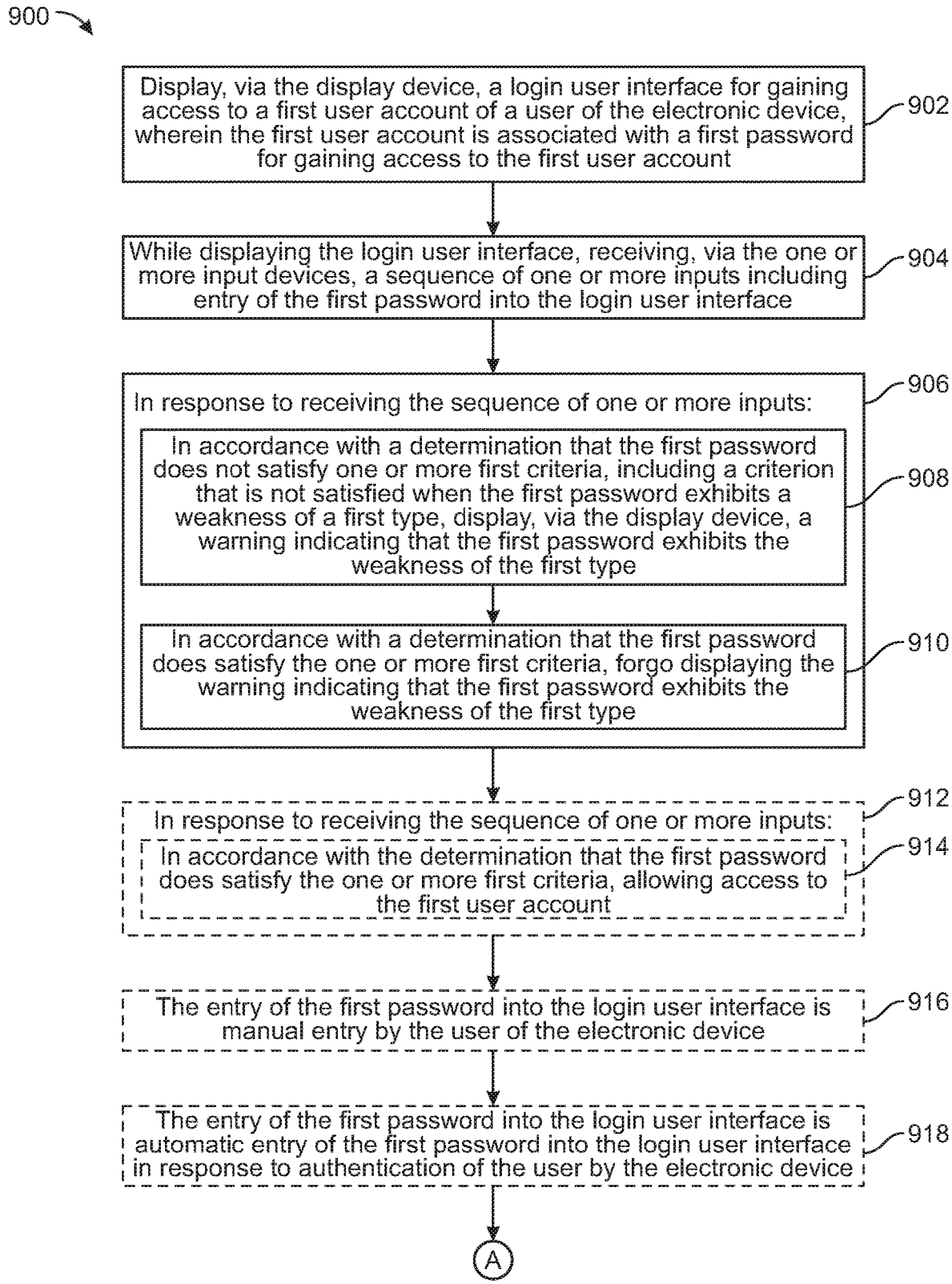
FIGS. 9A-9F are flow diagrams illustrating a method of presenting a warning that a password of a user account is weak while presenting a login user interface of the user account in accordance with some embodiments of the disclosure.
Figure 9B:
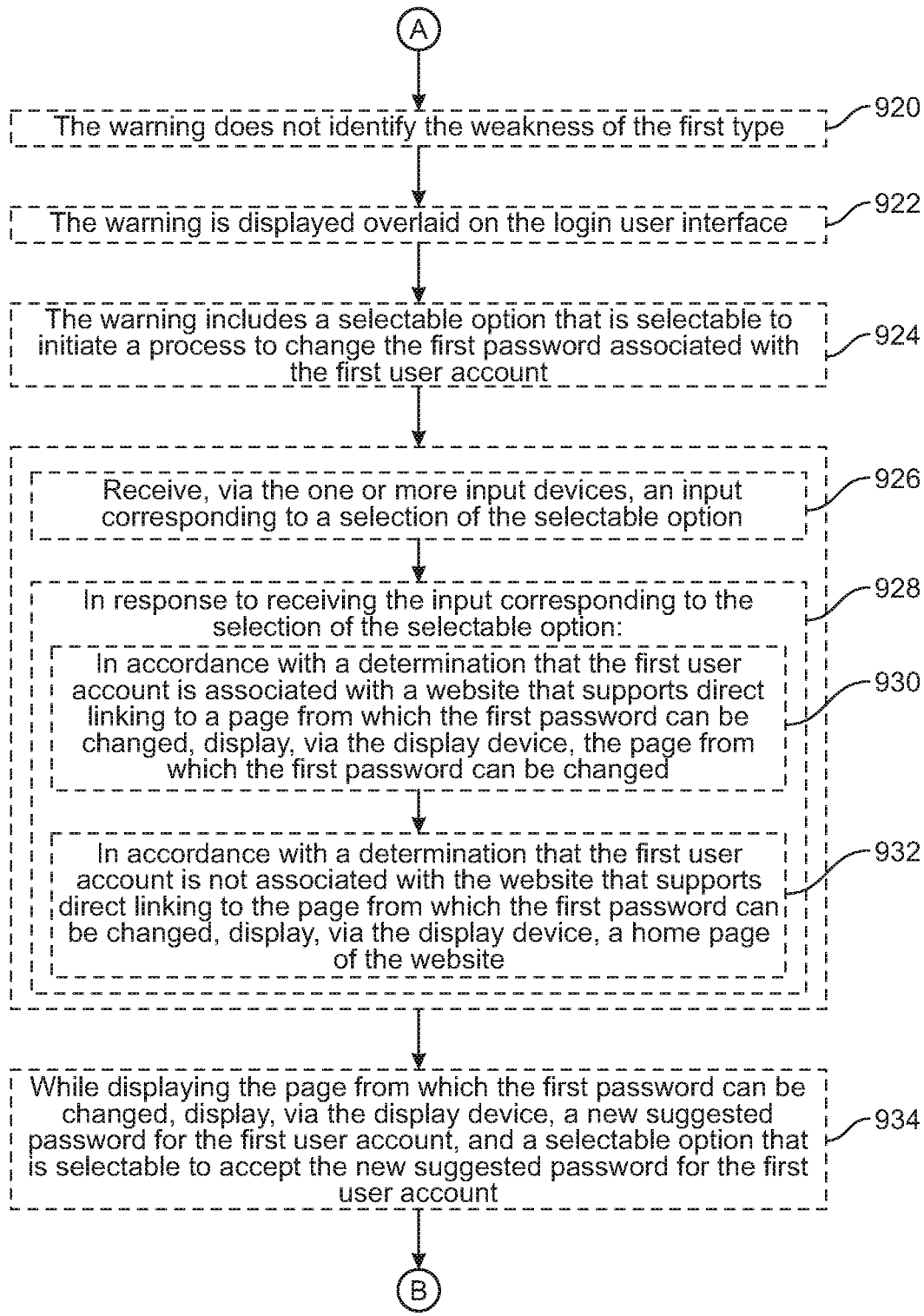
Figure 9C:
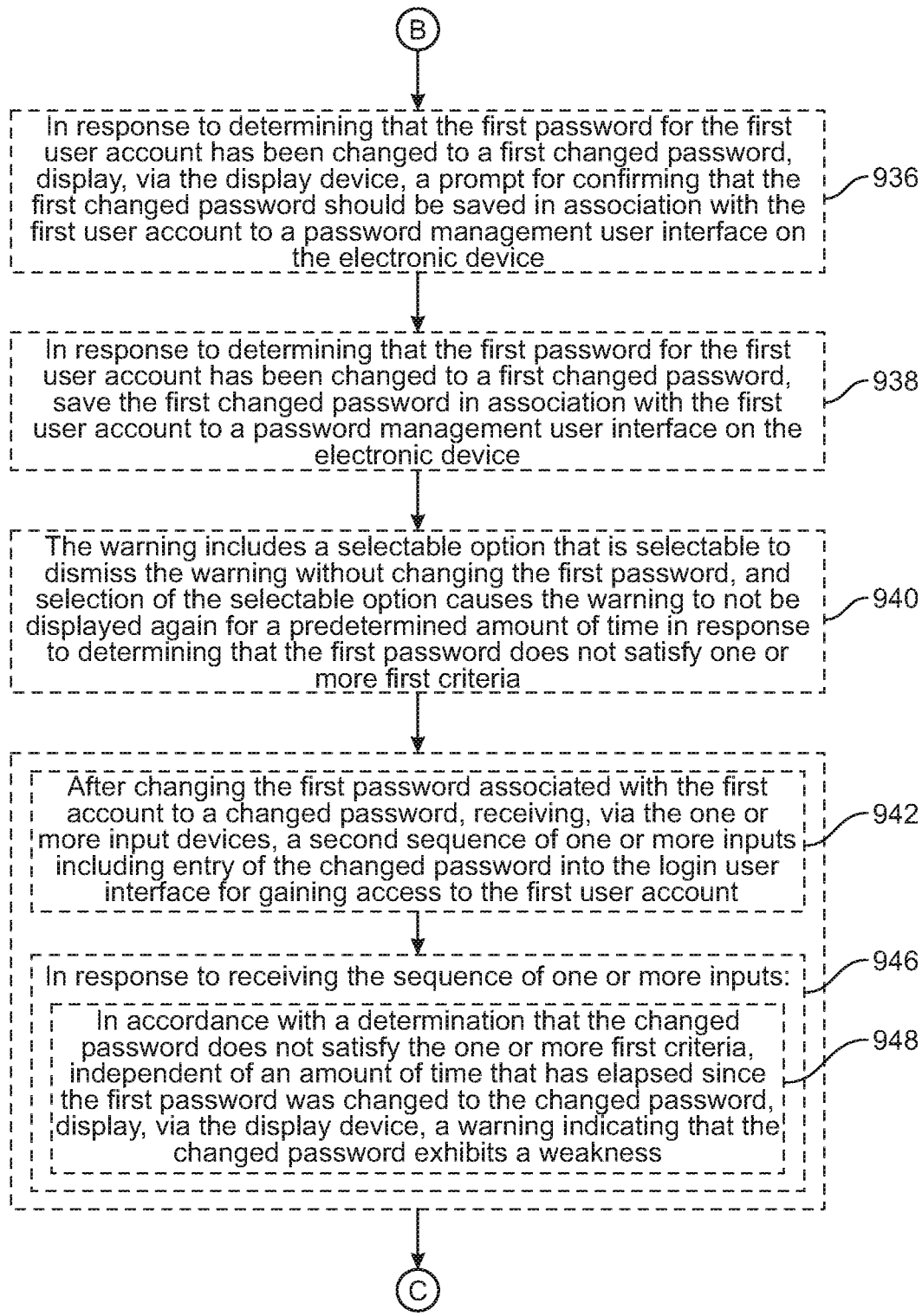
Figure 9D:
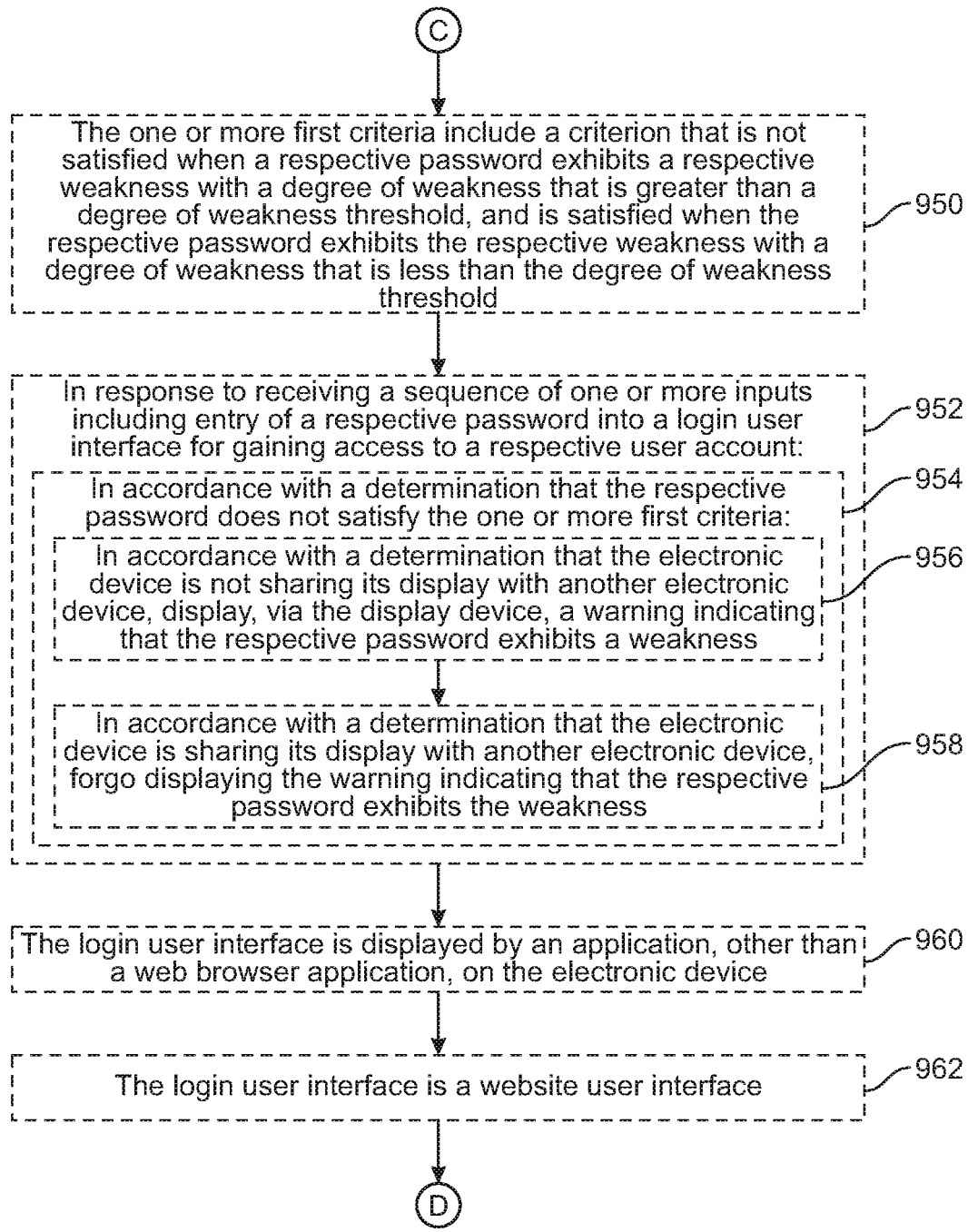
Figure 9E:
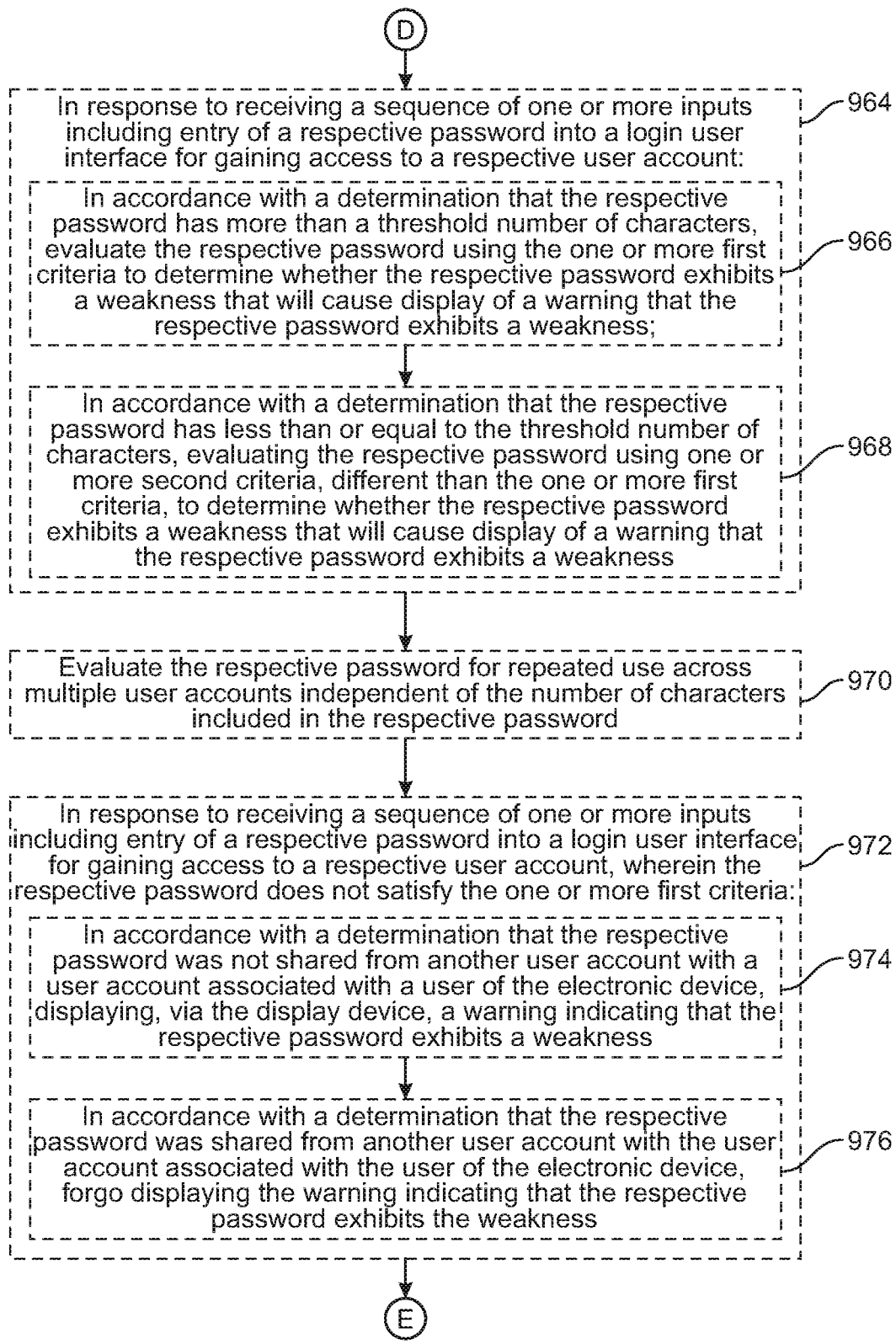
Figure 9F:
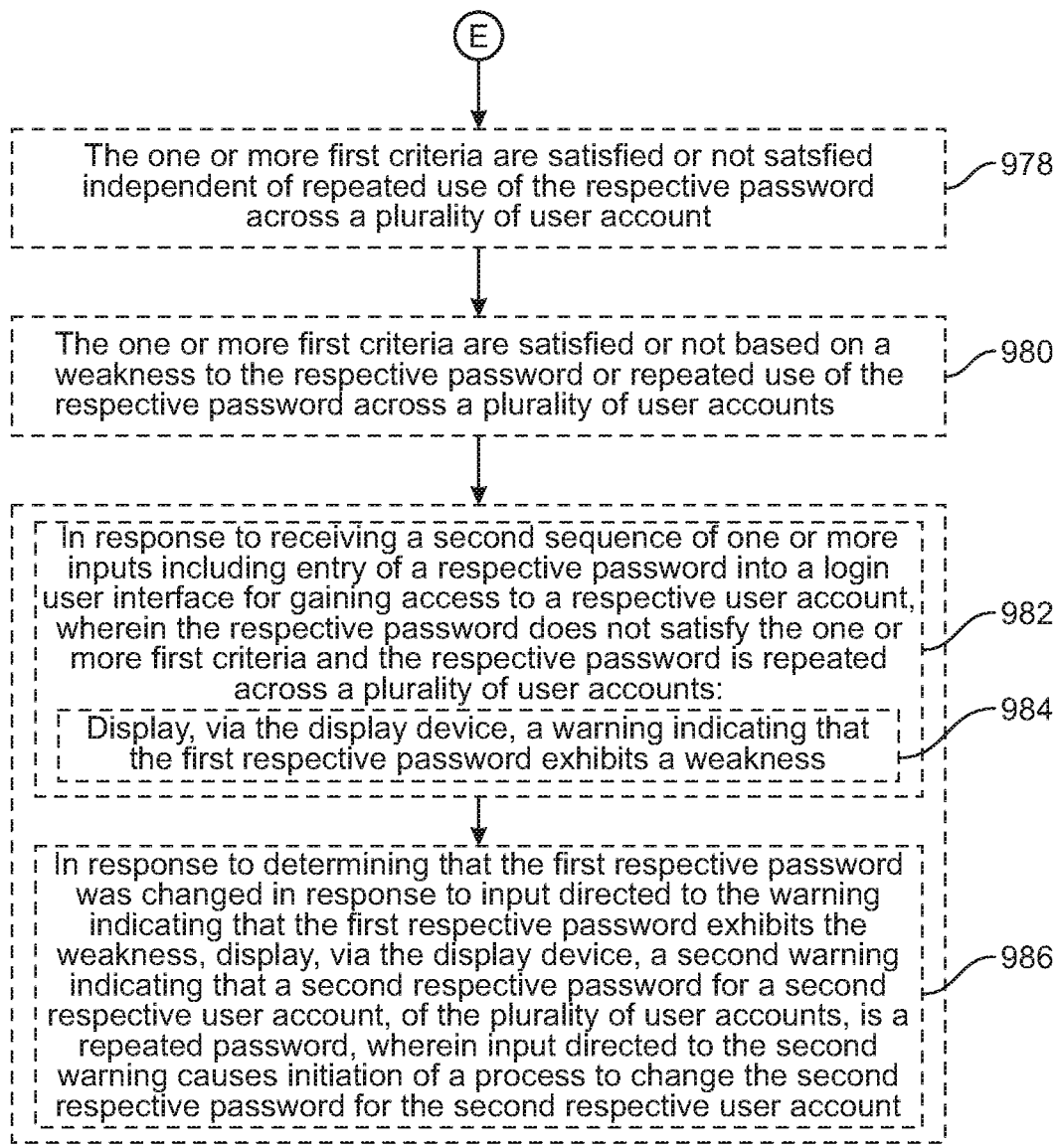

FIG. 8M illustrates a login page of a website. The login page includes a field 818c for the user name and a field 820c for the password associated with a user account of the website. The login page further includes a selectable option 822c that, when selected, causes the electronic device 500b to submit the user name 818c and password 820c to the website to log in. The user selects (e.g., with cursor 804) the user name field 818c to enter the user name.

As shown in FIG. 8N, after entering the user name and password, the user selects (e.g., with cursor 805) the option 822c to submit the user name and password to the website. As will be described in more detail below with reference to FIGS. 8X-8Z, the electronic devices 500a and 500b evaluate the password strength relative to two thresholds 842 and 844. In response to detecting entry of a password that is weaker than the first threshold 842, the electronic devices 500a and 500b present weak password warnings in the login user interface associated with the user accounts and within a password manager user interface, such as the password manager user interface illustrated in FIG. 8Z. In response to detecting entry of a password that is stronger than the first threshold 842 but weaker than the second threshold 844, the electronic device 500a or 500b forgoes presenting the warning in the login user interface and presents the warning in the password manager user interface.

Returning to FIG. 8N, the strength 846 of the password 820c entered by the user is weaker than the first threshold 842. The user selects (e.g., with cursor 805) the option 822c to submit the user name 818c and password 820c to the website to log in to the user account.

In response to the user's selection in FIG. 8N and the determination that the strength 846 of the password is less than the first threshold 842, the electronic device 500b presents a weak password warning 812e. The weak password warning 812e includes a link 814e to the homepage of the website from which the user is able to navigate to a webpage where the user is able to change the password and an option 816e to dismiss the warning 812e without changing the password. The user selects (e.g., with cursor 805) the option 814e to navigate to the home page of the website.

FIG. 8P illustrates the home page 850 of the website that is displayed in response to the user's selection in FIG. 8N. The home page 850 includes an option 848 to view a menu associated with the user account of the website. The user selects (e.g., with cursor 805) the option 848 to view the menu associated with the user account. From the menu, the user is able to select an option to navigate to a web page at which the user is able to change the password.

In response to one or more inputs including the selection illustrated in FIG. 8P, the electronic device 500b presents the change password webpage illustrated in FIG. 8Q. The webpage includes fields 852a-856a in which to enter the old and new passwords. The user selects (e.g., with cursor 805) the old password field 852a into which the user is able to enter the old password.

In FIG. 8R, after entering the old password into field 852a, the user selects (e.g., with cursor 805) the field 854a into which the user is able to enter the new password. In response to the user's selection in FIG. 8R, the electronic device 500b presents the indication 860 in FIG. 8S that the electronic device 500b generated a strong password to be used with the user account. The indication 860 includes an option 862 to dismiss the indication 860 without using the device-generated password and an option 864 to use the device-generated password. The user selects (e.g., with cursor 805) the option 864 to use the device-generated password.

In response to the user's selection in FIG. 8S, the electronic device 500b fills in the fields 854a and 856a for the new password, as shown in FIG. 8T. The user selects (e.g., with cursor 805) the option 858a to update the password associated with the user account of the website.

In FIG. 8U, in response to the user's selection in FIG. 8T, the electronic device presents a webpage 866 that confirms the password has been changed and an indication 865 that the electronic device 500b automatically changed the password stored in association with the user account.

Thus, as shown in FIGS. 8M-8U, the electronic device 500b is able to provide a link to the homepage of a website within the weak password warning and generate and store a new password associated with the user account.

FIGS. 8V-8W illustrate ways in which the electronic device 500b generates the weak password warning in response to determining that the new password no longer satisfies one or more strong password criteria. For example, the one or more strong password criteria change, causing a password that was once considered strong to be considered weak.

In FIG. 8V, after entering the user name 818d and password 820d, the user selects (e.g., with cursor 805) an option 822d to submit the user name and password to log into the user account associated with a website. At the time the user logs in, as shown in FIG. 8V, the amount of time 826 that has passed since the electronic device 500b last generated the weak password warning (and the amount of time since the user changed the password) is less than a threshold amount of time 824 that the electronic device 500b generally forgoes presenting the warning (e.g., the threshold of time the device would forgo presenting the warning had the user dismissed a weak password warning by selecting "not now").

In FIG. 8W, in response to the user's selection in FIG. 8V, the electronic device 500b presents the weak password warning 812f. The weak password warning 812f is presented despite the time 826 since the warning was last presented and the time the user changed their password being less than the threshold time 824, because the password changed from being considered strong to being considered weak (e.g., because one or more strong password criteria have changed).

Thus, as shown in FIGS. 8V-8W, the electronic device 500b is able to generate the weak password warning in response to determining that the new password no longer satisfies one or more strong password criteria, independent of an amount of time that has passed since the user last changed the password for that user account.

FIGS. 8X-8Z illustrate ways an electronic device 500a forgoes presenting a weak password warning in a login user interface but presents a weak password warning in a password management user interface in response to determining that the strength of the password is between two password strength thresholds.

As shown in FIG. 8X, the user enters a user name 818e and password 820e into a login user interface of an application. After entering the account information, the user selects (e.g., with contact 803) an option 822e to log into the user account. The electronic device 500a determines that the strength 846 of the password is between the first threshold 842 and second threshold 844. The first and second thresholds 842 and 844 are described above with reference to FIG. 8N.

In response to the user's selection in FIG. 8X, the electronic device 500a logs into the user account and presents a user interface of the application, as shown in FIG. 8Y. The electronic device 500a does not present a weak password warning while logging into the user account because the password strength 846 is greater than the first threshold 842.

As shown in FIG. 8Z, however, the electronic device 500a presents the warning icon 872 within the representation 870g of the user account in the password management user interface illustrated in FIG. 8Z because the password strength 846 is less than the second threshold 844.

Thus, as shown in FIGS. 8X-8Z, the electronic device 500a forgoes presenting a weak password warning in a login user interface but presents a weak password warning in a password management user interface in response to determining that the strength of the password is between two password strength thresholds.

The electronic device 500a forgoes presenting a weak password warning when the electronic device 500a is sharing its screen with another display device, such as display device 504c illustrated in FIG. 8AA. As shown in FIG. 8AA, the user selects 822f an option to log into a user account for which the password strength 846 is less than the first threshold 842. Although not shown in FIG. 8AA, it should be understood that other conditions for presenting the weak password warning are met, such as the amount of time since the warning was presented exceeding a threshold amount of time.

In FIG. 8BB, in response to the user's selection in FIG. 8AA, the electronic device 500a logs into the user account and presents a user interface 874 of the application without presenting a weak password warning. The weak password warning is not presented because the electronic device 500a is sharing its screen with another display device 504c. If the electronic device 500a were not sharing its screen, a weak password warning would optionally be presented in response to the user logging into the account.

FIGS. 8CC-8FF illustrate ways the electronic device 500a presents the weak password warning for passwords with a short length that is not a length that is an exception to the short password criteria (e.g., 4 or 6 characters, which is indicative that the password is a PIN that cannot include additional characters).

In FIG. 8CC, the electronic device 500a detects selection (e.g., with contact 803) of an option 822g to log into a user account that has a password that is of a length 876 that is shorter than a length threshold 878 (e.g., a length threshold for a password to be considered a strong password) and is not a length that is an exception of the short password criteria.

As shown in FIG. 8DD, in response to the user's selection in FIG. 8CC, the electronic device 500a presents a warning 812g that the password is weak. The warning 812g includes an option 814g to change the password and an option 816g to dismiss the warning 812g without changing the password.

In FIG. 8EE, the electronic device 500a detects selection (e.g., with contact 803) of an option 822h to log into a user account that has a password that is of a length 876 that is shorter than a length threshold 878 and is a length that is an exception of the short password criteria. For example, because the password is four characters, the electronic device 500a does not evaluate the length of the password when evaluating the strength of the password, because it is possible that the password is a PIN that is required to be 4 or 6 characters.

In response to the user's selection in FIG. 8EE, the electronic device 500a logs into the user account and presents a user interface 880 of the application without presenting the weak password warning.

Thus, as shown in FIGS. 8CC-8FF, the electronic device 500a presents the weak password warning for passwords with a short length that is not a length that is an exception of the short password criteria.

FIGS. 8GG-8LL illustrate ways the electronic device 500b presents the weak password warning when returning to a website into which the user account remains logged in.

In FIG. 8GG, a user logs into a user account of a website. The login user interface includes an option 884 to remain logged into the website, even after navigating away from the website or closing the browser. While the option 884 to remain logged in is selected, the electronic device 500b detects selection (e.g., with cursor 805) of an option 822i to log into the user account.

In FIG. 8HH, in response to the user's selection, the electronic device 500b logs the user into the account and presents a warning 812h that the password is weak. The user selects (e.g., with cursor 805) an option 816h to dismiss the warning 812h without changing the password.

After interacting with the website, the user selects (e.g., with cursor 805) an option 882 to close the browser window, as shown in FIG. 8II. Sometime later, the user navigates back to the website, such as by selecting (e.g., with cursor 805) an option 887 to present the website, as shown in FIG. 8JJ.

In FIG. 8KK, in response to detecting navigation to the website into which the user account remains logged in, the electronic device 500b presents the weak password warning 812i in accordance with a determination that the password is weak. The weak password warning 812i does not include a specific explanation of why the password is weak, similar to other weak password warnings 812 described herein (but it is understood that in some embodiments, the weak password warning does include a specific explanation of why the password is weak).

As shown in FIG. 8LL, a weak password warning 894 for the same user account presented in a password management user interface includes an explanation of which portion(s) of the password cause the password to be considered to be weak and the reasons why.

Thus, as shown in FIGS. 8GG-8LL, in response to navigating to a website into which a user account remains logged in, the electronic device 500b presents the weak password warning in accordance with a determination that the password is weak.

FIG. 8MM illustrates a password management user interface related to a user account associated with a website 896e. The user interface includes a warning 896d that the password is reused across multiple websites, which is not a safe password practice.

In some embodiments, the electronic device 500a presents warnings about repeated passwords in password management user interfaces, such as in FIG. 8MM, but does not present warnings about repeated passwords while the user logs into a user account that uses the repeated password, as will be described below.

In FIG. 8NN, the user selects (e.g., with contact 803) an option 822j to log into a user account after entering a user name 818j and password 820j. In response to the user's selection in FIG. 8NN, the electronic device logs into the user account and presents a user interface 828a of the application without presenting a warning that the password is reused across user accounts, as shown in FIG. 8OO.

In contrast, in some embodiments, in addition to presenting the warnings about the repeated password in a password management user interface, such as in FIG. 8MM, the electronic device 500a also presents a warning about the repeated password while the user logs into a user account that uses the repeated password.

In FIG. 8PP, the user selects (e.g., with contact 803) an option 822k to log into the user account after entering the user name 818k and password 820j. In response to the user's selection in FIG. 8PP, the electronic device 500a logs the user into the account and presents a warning 812j that the password is in use for multiple other user accounts, as shown in FIG. 8QQ. The warning 812j includes an option 814j to change the password and an option 816j to dismiss the warning 812j without changing the password.

FIGS. 8RR-8UU illustrate ways the electronic device 500a presents a warning about weakness of a password received from another user account in a password management user interface, but forgoes presenting a warning while the user is logging into the user account.

In FIG. 8RR, the electronic device 500a receives a password 898 from another user account (e.g., the user account of another electronic device). In response to receiving the password 898, the electronic device 500a presents a notification 807 of the password, an option 809 to save the password, and an option 811 to forgo saving the password. The user selects (e.g., with contact 803) the option 809 to save the password.

After saving the password, the user views a password management user interface with information about the user account of the password 896g, as shown in FIG. 8SS. The user interface includes a warning 896i that the password is weak.

In FIG. 8TT, the electronic device 500a presents a login user interface of the user account of the shared password. The user enters the username 818l and password 820l and selects (e.g., with contact 803) an option 822l to log into the account.

In response to the user's selection in FIG. 8TT, the electronic device 500a logs into the account and presents a user interface of the account, as shown in FIG. 8UU. The electronic device 500a does not present a weak password warning while logging into the user account because the password was shared by another user account (e.g., the user account of another electronic device), and it is likely that the present user of the present electronic device should not change the password associated with another user account.

Thus, as shown in FIGS. 8RR-8UU, the electronic device 500a presents a warning about weakness of a password received from another user account in a password management user interface, but forgoes presenting a warning while the user is logging into the user account.

FIGS. 9A-9F are flow diagrams illustrating a method 900 of presenting a warning that a password of a user account is weak while presenting a login user interface of the user account in accordance with some embodiments of the disclosure. The method 900 is optionally performed at an electronic device such as device 100, device 300, device 500 as described above with reference to FIGS. 1A-1B, 2-3, 4A-4B and 5A-5H. Some operations in method 900 are, optionally combined and/or order of some operations is, optionally, changed.

In some embodiments, such as in FIG. 8A, an electronic device 500 in communication with a display device and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device), displays (902), via the display device 504, a login user interface for gaining access to a first user account of a user of the electronic device, wherein the first user account is associated with a first password for gaining access to the first user account. In some embodiments, the login user interface is presented in a user interface of a web browser that presents a website associated with the first user account or in a user interface of a local application associated with the first user account. In some embodiments, the login user interface includes a first text entry field in which the user is able to enter the user name associated with the first user account and a second text entry field in which the user is able to enter the password associated with the user account.

In some embodiments, such as in FIG. 8B, while displaying the login user interface, the electronic device 500 receives (904), via the one or more input devices, a sequence of one or more inputs including entry of the first password 804a into the login user interface. Optionally, the user enters the password using a keyboard, soft keyboard, or voice input interface. In some embodiments, rather than the user entering the user name and/or password him or herself, the user is able to authenticate a password manager of the electronic device that causes the electronic device to enter the user name and password associated with the first account that is stored by the password manager. For example, the user is able to access the password manager using biometrics (e.g., finger print), an image (e.g., an image of the user's face), or a passcode or password associated with a user account of the electronic device or of the password manager. In some embodiments, in response to detecting authentication of the password manager, the electronic device enters the username and/or password associated with the first user account that is stored by the password manager into the appropriate field(s) of the login user interface.

In some embodiments, such as in FIG. 8C, in response to receiving the sequence of one or more inputs (906), in accordance with a determination that the first password does not satisfy one or more first criteria (e.g., strong password criteria), including a criterion that is not satisfied when the first password exhibits a weakness of a first type, the electronic device 500 displays (908), via the display device, a warning 812*a* indicating that the first password exhibits the weakness of the first type. Optionally, the one or more first criteria (e.g., strong password criteria) include one or more of a criterion that is satisfied when the password does not include any words included in a dictionary accessible to the electronic device, a criterion that is satisfied when the password does not include any sequences of letters or numbers (e.g., numeric sequences like "123," alphabetic sequences like "xyz," and keyboard sequences like "qwerty"), a criterion that is satisfied when the password does not include repeated patterns of characters, a criterion that is satisfied when the password does not include common character substitutions (e.g., substituting "a" for "@", "s" for "$", etc. in a dictionary word), a criterion that is satisfied when the password does not include patterns on a keyboard (e.g., "qawsed"), and a criterion that is satisfied when the password does not include information included in contact information associated with the user stored on the electronic device (e.g., the user's name, portions of the user's address, etc.). Optionally, the electronic device displays text that indicates that the password does not meet the one or more first criteria without including an indication of which first criteria are not met or which portion(s) of the password cause the first criteria to not be met. For example, the electronic device presents the text "This password may be too easily guessed and is not safe." In some embodiments, the electronic device presents the warning in response to detecting navigation to a user interface of a user account with a weak password that the user remains logged in to without entering credentials to log in again.

In some embodiments, such as in FIGS. 8X-8Y, in response to receiving the sequence of one or more inputs (906), in accordance with a determination that the first password does satisfy the one or more first criteria, the electronic device 500 forgoes (910) displaying the warning indicating that the first password exhibits the weakness of the first type. In some embodiments, when the one or more first criteria are satisfied, the electronic device does not present a warning that the password is weak because the password is not weak. In some embodiments, although the password satisfies the first criteria, it is possible that the password fails to satisfy one or more second criteria that are stricter than the one or more first criteria and, in accordance with a determination that the one or more second criteria are not satisfied, the electronic device presents information about why the password does not satisfy the one or more second criteria in a user interface other than the login user interface (e.g., in a password manager user interface, in a settings user interface, etc.), such as in method 700.

The above-described manner of displaying the warning indicating that the first password exhibits weakness of the first type within the login user interface in accordance with a determination that the one or more first criteria are not satisfied allows the electronic device to remind the user to change the first password while the user is interacting with a user interface associated with the first user account, which simplifies the interaction between the user and the electronic device and enhances the operability of the electronic device and makes the user-device interface more efficient (e.g., by reminding the user to change the first password while they are already interacting with the first user account, the user does not have to enter one or more inputs to reach a user interface associated with the first user account because the user is already viewing a user interface associated with the first user account), which additionally reduces power usage and improves battery life of the electronic device by enabling the user to use the electronic device more quickly and efficiency.

In some embodiments, such as in FIGS. 8X-8Y, in response to receiving the sequence of one or more inputs (912), in accordance with the determination that the first password does satisfy the one or more first criteria (e.g., strong password criteria), the electronic device 500 allows (914) access to the first user account. In some embodiments, if the password satisfies the one or more first criteria (e.g., strong password criteria), the electronic device access the first user account without presenting a warning indicating that the first password exhibits a weakness.

The above-described manner of allowing access to the first user account when the password satisfies the first criteria allows the electronic device to make it easier for the user to access the first account if the one or more first criteria are satisfied, which simplifies the interaction between the user and the electronic device and enhances the operability of the electronic device and makes the user-device interface more efficient (e.g., by reducing the number of inputs needed to access the first user account), which additionally reduces power usage and improves battery life of the electronic device by enabling the user to use the electronic device more quickly and efficiently.

In some embodiments, such as in FIG. 8N, the entry of the first password 820*c* into the login user interface is manual entry by the user of the electronic device (916). In some embodiments, the user manually enters a password by typing the password using a keyboard or soft keyboard or via voice input or some other input.

The above-described manner of presenting the warning after the user manually enters the password allows the electronic device to remind the user to change the password while the user is accessing the user account by manually entering the password, which simplifies the interaction between the user and the electronic device and enhances the operability of the electronic device and makes the user-device interface more efficient (e.g., by reducing the number of inputs needed to change the password), which additionally reduces power usage and improves battery life of the electronic device by enabling the user to use the electronic device more quickly and efficiently.

In some embodiments, such as in FIG. 8B, the entry of the first password 804*a* into the login user interface is automatic entry of the first password into the login user interface in response to authentication 810*a* of the user by the electronic device (918). In some embodiments, the electronic device enters the user name and/or password into the respective fields in a login user interface in response to receiving authentication. The authentication is optionally associated with the electronic device, associated with a user account for accessing the electronic device, or associated with a password management program of the electronic device. Optionally, the authentication is biometric authentication (e.g., fingerprint authentication, facial authentication, etc.), or a password or passcode for accessing the electronic device.

The above-described manner of presenting the warning after the password is entered automatically in response to authentication of the user by the electronic device allows the electronic device to remind the user to change the password while they are accessing the account automatically, which simplifies the interaction between the user and the electronic device and enhances the operability of the electronic device and makes the user-device interface more efficient (e.g., by reducing the number of inputs needed to change the password), which additionally reduces power usage and improves battery life of the electronic device by enabling the user to use the electronic device more quickly and efficiently.

In some embodiments, such as in FIG. 8C, the warning 812*a* does not identify the weakness of the first type (920). In some embodiments, the electronic device is able to present information including identification of the weakness of the first type and the portion of the password that exhibits the weakness of the first type in a user interface that includes information about the user account, such as a user interface of a password manager of the electronic device. However, in some embodiments, the electronic device does not present such information about the weakness of the password in the warning it displays in response to receiving entry of the password by the user (e.g., so that other people around the electronic device are not able to see information about the weaknesses of a user's password when the user may not expect such information to be displayed).

The above-described manner of forgoing identifying the weakness of the first type in the warning allows the electronic device to concisely present the warning about the password, which simplifies the interaction between the user and the electronic device and enhances the operability of the electronic device and makes the user-device interface more efficient (e.g., by reducing the amount of time it takes the user to read and understand the warning), which additionally reduces power usage and improves battery life of the electronic device by enabling the user to use the electronic device more quickly and efficiently.

In some embodiments, such as in FIG. 8C, the warning 812*a* is displayed overlaid on the login user interface (922). In some embodiments, the warning is displayed on a sheet that is overlaid over at least part of the login user interface (e.g., overlaid on a bottom half of the login user interface). In some embodiments, the electronic device displays the sheet by animating the sheet appearing from the bottom of the display device. In some embodiments, the electronic device displays the warning in a dialog that appears below an address bar of a web browser user interface, overlaid over the login user interface displayed in the web browser user interface.

The above-described manner of displaying the warning overlaid on the login user interface allows the electronic device to concurrently present the login user interface and the warning, which simplifies the interaction between the user and the electronic device and enhances the operability of the electronic device and makes the user-device interface more efficient (e.g., by reducing the number of inputs needed to view the login user interface and the warning), which additionally reduces power usage and improves battery life of the electronic device by enabling the user to use the electronic device more quickly and efficiently.

In some embodiments, such as in FIG. 8C, the warning 812*a* includes a selectable option 814*a* that is selectable to initiate a process to change the first password associated with the first user account (924). In response to detecting selection of the selectable option, the electronic device presents a user interface associated with the first user account from which the user is able to enter a new password. For example, in response to detecting selection of the selectable option, the electronic device presents a "change password" page of a website associated with the first user account (e.g., without requiring reentry of the username/password for that user account) or a homepage of the website associated with the first user account from which the user is able to navigate to the "change password" page of the website.

The above-described manner of including a selectable option to change the first password in the warning allows the electronic device to make it easier for the user to change the first password upon receiving the warning that the password is weak, which simplifies the interaction between the user and the electronic device and enhances the operability of the electronic device and makes the user-device interface more efficient (e.g., by reducing the number of inputs needed to change the first password), which additionally reduces power usage and improves battery life of the electronic device by enabling the user to use the electronic device more quickly and efficiently.

In some embodiments, such as in FIG. 8G the electronic device 500 receives (926), via the one or more input devices, an input corresponding to a selection (e.g., with contact 803) of the selectable option 816*a*. In some embodiments, in response to receiving the input corresponding to the selection of the selectable option (928), in accordance with a determination that the first user account is associated with a website that supports direct linking to a page from which the first password can be changed, the electronic device 500 displays (930), via the display device 504, the page from which the first password can be changed, such as in FIG. 8H. Optionally, the electronic device presents a "change password" page of a website associated with the user account that includes fields in which to enter the current credentials of the account (e.g., user name and current password) and one or more fields in which to enter the new password.

In some embodiments, such as in FIG. 8O, in response to receiving the input corresponding to the selection (e.g., with cursor 805) of the selectable option 814*e* (928), in accordance with a determination that the first user account is not associated with the website that supports direct linking to the page from which the first password can be changed, the electronic device 500 displays (932), via the display device, a home page of the website, such as in FIG. 8P. In some embodiments, the electronic device presents a home page of a website associated with the first account. Optionally, the user is able to navigate to a user interface for changing the first password (e.g., a "change password" page of the website) from the homepage of the website.

The above-described manner of providing a link to the page from which the first password can be changed when the website supports direct linking and providing a link to the homepage when the website does not support direct linking allows the electronic device to simplify the process of changing the password by directly presenting the user interface from which the password can be changed if deep linking is supported or by presenting the home page from which the user is able to navigate to the page from which the password can be changed if deep linking is not supported, which simplifies the interaction between the user and the electronic device and enhances the operability of the electronic device and makes the user-device interface more efficient (e.g., by reducing the number of inputs needed to change the first password), which additionally reduces power usage and improves battery life of the electronic device by enabling the user to use the electronic device more quickly and efficiently.

In some embodiments, such as in FIG. 8S, while displaying the page from which the first password can be changed, the electronic device 500 displays (934), via the display device 504, a new suggested password for the first user account, and a selectable option 864 that is selectable to accept the new suggested password for the first user account. In some embodiments, the electronic device generates a suggested password that satisfies the first criteria (e.g., strong password criteria). In response to detecting selection of the selectable option, the electronic device optionally enters the new password into the one or more fields for entering the new password.

The above-described manner of suggesting a new password allows the electronic device to make it easier for the user to change the password to a strong password, which simplifies the interaction between the user and the electronic device and enhances the operability of the electronic device and makes the user-device interface more efficient (e.g., by reducing the number of inputs needed to enter the new password), which additionally reduces power usage and improves battery life of the electronic device by enabling the user to use the electronic device more quickly and efficiently.

In some embodiments, such as in FIG. 8L, in response to determining that the first password for the first user account has been changed to a first changed password (e.g., a new password entered manually by the user or a new password generated by the electronic device), the electronic device 500 displays (936), via the display device, a prompt 812*d* for confirming that the first changed password should be saved in association with the first user account to a password management user interface on the electronic device. In some embodiments, the prompt includes a selectable option that, when selected, causes the electronic device to save the first changed password in association with the first user account and a selectable option that, when selected, causes the electronic device to forgo saving the first changed password in association with the first user account.

The above-described manner of presenting an option to save the changed password allows the electronic device to simplify the process of saving the changed password and simplify the process of using the changed password, which simplifies the interaction between the user and the electronic device and enhances the operability of the electronic device and makes the user-device interface more efficient (e.g., by reducing the number of inputs needed to save and use the changed password), which additionally reduces power usage and improves battery life of the electronic device by enabling the user to use the electronic device more quickly and efficiently.

In some embodiments, such as in FIG. 8U, in response to determining that the first password for the first user account has been changed to a first changed password (e.g., the user manually enters a changed password or the electronic device generates a changed password and enters it into one or more fields for the new password in the user interface for changing the first password), the electronic device 500 saves (938) the first changed password in association with the first user account to a password management user interface on the electronic device. In some embodiments, the electronic device automatically saves the first changed password without prompting the user to save the first changed password.

The above-described manner of saving the changed password in response to detecting entry of the changed password and/or detecting that the password has been successfully changed for the first user account to the first changed password allows the electronic device to simplify the process of saving the changed password and using the changed password after it is saved, which simplifies the interaction between the user and the electronic device and enhances the operability of the electronic device and makes the user-device interface more efficient (e.g., by reducing the number of inputs needed to save and use the changed password), which additionally reduces power usage and improves battery life of the electronic device by enabling the user to use the electronic device more quickly and efficiently.

In some embodiments, such as in FIG. 8C, the warning 812*a* includes a selectable option 816*a* that is selectable to dismiss the warning 812*a* without changing the first password, and selection of the selectable option 812*a* causes the warning to not be displayed again for a predetermined amount of time (e.g., 2 months, 3 months, etc.) 824, such in FIG. 8D, in response to determining that the first password does not satisfy one or more first criteria (940). In some embodiments, if the user logs in to the first account within the predetermined amount of time using the weak password, the electronic device forgoes presenting the warning. Optionally, once the predetermined amount of time has passed since the warning was displayed, in response to detecting the user logging in to the first user account with the weak password, the electronic device presents the warning.

The above-described manner of dismissing the warning and not displaying the warning again for the predetermined amount of time in response to detection selection of the selectable option allows the electronic device to simplify the process of logging into the user account during the predetermined amount of time when the warning is not re-displayed, which simplifies the interaction between the user and the electronic device and enhances the operability of the electronic device and makes the user-device interface more efficient (e.g., by reducing the number of inputs needed to log in to the user account by forgoing presenting the warning for the predetermined amount of time), which additionally reduces power usage and improves battery life of the electronic device by enabling the user to use the electronic device more quickly and efficiently.

In some embodiments, such as in FIG. 8V, after changing the first password associated with the first account to a changed password, the electronic device 500 receives (942), via the one or more input devices, a second sequence of one or more inputs including entry of the changed password 820*d* into the login user interface for gaining access to the first user account. Optionally, one or more inputs to view a user interface associated with the first account while the first user account remains logged in, one or more inputs to manually enter a username and/or password of the first account to log in to the first account, one or more inputs to provide authentication to the electronic device (e.g., biometrics, facial recognition, entry of a device password or passcode) to cause the electronic device to automatically enter the saved user name and password information of the first user account.

In some embodiments, such as in FIG. 8W, in response to receiving the sequence of one or more inputs (946), in accordance with a determination that the changed password does not satisfy the one or more first criteria (e.g., strong password criteria), independent of an amount of time 826 that has elapsed since the first password was changed to the changed password, the electronic device 500 displays (948), via the display device, a warning 814*f* indicating that the changed password exhibits a weakness. In some embodiments, after the user changes the first password, the predetermined period of time (e.g., 2 months, 3 months) during which the electronic device forgoes presenting the warning is reset. Optionally, if the user changes the password and, after changing the password, the one or more first criteria change such that the changed password does not satisfy all of the new first criteria, the electronic device will present the warning regardless of how long it has been since the user changed the first password.

The above-described manner of presenting the warning if the password becomes weak within the predetermined amount of time from when the password was changed allows the electronic device to inform the user that the password is weak while the user is logging into the user account, which simplifies the interaction between the user and the electronic device and enhances the operability of the electronic device and makes the user-device interface more efficient (e.g., by reducing the number of inputs needed to check if the password is weak), which additionally reduces power usage and improves battery life of the electronic device by enabling the user to use the electronic device more quickly and efficiently.

In some embodiments, such as in FIG. 8X, the one or more first criteria include a criterion that is not satisfied when a respective password exhibits a respective weakness with a degree of weakness that is greater than a degree of weakness threshold 842 (e.g., in response to determining that the password that is weaker than the weakness threshold, the electronic device presents the warning), and is satisfied when the respective password exhibits the respective weakness with a degree of weakness that is less than the degree of weakness threshold 844 (950). In some embodiments, in response to determining that the password is less weak than the weakness threshold, the electronic device forgoes presenting the warning. Optionally, the electronic device presents a warning in a user interface including login information about the first user account (e.g., a password manager user interface) for passwords that are not weaker than the degree of weakness threshold but are weaker than a second, less-weak weakness threshold. For example, the electronic device presents the warning in response to detecting logging into a user account for which the password is relatively more weak and the electronic device forgoes presenting the warning in response to logging into a user account for which the password is relatively less weak. In some embodiments, the electronic device presents a passive warning in the user interface of a password manager for both the relatively more weak and relatively less weak passwords.

The above-described manner of presenting the warning when the password is weaker than the degree of weakness threshold and forgoing presenting the warning when the password is less weak than the degree of weakness threshold allows the electronic device to reduce the number of inputs needed to determine that a password that is weaker than the degree of weakness threshold is weak and to reduce the number of inputs needed to log into a user account that has a password that is less weak than the degree of weakness threshold, which simplifies the interaction between the user and the electronic device and enhances the operability of the electronic device and makes the user-device interface more efficient (e.g., by enabling the user to quickly change passwords that are weaker than the degree of weakness threshold and also enabling the user to access accounts for which the passwords are less weak than the degree of weakness threshold without viewing and dismissing the warning or changing the password), which additionally reduces power usage and improves battery life of the electronic device by enabling the user to use the electronic device more quickly and efficiently.

In some embodiments, such as in FIG. 8O, in response to receiving a sequence of one or more inputs including entry of a respective password into a login user interface for gaining access to a respective user account (e.g., manual entry of the respective password or automatic entry of the respective password by the electronic device in response to detecting authentication of a password manager of the electronic device) (952), in accordance with a determination that the respective password does not satisfy the one or more first criteria (e.g., strong password criteria) (954), in accordance with a determination that the electronic device is not sharing its display with another electronic device (e.g., the electronic device is presenting the user interface on a display device incorporated into the electronic device (e.g., a display built in to a smartphone, laptop computer, or desktop computer) or on a display device that is designated as associated with the electronic device (e.g., a display device designated by the user as associated with the electronic device)), the electronic device 500 displays (956), via the display device, a warning 812e indicating that the respective password exhibits a weakness. Optionally, when the electronic device is not displaying a user interface on a display device of another electronic device and detects logging in to an account with a weak password, the electronic device presents a warning that the password is weak.

In some embodiments, such as in FIGS. 8AA-8BB, in response to receiving a sequence of one or more inputs including entry of a respective password 820f into a login user interface for gaining access to a respective user account (e.g., manual entry of the respective password or automatic entry of the respective password by the electronic device in response to detecting authentication of a password manager of the electronic device) (952), in accordance with a determination that the respective password does not satisfy the one or more first criteria (e.g., strong password criteria) (954), in accordance with a determination that the electronic device is sharing its display with another electronic device 504c (e.g., the electronic device is displaying a user interface on a display that is not associated with the electronic device, a display device that is associated with a user account that is different from a user account of the electronic device, etc.), the electronic device 500 forgoes (958) displaying the warning indicating that the respective password exhibits the weakness, such as in FIG. 8BB. In some embodiments, when the electronic device is displaying a user interface on a display device of another electronic device, the electronic device forgoes displaying weak password warnings, even if the electronic device detects logging into a user account with a weak password.

The above-described manner of forgoing displaying the warning if the electronic device is sharing its screen allows the electronic device to preserve user privacy regarding the weakness of the passwords of one or more user accounts while other users may be able to view the shared screen, which simplifies the interaction between the user and the electronic device and enhances the operability of the electronic device and makes the user-device interface more efficient (e.g., by automatically forgoing presentation of the warning, rather than requiring the user enter one or more additional inputs to cause the electronic device to forgo presenting the warning), which additionally reduces power usage and improves battery life of the electronic device by enabling the user to use the electronic device more quickly and efficiently.

In some embodiments, such as in FIG. 8AA, the login user interface is displayed by an application, other than a web browser application, on the electronic device (960). In some embodiments, the login user interface is displayed by an application associated with the first user account. For example, a content (e.g., music, videos, etc.) streaming account is associated with a content streaming application. In some embodiments, the electronic device stores login information for user accounts of applications that have associated websites and forgoes storing login information for user accounts of applications that do not have associated websites.

The above-described manner of presenting the warning when the user logs in at a login screen that is an application other than a web browser allows the electronic device to simplify the process of determining that the password is weak when the user logs into the user account using the application other than a web browser, which simplifies the interaction between the user and the electronic device and enhances the operability of the electronic device and makes the user-device interface more efficient (e.g., by reducing the number of inputs needed to view the weak password warning when logging into the application other than the web browser), which additionally reduces power usage and improves battery life of the electronic device by enabling the user to use the electronic device more quickly and efficiently.

In some embodiments, such as in FIG. 8V, the login user interface is a website user interface (962). In some embodiments, the login user interface is displayed by a web browsing application that presents a website associated with the first user account. For example a bank account is associated with a website for the bank of the bank account.

The above-described manner of presenting the warning when the user logs into an account using a website user interface allows the electronic device to simplify the process of determining whether the password is weak when the user is logging into an account using a website user interface, which simplifies the interaction between the user and the electronic device and enhances the operability of the electronic device and makes the user-device interface more efficient (e.g., by reducing the inputs needed to view the weak password warning while logging into the website user interface), which additionally reduces power usage and improves battery life of the electronic device by enabling the user to use the electronic device more quickly and efficiently.

In some embodiments, such as in FIG. 8CC, in response to receiving a sequence of one or more inputs including entry of a respective password 820g into a login user interface for gaining access to a respective user account (964), in accordance with a determination that the respective password 820g has more than a threshold number of characters (e.g., four, six, eight), the electronic device 500 evaluates (966) the respective password using the one or more first criteria to determine whether the respective password exhibits a weakness that will cause display of a warning that the respective password exhibits a weakness (e.g., criteria for passwords that are not also PINs). In some embodiments, the electronic device applies the first one or more criteria to passwords that have more than a predetermined number of characters (e.g., more than 6 characters) or a different number of characters than one or more predetermined numbers of characters (e.g., passwords that do not have 4 or 6 characters) because these passwords are unlikely to also be PINs. For example, the electronic device applies criteria related to the length of the password (e.g., a strong password criterion that is satisfied when the password has more than a predetermined number (e.g., 8, 10, 12) characters, the types of characters included in the password (e.g., strong password criteria that are satisfied when the password includes at least one letter and one number or another group of diverse characters)), and other criteria for passwords that are not likely to be PINs based on the number of characters in the password. In some embodiments, one or more of these first criteria are not applied to passwords with less than the predetermined number (e.g., 7) of characters or exactly the predetermined number of characters (e.g., 4 or 6 characters) because passwords with these numbers of a characters are likely to be PINs and, in some situations, have restrictions on how many characters or the types of characters that the user is allowed to include in the PIN.

In some embodiments, such as in FIG. 8EE, in response to receiving a sequence of one or more inputs including entry of a respective password 820h into a login user interface for gaining access to a respective user account (964), in accordance with a determination that the respective password has less than or equal to the threshold number of characters, the electronic device 500 evaluates (968) the respective password using one or more second criteria, different than the one or more first criteria, to determine whether the respective password exhibits a weakness that will cause display of a warning that the respective password exhibits a weakness (e.g., criteria for passwords that are not also PINs). In some embodiments, the electronic device applies the second one or more criteria to passwords that have less than or equal to a predetermined number of characters (e.g., less than or equal to 6 characters) or a characters that matches one or more predetermined numbers of characters (e.g., passwords that have 4 or 6 characters) because these passwords are likely to also be PINs. For example, the electronic device forgoes applying criteria related to the length of the password (e.g., a strong password criterion that is satisfied when the password has more than a predetermined number (e.g., 8, 10, 12) characters, the types of characters included in the password (e.g., strong password criteria that are satisfied when the password includes at least one letter and one number or another group of diverse characters)), and other criteria that do not apply to passwords that are likely to be PINs based on the number of characters in the password. In some embodiments, one or more of second criteria are applied to passwords with less than the predetermined number (e.g., 7) of characters or exactly the predetermined number of characters (e.g., 4 or 6 characters) because passwords with these numbers of a characters are likely to be PINs and, in some situations, have restrictions on how many characters or the types of characters that the user is allowed to include in the PIN.

The above-described manner of applying one or more first criteria to passwords that have more than a predetermined number of characters and applying one or more second criteria to passwords that have less than the predetermined number of characters allows the electronic device to provide the weak password warnings for weak passwords over the predetermined number of characters without presenting erroneous warnings for passwords with a number of characters that is less than the predetermined number of characters, which simplifies the interaction between the user and the electronic device and enhances the operability of the electronic device and makes the user-device interface more efficient (e.g., by reducing the number of inputs needed to determine that passwords with a number of characters above the predetermined number of characters are weak and reducing the number of inputs needed to log into an account that has a password with less than the predetermined number of characters by avoiding presenting erroneous warnings), which additionally reduces power usage and improves battery life of the electronic device by enabling the user to use the electronic device more quickly and efficiently.

In some embodiments, such as in FIG. 8MM, the electronic device 500 evaluates (970) the respective password 896b for repeated use across multiple user accounts independent of the number of characters included in the respective password. In some embodiments, if a password is repeated for multiple user accounts, the electronic device presents the warning regardless of the number of characters in the password.

The above-described manner of evaluating the password for repeated use across multiple user accounts regardless of the number of characters in the password allows the electronic device to indicate to the user when passwords are repeated for passwords of all lengths, which simplifies the interaction between the user and the electronic device and enhances the operability of the electronic device and makes the user-device interface more efficient (e.g., by reducing the number of inputs needed to determine if the password is repeated), which additionally reduces power usage and improves battery life of the electronic device by enabling the user to use the electronic device more quickly and efficiently.

In some embodiments, such as in FIG. 8GG, in response to receiving a sequence of one or more inputs including entry of a respective password 822i into a login user interface for gaining access to a respective user account, wherein the respective password does not satisfy the one or more first criteria (e.g., one or more strong password criteria) (972), in accordance with a determination that the respective password was not shared from another user account with a user account associated with a user of the electronic device (e.g., the user account was added to the password management system of the electronic device on the electronic device without receiving the account information from a user account of another electronic device), the electronic device 500 displays (974), via the display device, a warning 812h indicating that the respective password exhibits a weakness, such as in FIG. 8HH. Optionally, while logging in to the first user account, in response to detecting that the password exhibits the weakness, and in response to detecting that the password is not a password that was shared by a user account of another electronic device, the electronic device presents the warning.

In some embodiments, such as in FIG. 8TT, in response to receiving a sequence of one or more inputs including entry of a respective password 820l into a login user interface for gaining access to a respective user account, wherein the respective password 820l does not satisfy the one or more first criteria (e.g., one or more strong password criteria) (972), in accordance with a determination that the respective password 888 was shared from another user account with the user account associated with the user of the electronic device, such as in FIG. 8RR (e.g., the electronic device received the password from a user account of another electronic device and, in response to receiving the password, stored the password in the password management system of the electronic device), the electronic device 500 forgoes (976) displaying the warning indicating that the respective password exhibits the weakness, such as in FIG. 8UU. In some embodiments, the user manually enters the respective password into the login user interface or the electronic device enters the respective password into the login user interface in response to detecting authentication (e.g., biometrics, facial recognition, entry of a device or password manager password or passcode). In some embodiments, while logging in to the first user account, in response to detecting that the password exhibits the weakness, and in response to detecting that the password is a password that was shared by a user account of another electronic device, the electronic device forgoes displaying the warning. Optionally, the electronic device presents information about the weakness of the password in a user interface that includes the information about the first user account.

The above-described manner of forgoing presenting the warning when the user logs into an account for which the account credentials were shared by another electronic device allows the electronic device to simplify the process for accessing the account in situations where the user is unlikely to want to change the password, which simplifies the interaction between the user and the electronic device and enhances the operability of the electronic device and makes the user-device interface more efficient (e.g., by reducing the number of inputs needed to access the account), which additionally reduces power usage and improves battery life of the electronic device by enabling the user to use the electronic device more quickly and efficiently.

In some embodiments, such as in FIG. 8KK, the one or more first criteria are satisfied or not satisfied independent of repeated use of the respective password across a plurality of user accounts (978). In some embodiments, regardless of whether or not the password is used for a plurality of user accounts, the electronic device presents the warning only for substantively weak passwords, and forgoes presenting the warning for passwords that are substantively strong, but are repeated across multiple user account. Optionally, the electronic device presents a warning about the repeated use of a substantively strong password in a user interface that includes the login information for the user account associated with the repeatedly used password (e.g., a password management user interface related to the user account). The above-described manner of only presenting active login warnings for substantively weak passwords allows the electronic device to forgo presenting the warning for passwords that are not weak except because they are repeated, which simplifies the interaction between the user and the electronic device and enhances the operability of the electronic device and makes the user-device interface more efficient (e.g., by reducing the number of alerts that the user is presented with and must take action on), which additionally reduces power usage and improves battery life of the electronic device by enabling the user to use the electronic device more quickly and efficiently.

In some embodiments, such as in FIG. 8QQ, the one or more first criteria are satisfied or not based on a weakness of the respective password (e.g., in some embodiments, the electronic device evaluates the password using one or more strong password criteria) or repeated use of the respective password across a plurality of user accounts (980). Optionally, the electronic device determines the weakness of the respective password using the one or more strong password criteria. For example, if one or more of the strong password criteria are not satisfied, the password is considered to be weak. In some embodiments, one of the strong password criteria is a criterion that is not satisfied if the password is used for a plurality of user accounts for which the electronic device stores login information. Optionally, the electronic device presents the warning in response to detecting logging into a user account with a password that is weak and/or a repeated password and forgoes presenting the warning in response to detecting logging into a user account with a password that is strong and not a repeated password. Optionally, the electronic device presents a warning about the weakness of a relatively less weak password that is not a repeated password in a user interface that includes the login information for the user account associated with the relatively less weak password that is not a repeated password (e.g., a password management user interface related to the user account).

The above-described manner of evaluating the weakness of the password including evaluating whether the password is used for multiple user accounts allows the electronic device to automatically inform the user that the password is repeated when the user logs into the account, which simplifies the interaction between the user and the electronic device and enhances the operability of the electronic device and makes the user-device interface more efficient (e.g., by reducing the number of inputs needed to determine that the password is repeated), which additionally reduces power usage and improves battery life of the electronic device by enabling the user to use the electronic device more quickly and efficiently.

In some embodiments, such as in FIG. 8PP, in response to receiving a second sequence of one or more inputs including entry of a respective password 820k into a login user interface for gaining access to a respective user account (e.g., manual entry of the password, entry of the password by the electronic device in response to detecting authentication of the electronic device and/or the password manager of the electronic device, navigation to a user interface of an account that remains logged in), wherein the respective password does not satisfy the one or more first criteria (e.g., strong password criteria) and the respective password is repeated across a plurality of user accounts (982), the electronic device 500 displays (984), via the display device, a warning 812j indicating that the first respective password exhibits a weakness, such as in FIG. 8QQ (e.g., the warning includes a selectable option that, when selected, causes the electronic device to present a user interface at which the user is able to change the first respective password). In some embodiments, such as in FIG. 8QQ, in response to determining that the first respective password was changed in response to input directed to the warning 812j indicating that the first respective password exhibits the weakness (e.g., selection of the selectable option that, when selected, causes the electronic device to present a user interface at which the user is able to change the first respective password), the electronic device 500 displays (986), via the display device, a second warning 812j indicating that a second respective password for a second respective user account, of the plurality of user accounts, is a repeated password, wherein input directed to the second warning 814j causes initiation of a process to change the second respective password for the second respective user account, such as in FIG. 8QQ. In some embodiments, after detecting that the user changed the first respective password, the electronic device presents an option to change the second respective password that was the same as the first respective password prior to the user changing the first respective password.

The above-described manner of presenting the second warning after the user changes the first password allows the electronic device to simplify the process of changing the passwords for multiple accounts with weak, repeated passwords, which simplifies the interaction between the user and the electronic device and enhances the operability of the electronic device and makes the user-device interface more efficient (e.g., by reducing the number of inputs needed to change the passwords of multiple accounts), which additionally reduces power usage and improves battery life of the electronic device by enabling the user to use the electronic device more quickly and efficiently.

It should be understood that the particular order in which the operations in FIGS. 9A-9F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIGS. 9A-9F. For example, the ways the electronic device presents weak password warnings within login user interfaces as described above with reference to method 900 optionally have one or more of the characteristics of presenting weak password warnings within password management user interfaces, etc., described herein with reference to other methods described herein (e.g., method 700). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 9A-9F are, optionally, implemented by components depicted in FIGS. 1A-1B. For example, displaying operations 902, 908, and 930 and receiving operations 904, 926, and 942 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include demographic data, location-based data, online identifiers, telephone numbers, e-mail addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, storing user account login information enables the electronic device to analyze the strength of a password and enter the user account login information in response to authentication of the password manager and/or electronic device. Accordingly, use of such personal information data enables users to select strong passwords for their user accounts and reduce the number of inputs needed to log into user accounts. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, users can select not to store user account login information on the electronic device.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, password strength analysis can be based on aggregated non-personal information data or a bare minimum amount of personal information, such as the passwords being handled only on the user's device or other non-personal information available to the password analysis process.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed as new and desired to be protected by Letters Patent of the United States is:

1. A method comprising:
    at an electronic device in communication with a display device and one or more input devices:
        receiving, via the one or more input devices, an input corresponding to a request to display password information associated with a first user account, wherein the password information includes a first password for gaining access to the first user account; and
        in response to receiving the input corresponding to the request to display the password information associated with the first user account, displaying, via the display device, a first user interface that includes the first password associated with the first user account, wherein:
            in accordance with a determination that the first password does not satisfy one or more first criteria, including a criterion that is not satisfied when a particular portion of the first password exhibits a weakness of a first type, the first user interface includes information about the weakness of the first type, wherein the information about the weakness of the first type includes the particular portion of the first password that exhibits the weakness of the first type, and the particular portion of the first password is different from the first password; and
            in accordance with a determination that the first password does satisfy the one or more first criteria, the first user interface does not include the information about the weakness of the first type that includes the particular portion of the first password.

2. The method of claim 1, wherein the input to display the password information associated with the first user account includes selection, from a password management user interface, of a representation of the first user account, the password management user interface including a plurality of representations of a plurality of user accounts.

3. The method of claim 2, wherein displaying the password management user interface includes:
    in accordance with a determination that a respective user account is associated with a respective password that does not satisfy the one or more first criteria independent of whether the respective password is used for multiple user accounts included in the password management user interface, displaying a representation of the respective user account with a visual indication that the respective password does not satisfy the one or more first criteria.

4. The method of claim 1, wherein the first user interface includes a selectable option that is selectable to display, via the display device, a user interface from which the first password for gaining access to the first user account can be changed.

5. The method of claim 4, wherein:
in accordance with a determination that the first user account is associated with a website that supports direct linking to a page from which the first password can be changed, the selectable option is selectable to display the page from which the first password can be changed, and
in accordance with a determination that the first user account is not associated with the website that supports direct linking to the page from which the first password can be changed, the selectable option is selectable to display a home page of the website.

6. The method of claim 4, further comprising:
in accordance with a determination that a password management user interface includes a plurality of user accounts for which respective passwords do not satisfy the one or more first criteria:
in response to changing the first password for gaining access to the first user account in the user interface from which the first password for gaining access to the first user account can be changed, displaying, via the display device, a selectable option that is selectable to display a user interface from which a second password for gaining access to a second user account, in the plurality of user accounts, can be changed.

7. The method of claim 6, wherein the password management user interface includes a respective user account for which a respective password does not satisfy the one or more first criteria, and
in accordance with a determination that the respective user account is a high-value user account, the respective user account is included in the plurality of user accounts, and
in accordance with a determination that the respective user account is not a high-value user account, the respective user account is not included in the plurality of user accounts.

8. The method of claim 1, wherein the one or more first criteria include one or more of:
a criterion that is not satisfied when at least a portion of a respective password is easily guessed;
a criterion that is not satisfied when at least a portion of the respective password is a dictionary word;
a criterion that is not satisfied when at least a portion of the respective password is a sequence of characters;
a criterion that is not satisfied when at least a portion of the respective password includes repeated characters; or
a criterion that is not satisfied when at least a portion of the respective password is a result of a common character substitution into a known word.

9. The method of claim 1, wherein the particular portion of the first password further exhibits a weakness of a second type, different than the first type, and the first user interface includes the particular portion of the first password with information about the weakness of the second type.

10. The method of claim 1, wherein the first password further includes a second particular portion that exhibits the weakness of the first type, different from the particular portion, and the first user interface includes the second particular portion of the first password with the information about the weakness of the first type that includes the second particular portion of the first password.

11. The method of claim 1, wherein the first password further includes a second particular portion that exhibits a weakness of a second type, different than the first type, and the first user interface includes the second particular portion of the first password with information about the weakness of the second type that includes the second particular portion of the first password.

12. The method of claim 1, further comprising:
receiving, via the one or more input devices, an input corresponding to a request to display password information associated with a respective user account, wherein the password information includes a respective password for gaining access to the respective user account; and
in response to receiving the input corresponding to the request to display the password information associated with the respective user account, displaying, via the display device, a respective user interface that includes the respective password associated with the respective user account, wherein:
in accordance with a determination that the respective password has more than a threshold number of characters, evaluating the respective password using the one or more first criteria to determine whether the respective password exhibits a weakness that will be displayed in the respective user interface; and
in accordance with a determination that the respective password has less than or equal to the threshold number of characters, evaluating the respective password using one or more second criteria, different than the one or more first criteria, to determine whether the respective password exhibits a weakness that will be displayed in the respective user interface.

13. The method of claim 12, further comprising evaluating the respective password for repeated use across multiple user accounts independent of a number of characters included in the respective password.

14. The method of claim 1, wherein the first user interface includes the particular portion of the first password displayed in association with information about the weakness of the first type independent of whether the first password for the first user account was shared from another user account with a user account associated with the electronic device.

15. The method of claim 1, further comprising:
receiving, via the one or more input devices, an input for changing a respective password for a respective user account; and
in response to receiving the input for changing the respective password for the respective user account:
in accordance with a determination that a user account associated with the electronic device had previously shared the respective password for the respective user account with a second user account, initiating a process to transmit a notification that the respective password has been changed to the second user account; and
in accordance with a determination that the user account associated with the electronic device had not previously shared the respective password for the respective user account with the second user account, forgoing initiating the process to transmit the notification that the respective password has been changed to the second user account.

16. An electronic device, comprising:
one or more processors;
memory; and
one or more programs, wherein the one or more programs are stored in the memory and configured to be executed by the one or more processors, the one or more programs including instructions for:
receiving, via one or more input devices, an input corresponding to a request to display password information associated with a first user account, wherein the password information includes a first password for gaining access to the first user account; and
in response to receiving the input corresponding to the request to display the password information associated with the first user account, displaying, via a display device, a first user interface that includes the first password associated with the first user account, wherein:
in accordance with a determination that the first password does not satisfy one or more first criteria, including a criterion that is not satisfied when a particular portion of the first password exhibits a weakness of a first type, the first user interface includes information about the weakness of the first type, wherein the information about the weakness of the first type includes the particular portion of the first password that exhibits the weakness of the first type, and the particular portion of the first password is different from the first password; and
in accordance with a determination that the first password does satisfy the one or more first criteria, the first user interface does not include the information about the weakness of the first type that includes the particular portion of the first password.

17. The electronic device of claim 16, wherein the input to display the password information associated with the first user account includes selection, from a password management user interface, of a representation of the first user account, the password management user interface including a plurality of representations of a plurality of user accounts.

18. The electronic device of claim 17, wherein displaying the password management user interface includes:
in accordance with a determination that a respective user account is associated with a respective password that does not satisfy the one or more first criteria independent of whether the respective password is used for multiple user accounts included in the password management user interface, displaying a representation of the respective user account with a visual indication that the respective password does not satisfy the one or more first criteria.

19. The electronic device of claim 16, wherein the first user interface includes a selectable option that is selectable to display, via the display device, a user interface from which the first password for gaining access to the first user account can be changed.

20. The electronic device of claim 19, wherein:
in accordance with a determination that the first user account is associated with a website that supports direct linking to a page from which the first password can be changed, the selectable option is selectable to display the page from which the first password can be changed, and
in accordance with a determination that the first user account is not associated with the website that supports direct linking to the page from which the first password can be changed, the selectable option is selectable to display a home page of the website.

21. The electronic device of claim 19, wherein the one or more programs further include instructions for:
in accordance with a determination that a password management user interface includes a plurality of user accounts for which respective passwords do not satisfy the one or more first criteria:
in response to changing the first password for gaining access to the first user account in the user interface from which the first password for gaining access to the first user account can be changed, displaying, via the display device, a selectable option that is selectable to display a user interface from which a second password for gaining access to a second user account, in the plurality of user accounts, can be changed.

22. The electronic device of claim 21, wherein the password management user interface includes a respective user account for which a respective password does not satisfy the one or more first criteria, and
in accordance with a determination that the respective user account is a high-value user account, the respective user account is included in the plurality of user accounts, and
in accordance with a determination that the respective user account is not a high-value user account, the respective user account is not included in the plurality of user accounts.

23. The electronic device of claim 16, wherein the one or more first criteria include one or more of:
a criterion that is not satisfied when at least a portion of a respective password is easily guessed;
a criterion that is not satisfied when at least a portion of the respective password is a dictionary word;
a criterion that is not satisfied when at least a portion of the respective password is a sequence of characters;
a criterion that is not satisfied when at least a portion of the respective password includes repeated characters; or
a criterion that is not satisfied when at least a portion of the respective password is a result of a common character substitution into a known word.

24. The electronic device of claim 16, wherein the particular portion of the first password further exhibits a weakness of a second type, different than the first type, and the first user interface includes the particular portion of the first password with information about the weakness of the second type.

25. The electronic device of claim 16, wherein the first password further includes a second particular portion that exhibits the weakness of the first type, different from the particular portion, and the first user interface includes the second particular portion of the first password with the information about the weakness of the first type that includes the second particular portion of the first password.

26. The electronic device of claim 16, wherein the first password further includes a second particular portion that exhibits a weakness of a second type, different than the first type, and the first user interface includes the second particular portion of the first password with information about the weakness of the second type that includes the second particular portion of the first password.

27. The electronic device of claim 16, wherein the one or more programs further include instructions for:
receiving, via the one or more input devices, an input corresponding to a request to display password information associated with a respective user account, wherein the password information includes a respective password for gaining access to the respective user account; and in response to receiving the input corresponding to the request to display the password information associated with the respective user account, displaying, via the display device, a respective user interface that includes the respective password associated with the respective user account, wherein:

in accordance with a determination that the respective password has more than a threshold number of characters, evaluating the respective password using the one or more first criteria to determine whether the respective password exhibits a weakness that will be displayed in the respective user interface; and in accordance with a determination that the respective password has less than or equal to the threshold number of characters, evaluating the respective password using one or more second criteria, different than the one or more first criteria, to determine whether the respective password exhibits a weakness that will be displayed in the respective user interface.

28. The electronic device of claim 27, wherein the one or more programs further include instructions for evaluating the respective password for repeated use across multiple user accounts independent of a number of characters included in the respective password.

29. The electronic device of claim 16, wherein the first user interface includes the particular portion of the first password displayed in association with information about the weakness of the first type independent of whether the first password for the first user account was shared from another user account with a user account associated with the electronic device.

30. The electronic device of claim 16, wherein the one or more programs further include instructions for:

receiving, via the one or more input devices, an input for changing a respective password for a respective user account; and in response to receiving the input for changing the respective password for the respective user account:

in accordance with a determination that a user account associated with the electronic device had previously shared the respective password for the respective user account with a second user account, initiating a process to transmit a notification that the respective password has been changed to the second user account; and in accordance with a determination that the user account associated with the electronic device had not previously shared the respective password for the respective user account with the second user account, forgoing initiating the process to transmit the notification that the respective password has been changed to the second user account.

31. A non-transitory computer readable storage medium storing one or more programs, the one or more programs comprising instructions, which when executed by one or more processors of an electronic device, cause the electronic device to:

receive, via one or more input devices, an input corresponding to a request to display password information associated with a first user account, wherein the password information includes a first password for gaining access to the first user account; and in response to receiving the input corresponding to the request to display the password information associated with the first user account, display, via a display device, a first user interface that includes the first password associated with the first user account, wherein:

in accordance with a determination that the first password does not satisfy one or more first criteria, including a criterion that is not satisfied when a particular portion of the first password exhibits a weakness of a first type, the first user interface includes information about the weakness of the first type, wherein the information about the weakness of the first type includes the particular portion of the first password that exhibits the weakness of the first type, and the particular portion of the first password is different from the first password; and in accordance with a determination that the first password does satisfy the one or more first criteria, the first user interface does not include the information about the weakness of the first type that includes the particular portion of the first password.

32. The non-transitory computer readable storage medium of claim 31, wherein the input to display the password information associated with the first user account includes selection, from a password management user interface, of a representation of the first user account, the password management user interface including a plurality of representations of a plurality of user accounts.

33. The non-transitory computer readable storage medium of claim 32, wherein displaying the password management user interface includes:

in accordance with a determination that a respective user account is associated with a respective password that does not satisfy the one or more first criteria independent of whether the respective password is used for multiple user accounts included in the password management user interface, displaying a representation of the respective user account with a visual indication that the respective password does not satisfy the one or more first criteria.

34. The non-transitory computer readable storage medium of claim 31, wherein the first user interface includes a selectable option that is selectable to display, via the display device, a user interface from which the first password for gaining access to the first user account can be changed.

35. The non-transitory computer readable storage medium of claim 34, wherein:

in accordance with a determination that the first user account is associated with a website that supports direct linking to a page from which the first password can be changed, the selectable option is selectable to display the page from which the first password can be changed, and in accordance with a determination that the first user account is not associated with the website that supports direct linking to the page from which the first password can be changed, the selectable option is selectable to display a home page of the website.

36. The non-transitory computer readable storage medium of claim 34, wherein the one or more programs further cause the electronic device to:

in accordance with a determination that a password management user interface includes a plurality of user accounts for which respective passwords do not satisfy the one or more first criteria:

in response to changing the first password for gaining access to the first user account in the user interface from which the first password for gaining access to the first user account can be changed, display, via the display device, a selectable option that is selectable to display a user interface from which a second password for gaining access to a second user account, in the plurality of user accounts, can be changed.

37. The non-transitory computer readable storage medium of claim 36, wherein the password management user interface includes a respective user account for which a respective password does not satisfy the one or more first criteria, and
in accordance with a determination that the respective user account is a high-value user account, the respective user account is included in the plurality of user accounts, and
in accordance with a determination that the respective user account is not a high-value user account, the respective user account is not included in the plurality of user accounts.

38. The non-transitory computer readable storage medium of claim 31, wherein the one or more first criteria include one or more of:
a criterion that is not satisfied when at least a portion of a respective password is easily guessed;
a criterion that is not satisfied when at least a portion of the respective password is a dictionary word;
a criterion that is not satisfied when at least a portion of the respective password is a sequence of characters;
a criterion that is not satisfied when at least a portion of the respective password includes repeated characters; or
a criterion that is not satisfied when at least a portion of the respective password is a result of a common character substitution into a known word.

39. The non-transitory computer readable storage medium of claim 31, wherein the particular portion of the first password further exhibits a weakness of a second type, different than the first type, and the first user interface includes the particular portion of the first password with information about the weakness of the second type.

40. The non-transitory computer readable storage medium of claim 31, wherein the first password further includes a second particular portion that exhibits the weakness of the first type, different from the particular portion, and the first user interface includes the second particular portion of the first password with the information about the weakness of the first type that includes the second particular portion of the first password.

41. The non-transitory computer readable storage medium of claim 31, wherein the first password further includes a second particular portion that exhibits a weakness of a second type, different than the first type, and the first user interface includes the second particular portion of the first password with information about the weakness of the second type that includes the second particular portion of the first password.

42. The non-transitory computer readable storage medium of claim 31, wherein the one or more programs further cause the electronic device to:
receive, via the one or more input devices, an input corresponding to a request to display password information associated with a respective user account, wherein the password information includes a respective password for gaining access to the respective user account; and
in response to receiving the input corresponding to the request to display the password information associated with the respective user account, display, via the display device, a respective user interface that includes the respective password associated with the respective user account, wherein:
in accordance with a determination that the respective password has more than a threshold number of characters, evaluate the respective password using the one or more first criteria to determine whether the respective password exhibits a weakness that will be displayed in the respective user interface; and
in accordance with a determination that the respective password has less than or equal to the threshold number of characters, evaluate the respective password using one or more second criteria, different than the one or more first criteria, to determine whether the respective password exhibits a weakness that will be displayed in the respective user interface.

43. The non-transitory computer readable storage medium of claim 42, wherein the one or more programs further cause the electronic device to evaluate the respective password for repeated use across multiple user accounts independent of a number of characters included in the respective password.

44. The non-transitory computer readable storage medium of claim 31, wherein the first user interface includes the particular portion of the first password displayed in association with information about the weakness of the first type independent of whether the first password for the first user account was shared from another user account with a user account associated with the electronic device.

45. The non-transitory computer readable storage medium of claim 31, wherein the one or more programs further cause the electronic device to:
receive, via the one or more input devices, an input for changing a respective password for a respective user account; and
in response to receiving the input for changing the respective password for the respective user account:
in accordance with a determination that a user account associated with the electronic device had previously shared the respective password for the respective user account with a second user account, initiate a process to transmit a notification that the respective password has been changed to the second user account; and
in accordance with a determination that the user account associated with the electronic device had not previously shared the respective password for the respective user account with the second user account, forgo initiating the process to transmit the notification that the respective password has been changed to the second user account.

\* \* \* \* \*